US012347904B2

(12) United States Patent
Vallur Rajendran et al.

(10) Patent No.: US 12,347,904 B2
(45) Date of Patent: Jul. 1, 2025

(54) LOOK AHEAD ENERGY MANAGEMENT AND CONTROL SYSTEMS AND METHODS TO IMPROVE FUEL CELL SYSTEM PERFORMANCE, DURABILITY, AND LIFE

(71) Applicant: CUMMINS INC., Columbus, IN (US)

(72) Inventors: Avinash Vallur Rajendran, Indianapolis, IN (US); Archit Koti, Sunnyvale, CA (US); Guangji Ji, Wuhan (CN); Loren DeVries, Indianapolis, IN (US); Charles Vesely, Andover, MN (US); Vivek Sujan, Columbus, IN (US); Elizabeth Weitzel, Columbus, IN (US); Patrick Kaufman, Vacaville, CA (US)

(73) Assignee: CUMMINS INC., Columbus, IN (US)

( * ) Notice: Subject to any disclaimer, the term of this patent is extended or adjusted under 35 U.S.C. 154(b) by 172 days.

(21) Appl. No.: 17/592,236

(22) Filed: Feb. 3, 2022

(65) Prior Publication Data
US 2022/0255100 A1   Aug. 11, 2022

Related U.S. Application Data

(60) Provisional application No. 63/147,995, filed on Feb. 10, 2021.

(51) Int. Cl.
| | |
|---|---|
| *H01M 8/04992* | (2016.01) |
| *B60L 3/00* | (2019.01) |
| *B60L 50/60* | (2019.01) |
| *B60L 50/70* | (2019.01) |
| *H01M 8/04082* | (2016.01) |
| *H01M 8/04746* | (2016.01) |
| *H01M 8/10* | (2016.01) |

(52) U.S. Cl.
CPC ....... *H01M 8/04992* (2013.01); *B60L 3/0046* (2013.01); *B60L 3/0053* (2013.01); *B60L 50/60* (2019.02); *B60L 50/70* (2019.02); *H01M 8/04201* (2013.01); *H01M 8/04753* (2013.01); *H01M 2008/1095* (2013.01); *H01M 2250/20* (2013.01)

(58) Field of Classification Search
CPC ......... H01M 8/04992; H01M 8/04201; H01M 8/04298; H01M 8/04753; H01M 2008/1095; H01M 2250/20; B60L 58/30; B60L 3/0046; B60L 3/0053; B60L 50/60; B60L 50/70
See application file for complete search history.

(56) References Cited

U.S. PATENT DOCUMENTS

| | | | |
|---|---|---|---|
| 5,771,476 A | 6/1998 | Mufford et al. | |
| 7,944,081 B2 | 5/2011 | Donnelly et al. | |
| 8,527,132 B2 | 9/2013 | Mineta | |
| 2002/0039672 A1* | 4/2002 | Aramaki | H01M 8/04302 429/410 |

(Continued)

FOREIGN PATENT DOCUMENTS

WO   2018203790   11/2018

*Primary Examiner* — Adam A Arciero
(74) *Attorney, Agent, or Firm* — Barnes & Thornburg LLP

(57) ABSTRACT

The subject matter described herein generally relates to look ahead energy management and control systems and methods for detecting, incorporating, and leveraging look ahead technology data to improve the performance, durability, and life of fuel cell systems.

20 Claims, 20 Drawing Sheets

(56) References Cited

U.S. PATENT DOCUMENTS

| | | |
|---|---|---|
| 2002/0072834 A1 | 6/2002 | Scheffler et al. |
| 2014/0120446 A1 | 5/2014 | Zhang et al. |
| 2019/0016329 A1 | 1/2019 | Park et al. |
| 2020/0391615 A1* | 12/2020 | Beck .................. H01M 16/006 |

* cited by examiner

LOOK AHEAD ENERGY MANAGEMENT AND CONTROL SYSTEMS AND METHODS TO IMPROVE FUEL CELL SYSTEM PERFORMANCE, DURABILITY, AND LIFE

CROSS-REFERENCE TO RELATED APPLICATIONS

This nonprovisional application claims the benefit and priority, under 35 U.S.C. § 119(e) and any other applicable laws or statues, to U.S. Provisional Patent Application Ser. No. 63/147,995 filed on Feb. 10, 2021, the entire disclosure of which is hereby incorporated herein by reference.

TECHNICAL FIELD

The subject matter described herein generally relates to look ahead energy management and control systems and methods for detecting, incorporating, and leveraging look ahead technology data to improve the performance, durability, and life of fuel cell systems

BACKGROUND

Fuel cells generate power based on an electrochemical reaction that occurs between the hydrogen in fuel and oxygen in air. As such, a fuel cell is an electrochemical device that typically facilitates harnessing electrical energy or electricity produced by a chemical reaction often depicted as:

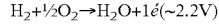

$$H_2 + \tfrac{1}{2}O_2 \rightarrow H_2O + 1\acute{e}(\sim 2.2V)$$

The current produced by a fuel cell is directly proportional to its effective surface area. For example, a fuel cell unit or "cell" corresponds to about 1 cm$^2$ of effective area for the above reaction to take place. Accordingly, each cell produces about 2.2 volts (V) under standard conditions.

To enable a continuous production of energy, a constant stream of oxygen and hydrogen must be passed through the fuel cell to generate power. Ideally, pure oxygen and pure hydrogen are used as fuel cell reactants. Hydrogen is generally supplied to a fuel cell, often via high pressured specialized tanks, to generate the electrochemical reaction of the fuel cell. For economic interests, ambient air is often used as a source of oxygen to the fuel cell to generate electricity.

Unlike batteries, a fuel cell is not generally packed individually. Instead, one or more fuel cells are typically connected together to form a "stack" or a "fuel cell stack." Any fuel cell stack may typically prepared to generate desired levels of current and voltage to power a load. Typical loads powered by fuel cell stacks include, but are not limited to mobile and stationery uses. For example, vehicles and automobiles (e.g., a car or a truck) are illustrative loads that may be powered by one or more fuel cells, including, but not limited to proton exchange membrane fuel cells also called polymer exchange membrane fuel cells (PEMFC).

While fuel cells, such as PEMFCs, are similar to engines—in that they both act as an intermediators in converting chemical energy stored in a tank (e.g., hydrogen) into a different form (e.g., power) by using oxygen from ambient air as the oxidizing agent—fuel cells exhibit a defined transient lag at an even higher magnitude than engines. The durability of fuel cells is also directly and negatively affected by an increased or high number of power cycles (e.g., the fuel cell powering through the startup and/or shutdown process). More specifically, power cycling a fuel cell (e.g., turning a load off and then on again) negatively impacts the life and longevity of that fuel cell. In particular, power demand transients lead to flow and pressure imbalance inside the fuel cell stack that deteriorates the life of the fuel cells, stacks, or fuel cell systems. Therefore, transients are even more damaging to fuel cells than to engines.

Owing to the above factors, fuel cells are often used as steady state energy production devices, coupled with batteries that are more equipped to handle transient loads. However, delayed power delivery from fuel cell due to transients also negatively impacts battery life by exposing the battery to higher C rates. Slow transient fuel cell operations often lead to the need for larger and more expensive battery systems to ensure satisfactory battery life to support a coupled fuel cell stack or system. To counteract this increased C rate on the battery due to the fuel cell system, system integrators often incorporate oversized batteries, such as those used in fuel cell electric vehicles.

However, these concerns as to the susceptibility of fuel cell stacks and systems of being negatively affected by fast ramp up rates and repeated startups or power cycling, in the absence or presence of being coupled to a battery, are unique to fuel cells. In fact, look ahead energy management systems (LEMS) designed for internal combustion (IC) engine based hybrids are distinct and different with respect to overall goal and factors considered as compared to LEMS designed for fuel cell systems. For example, unlike IC engine based systems, PEM fuel cell systems do not have an aftertreatment system nor emissions. Therefore, thermal concerns around the impact that stems from aftertreatment and related engine emissions do not constrain controls that are designed for fuel cell systems. Consequently, the time between two consecutive starts are less concerning in fuel cells than IC engine based hybrids.

In addition, power cycling, or turning off and later turning back on, the primary energy producer in a hybrid vehicle, is particularly damaging and adverse to the durability of a fuel cell system. In contrast, an engine based look ahead management strategy may comprise turning off the engine under some circumstances to improve fuel efficiency or avoid emissions. Firstly, emissions are of no concern in fuel cell hybrid vehicles as compared known environmental concerns related to engine emissions. Secondly, turning off an engine is not viewed as a tradeoff as it is for a fuel cell, since power cycling does not damage the overall life of an engine as it does a fuel cell.

Finally, fuel cells (e.g., PEMFCs) are not stable at low power operations, which presents a unique challenge in the operational control of fuel cells compared to internal combustion (IC) engines. For example, an engine can be indefinitely operated at 'zero power' mode by simply idling it. However, fuel cells have a minimum power threshold at which they must be operated or be turned off. This critical difference in the low power behavior of fuel cells, such as PEMFCs, plays a critical role in differentiating PEM-LEMS and methods compared to LEMS or methods built for IC engines.

For example, when a vehicle (without auxiliary loads) comes to stop at a stop sign momentarily—an engine based hybrid can put the engine in a low power mode, such as an idle or standby mode, if the battery is fully charged. During engine idle, the net power output from the engine system after accounting for parasitic loads and friction losses in is at or near zero. Following this, the power produced by the engine can quickly and safely be ramped up to maximum capacity (e.g., 100% power or power capacity) to deliver good pull away performance of the vehicle.

However, a fuel cell hybrid system or vehicle cannot put a fuel cell into zero net power state. Based on the fuel cell size, the minimum power that must be drawn from a fuel cell system can be as high as 10 kW. This requirement is driven by durability and control stability considerations. For a similarly sized fuel cell, parasitic loads may only be about 1-2 kW, hence the parasitic load alone is unable to meet idle power requirements. Therefore, fuel cells may require to be shutdown if the minimum power requirement is not met and/or battery is fully charged.

On the other hand once a fuel cell system is shutdown, it experiences significant delay in restarting or being restarted. Additionally, even if the fuel cell system was not fully turned off and was operating at a low power state, considerations around fuel cell system durability and life constrain how quickly power output from the fuel cell system can be ramped up to maximum capacity. These operational factors, considerations, and solutions make the control of fuel cell hybrids very different and significantly more challenging from those of engine powered hybrids.

Owing to these limitation, it becomes imperative for fuel cell look ahead energy management systems to account for net time at lagged, low, or negative power operations. For example, when a fuel cell electrified vehicle (FCEV) is stopped (e.g., low power operation). Alternatively, when the FCEV is going downhill when the system is actively braking to maintain speed (e.g., negative power operation). Or, when a FCEV is expected to quickly ramp up to full power from zero or no power (e.g., lag or lagged power operation).

These unmet needs in current fuel cell technology necessitates advanced techniques to limit the exposure of fuel cells and fuel cell stacks and systems to deleterious transients. The primary objective of the look ahead energy management systems (LEMS) and methods of the present disclosure is to reduce lag in power delivery from one or more fuel cells or fuel cell stacks in low or negative operation modes, while maximizing life of a fuel cell or fuel cell stack. In particular the look ahead energy management system of the present disclosure provides methods of protecting a fuel cell system from transients and reducing the number of times the fuel cell system is power cycled (e.g., restarted or turned on and turned off) in order to extend and/or maximize the performance (e.g., fuel efficiency and/or acceleration), durability, and life of the fuel cell, stack, or system.

More specifically, the look ahead energy management systems (LEMS) and methods of the present disclosure provide improvements over current systems and methods including: 1) an anticipatory control system that looks at overall energy demand, 2) anticipation or prediction of an increase (e.g., a steep increase) in power demand independent of exact timing of tip-in and takes steps to counter the damaging effects of such transient events, 3) utility of sensors to predict future power demands, 4) minimizing the number of fuel cell on-off (i.e., power cycles) and determining optimal operating points and parameters based on predictions, 5) enabling optimal operation of fuel cell to improve fuel cell life, transient power capability, and system efficiency, 6) modulating auxiliary loads to manage the net load on the fuel cell and reduce fuel cell power cycling, and 7) reducing uncertainty in duty cycles, thus driving reduction in system size and improved durability.

SUMMARY

The present disclosure is directed to a look ahead energy management and control system to reduce or prevent transients in a fuel cell system, comprising one or more sensors comprising look ahead technology data, an air handling subsystem, the fuel cell system, and a look ahead controller. In one embodiment, the look ahead data is detected by the one or more sensors and communicated to the look ahead controller, which predicts transients based on the look ahead data. The look ahead controller proactively prompts the air handling subsystem to release excess oxygen to the fuel cell system. In addition, the fuel cell system reduces or prevents predicted transients of the fuel cell stack thereby extending the life of the fuel cell system.

The look ahead technology data comprises information extracted from a source selected from a group consisting of an operator or a user, maps, a global positioning system (GPS), a vehicle to vehicle infrastructure V2X, a dedicated short range communication (DSRC), cloud, a fuel cell, a vehicle controller area network (CAN), internal fuel cell devices, artificial intelligence (AI), Internet of Things (IoT), and combinations thereof. The look ahead technology data may further comprise mathematical modeling data.

The sensors of the look ahead energy management and control system may be mounted internal or external of the fuel cell system. The fuel cell system may comprise one or more proton exchange membrane (PEM) fuel cells. The fuel cell system may also be comprised in a vehicle or a powertrain, wherein the vehicle is an electric vehicle and the vehicle may further comprise a battery.

The present disclosure is also directed to a look ahead energy management and control system to extend the life of a fuel cell system, comprising one or more sensors comprising look ahead technology data, an air handling subsystem, the fuel cell system comprising a fuel cell stack, and a look ahead controller. In one embodiment, the look ahead data is detected by the one or more sensors and communicated to the look ahead controller, which predicts transients based on the look ahead data. The look ahead controller proactively prompts the air handling subsystem to release excess oxygen to the fuel cell system. In addition, the fuel cell system reduces or prevents predicted transients, powercycling, or parasitic load of the fuel cell stack thereby extending the life of the fuel cell system.

The look ahead technology data comprises information extracted from a source selected from a group consisting of an operator or a user, maps, a global positioning system (GPS), a vehicle to vehicle infrastructure V2X, a dedicated short range communication (DSRC), cloud, a fuel cell, a vehicle controller area network (CAN), internal fuel cell devices, artificial intelligence (AI), Internet of Things (IoT), and combinations thereof. The look ahead technology data may further comprise mathematical modeling data.

The sensors of the look ahead energy management and control system may be mounted internal or external of the fuel cell system. The fuel cell system may comprise one or more proton exchange membrane (PEM) fuel cells. The fuel cell system may also be comprised in a vehicle or a powertrain, wherein the vehicle is an electric vehicle and the vehicle may further comprise a battery.

The present disclosure is also directed to a look ahead energy management and control method to improve performance and extend the life of a fuel cell system, comprising: 1) detecting look ahead technology data from one or more sensors connected to one or more data sources, 2) communicating the look ahead technology data from the one or more sensors to a look ahead controller, 3) predicting transients based on the look ahead technology data, 4) altering the behavior of the fuel cell system in response to the look ahead technology data, 5) reducing or preventing predicted transients, powercycling, or parasitic load of the fuel cell stack, and 6) improving the performance and extending the life of the fuel cell system. Improving performance of the fuel cell system may comprise improving acceleration of the fuel cell system.

The look ahead technology data of the present method comprises information extracted from a source selected from a group consisting of an operator or a user, maps, a global positioning system (GPS), a vehicle to vehicle infrastructure V2X, a dedicated short range communication (DSRC), cloud, a fuel cell, a vehicle controller area network (CAN), internal fuel cell devices, artificial intelligence (AI), Internet of Things (IoT), and combinations thereof. The look ahead technology data may further comprise mathematical modeling data.

The sensors of the look ahead energy management and control system may be mounted internal or external of the fuel cell system. The fuel cell system may comprise one or more proton exchange membrane (PEM) fuel cells. The fuel cell system may also be comprised in a vehicle or a powertrain, wherein the vehicle is an electric vehicle and the vehicle may further comprise a battery.

Altering the behavior of the fuel cell system in response to the look ahead data of the present look ahead energy management and control method comprises one or more anticipatory methods, one or more reactionary methods, or combinations thereof. The one or more anticipatory or reactionary methods of altering the behavior of the fuel cell system may be selected from the group consisting of precharging, peak shaving, cold starting, purge controlling, or combinations thereof.

Precharging the fuel cell system of the present look ahead energy management and control method may comprise proactively prompting an air handling subsystem to release excess oxygen to the fuel cell stack of the fuel cell system. Peak shaving the fuel cell system of the present look ahead energy management and control method may comprise reducing the peak load of the fuel cell or a battery system.

Cold starting the fuel cell system of the present look ahead energy management and control method may be initiated when the fuel cell system comprises a core operational temperature at or below 0° C. Cold starting the fuel cell system may also comprise maintaining the fuel cell system at core operational temperatures during extreme weather conditions, reduced operation, or no operations. Cold starting the fuel cell system may also comprise defrosting a frozen or nearly frozen fuel cell system. Cold starting the fuel cell system may further comprise proactively warming the fuel cell system, wherein proactively warming the fuel cell system may comprise an external power source and that external power source may be an electrical power grid accessed through a plug connection to the fuel cell system. In one embodiment, cold starting the fuel cell system is initiated based on look ahead technology data that comprises information about an upcoming trip.

Purge controlling the fuel cell system of the present look ahead energy management and control method may comprise proactively releasing hydrogen or other chemical compounds from the fuel cell system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 7A is a schematic demonstrating the difference in anticipatory systems and method providing pre-tip in event controls vs. reactionary systems and method providing post-tip in event controls;

FIG. 7B is a schematic demonstrating the anticipatory or reactionary nature of the look ahead energy management and control subsystems comprising precharge, cold start, peak shaving, and purge controlling methods;

DETAILED DESCRIPTION

Figure 1:
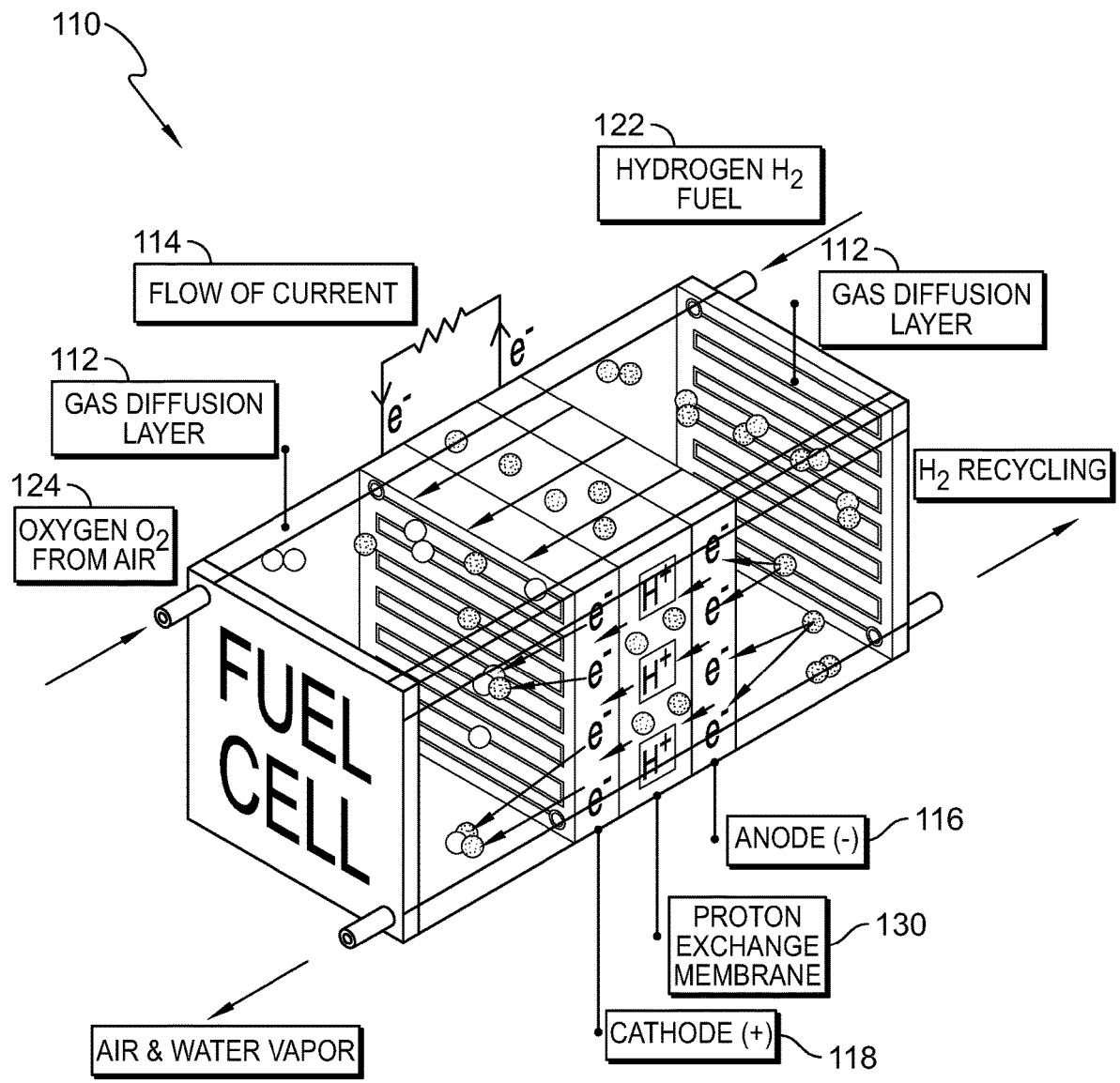
FIG. 1 is a schematic of a fuel cell, such as a proton exchange membrane or polymer exchange membrane fuel cell (PEMFC), comprised in an embodiment of the presently claimed look ahead energy management and control system.

The present disclosure is directed to a look ahead energy management system 10 and methods for leveraging look ahead data to improve the performance and durability of fuel cell systems 100. The fuel cell systems 100 of the present disclosure may comprise one or more fuel cells 110 and/or one or more fuel cell stacks 120. The one or more fuel cell systems 100 and the one or more fuel cell stacks 120 of the present disclosure may comprise one or more fuel cells 110.

The one or more fuel cells 110 of the fuel cell system 100 of the present disclosure may include, but are not limited to, a phosphoric acid fuel cell (PAFC), a molten carbonate fuel cell (MCFC), a proton exchange membrane fuel cell, also called a polymer exchange membrane fuel cell (PEMFC) 110, and a solid oxide fuel cell (SOFC). In one embodiment, the fuel cell 110 of the fuel cell system 100 comprises, consists essentially of, or consists of a PEMFC 110, such as a PEMFC fueled by hydrogen (see FIG. 1). In one embodiment, the PEMFC 110 is the only fuel cell type used for automotive or vehicular applications.

PEMFCs 110 are built out of membrane electrode assemblies (MEAs), comprising electrodes, such as an anode 116 and cathode 118, electrolytes 130, catalysts (e.g., platinum or ceramic oxide), and gas diffusion layers 112 (see FIG. 1). The electrolytes 130 of PEMFCs 110 comprise proton conducting polymer and/or proton exchange membranes that can be operated at high pressures and temperatures typically ranging from about 50° C. to about 100° C. or 100° C. and above, and usually at or about 60 to about 80° C., about 60 to about 85° C., or about 80 to about 85° C. Lower pressure systems typically operate at lower temperatures (below 60° C.).

Fuel 122 and air 124 fed to the electrolytes 130 of the PEMFCs 110 undergo an electrochemical reaction that generates an electrical current 114 (see FIG. 1). More specifically, an oxidation reaction of a fuel (e.g., a hydrogen fuel) 122 at the anode 116 of the fuel cell 110 splits hydrogen into electrons and protons; this reaction may be improved using a catalyst. Notably, the electrolyte membrane 130 of the fuel cell 110 (e.g., PEMFC) is particularly prone to damage during transients due to flow and pressure fluctuations.

The hydrogen 122 protons permeate the polymer electrolyte membrane 130 and travel to the cathode side 118 of the fuel cell 110. The electrons travel through an external load circuit to the cathode 118 to generate power, such as electricity. The hydrogen 122 protons, electrons, and oxygen molecules react at the cathode 118 of the fuel cell 110 to form water and waste heat as byproducts (see FIG. 1).

Fuel cells 110 (e.g., PEMFCs) are generally stacked in series to form a fuel cell stack (FCS) 120. PEM fuel cell stacks 120 typically generate electrical power ranging from about 1-500 kW per stack, which is sufficient to operate transport equipment or motor vehicles, such as cars or trucks. For example, one or more PEMFCs 110 or PEM fuel cell stacks 120 of the present fuel cell power module system may be used to power vehicles. Various embodiments of the look ahead energy management system 10 of the present disclosure may be used to increase performance and durability of fuel cells 110, such as PEMFCs, in a vehicle, a powertrain 20, or any additional applications.

In one embodiment, a powertrain system 20 of the present disclosure may be used or comprised in any vehicular application 200 including, but not limited to on or off roads or highways, underwater, high altitudes, sub-Saharan, mobile, stationary, and/or industrial applications. A vehicle 200 may be any standard, recreational, or industrial vehicle or automobile, including, but not limited to a car, a truck, a boat, a train, a plane, a helicopter, a submarine, etc. In one embodiment, the vehicle is an electric vehicle, an electrified vehicle, or a hybrid electrified vehicles (HEVs) 200.

Figure 2A:
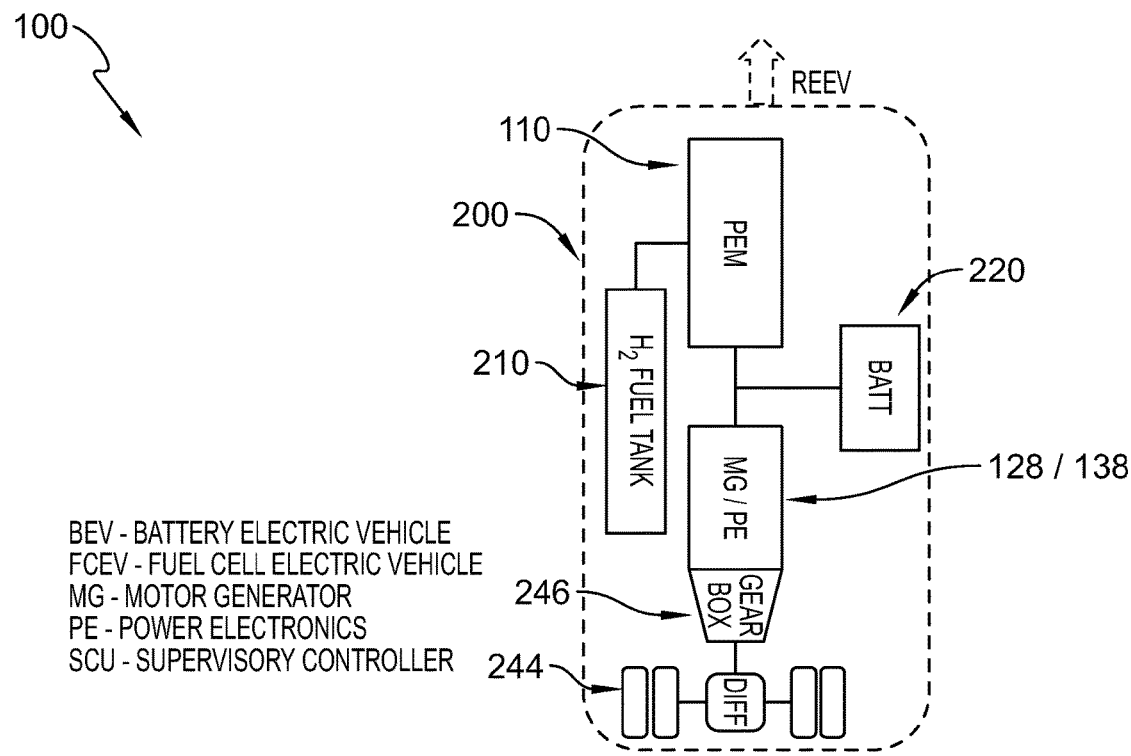
FIG. 2A is a schematic of fuel cell integrated into a hybrid electric vehicle drivetrain application.
Figure 2B:
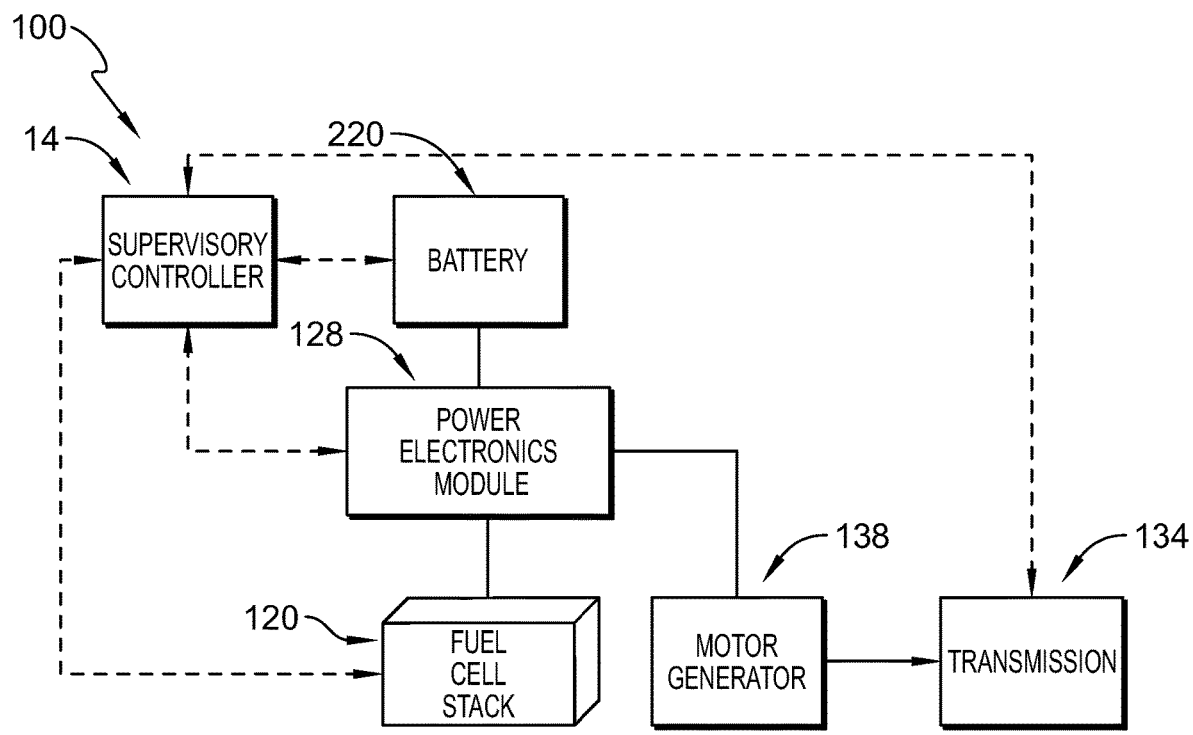
FIG. 2B is a schematic of a hybrid vehicle powertrain and control system.

In one embodiment, a powertrain system 20 may be comprised in or by a vehicle or an electrified vehicle 200. Illustrative embodiments of electrified vehicles or HEVs 200 include, but are not limited to fuel cell electric vehicles (FCEVs) 200 or battery electric vehicles (BEVs) 200, which essentially constitute a series hybrid architecture as shown in FIGS. 2A and 2B.

The size and/or specifications of components of a fuel cell system 100, a fuel cell 110, a fuel tank 210 and/or a battery 220 of any electrified vehicle 200 or hybrid electrified vehicle (HEV) 200 may be optimized a-priori based on expected customer profiles, requests, requirements, and/or expectations. However, typically, there is a minimum battery 220 size needed to provide the fuel cell system 100 the necessary energy required upon startup. The battery 220 is also used significantly for energy capture during braking or regeneration events of a HEV 200. Therefore, by considering and/or predicting the system costs, payback, life, total cost of ownership (TCO), etc. of a fuel cell system 100 comprising a look ahead energy management system 10 and methods, the fuel cell system 100 architecture may enable the battery 220 and/or fuel cell 110 to be optimally operated at different voltage levels, times, durations, or frequencies to maximize life of the fuel cell 110 and its corresponding fuel cell system 100 or subsystems.

Figure 3:
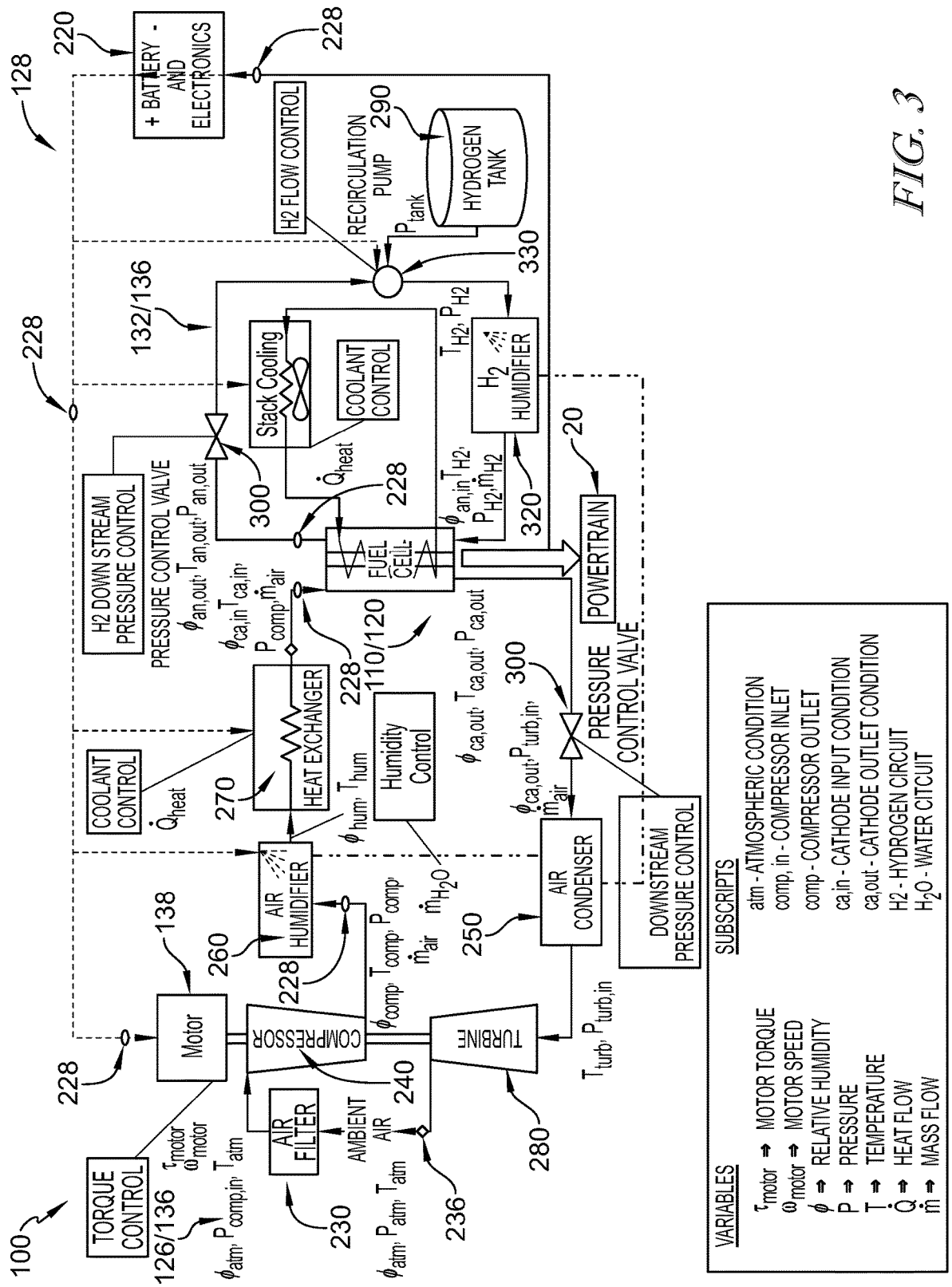
FIG. 3 is a schematic of one embodiment of a fuel cell system and subsystems of the present disclosure.

More specifically, the various subsystems of any fuel cell system 100 may be manipulated, when informed by look ahead energy management systems (LEMS) 10 and methods of the present disclosure, to extend the life of the fuel cell 110. Referring to FIGS. 1-3, in addition to the fuel cell stack 120 where the electrochemical reaction takes place to produce electricity, the fuel cell system 100 may also comprise additional embodiments, as well as optional components and subsystems, including but not limited to a thermal subsystem 136, a power electronics subsystem 128, an air handling subsystem 126, a fuel handling subsystem 132, and/or a controller 14. FIG. 3 is an exemplary embodiment of a fuel cell system 100, noting that many components and/or the order and location of each component or subsystem in the fuel cell system 100 is not limiting to that shown and may be rearranged, omitted, or added in any embodiment known or used in the art.

The combination of $H_2$ and $O_2$ in the fuel cell stack 120 to produce water and electricity is an exothermic reaction that also produces heat. Therefore, the present fuel cell system 100 comprises a thermal subsystem 136, which is critical for rejecting excess heat in order to properly maintain the fuel cell operating temperature (see FIG. 3). The fuel cell system 100 also comprises a power electronic subsystem 128 that further comprises one or more batteries 220, electronics, and/or DC/DC converters to help electrically isolate the operating voltage of the fuel cell 110 from the battery and bus voltage (see FIG. 3).

The air handling subsystem 126 of the fuel cell system 100 may comprise an air filter 230, a compressor 240, a condenser 250, a humidifier 260, and/or a heat exchanger 270 (see FIG. 3). For fuel cells 110 that operate at higher pressures, a turbine 280 may be used at the fuel cell outlet of the air handling subsystem 126 to recover some energy. The air handling subsystem 126 ensures a steady and constant availability of oxygen 124 to the fuel cell 110. Since air 124 is only about 21% oxygen 124, the amount of air 124 that needs to circulate through the air handling subsystem 126 of the fuel cell system 100 is at least two times the amount of pure hydrogen 122 comprised in the fuel handling subsystem 132.

Often, the fuel handling system 132 of the fuel cell system 100 comprises one or more hydrogen tanks 290 that stores hydrogen gas ($H_2$) 122 at very high pressures (see FIG. 3). The fuel handling subsystem 132 may also comprise a pressure control valve 300, a purge valve 310, a humidifier 320, and/or a pump 330 (e.g., a recirculation pump). Hydrogen fluid (e.g., gas or liquid) 122 is transported from pressurized tanks to the fuel cell stack 120 via control valves 300. Unused $H_2$ 122 may be recirculated into the fuel cell system 100 via the pump 330. Occasionally, unused or excess hydrogen 122 or other compounds passing through the system 132 is purged from the fuel handling subsystem 132 and/or the fuel cell system 100 through the purge valve 310.

The production of power from the fuel cell 110 is limited by the amount of reactants (i.e., hydrogen 122 and oxygen 124) that are passing through it. Since hydrogen 122 is heavily pressurized often via tanks, hydrogen 122 delivery to the fuel cell 110 or fuel cell system 100 is almost instantaneous. However, delivery of oxygen 124 via air 124 is often delayed creating bottlenecks of power production, which result in suboptimal power production and performance (e.g., acceleration) of the fuel cell 110 or fuel cell system 100.

This lag phenomenon in a fuel cell system 100 often occurs for about three (3) seconds or more, which is significantly longer than typically observed in engines. Depending on the fuel cell stack 120 size, fuel cell performance lag due to delayed oxygen 124 delivery or other transients may range from about 3-20 seconds, about 3-10 seconds, or about 3-5 seconds. Such lag may cause significant damage to a fuel cell system 100, particularly in a hybrid electrified vehicle 200.

Figure 4A:
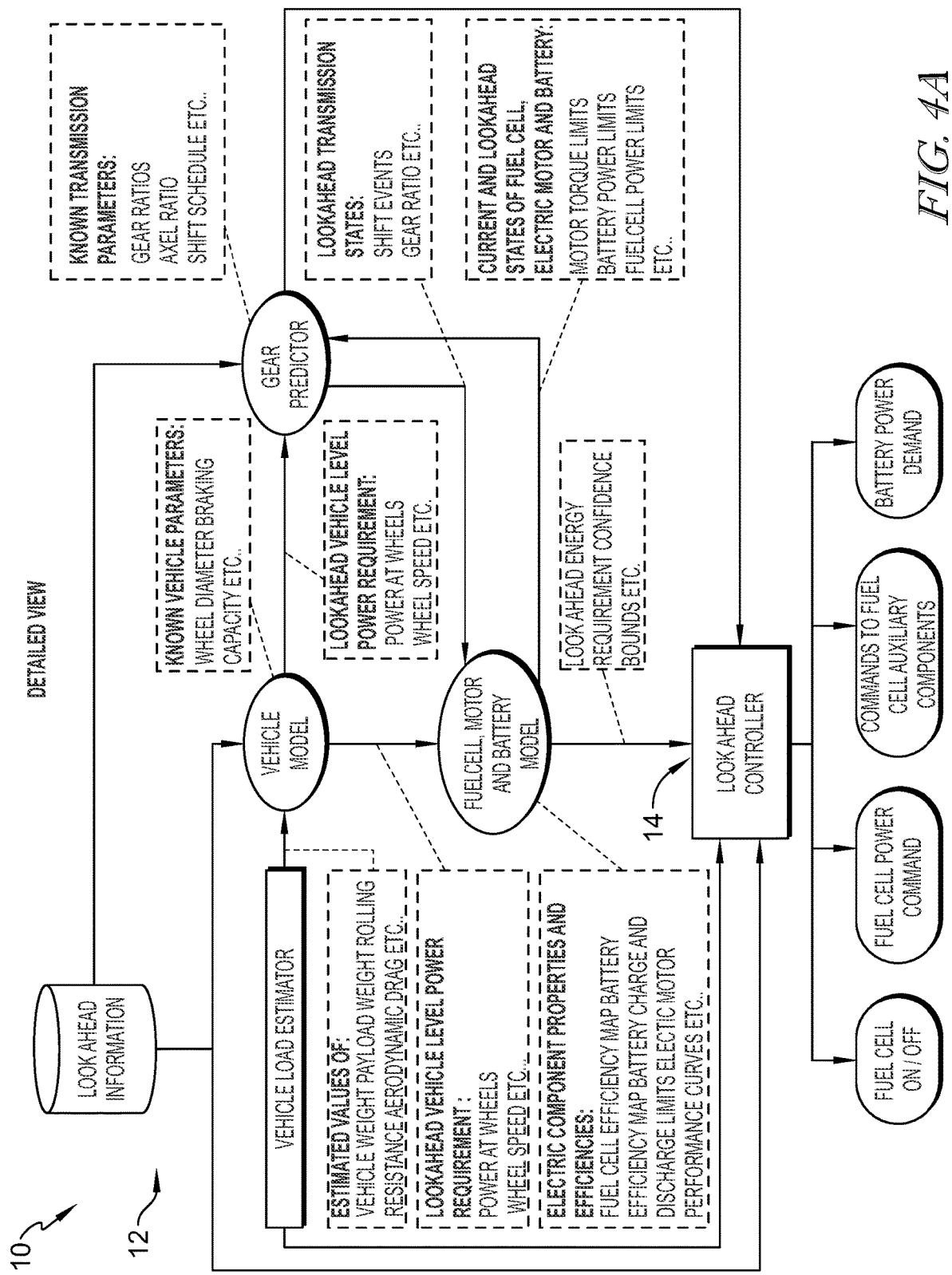
FIG. 4A is a detailed flow chart of an embodiment of the present look ahead energy management and control system and method to predict energy trajectory and fuel cell performance and operation.
Figure 4B:
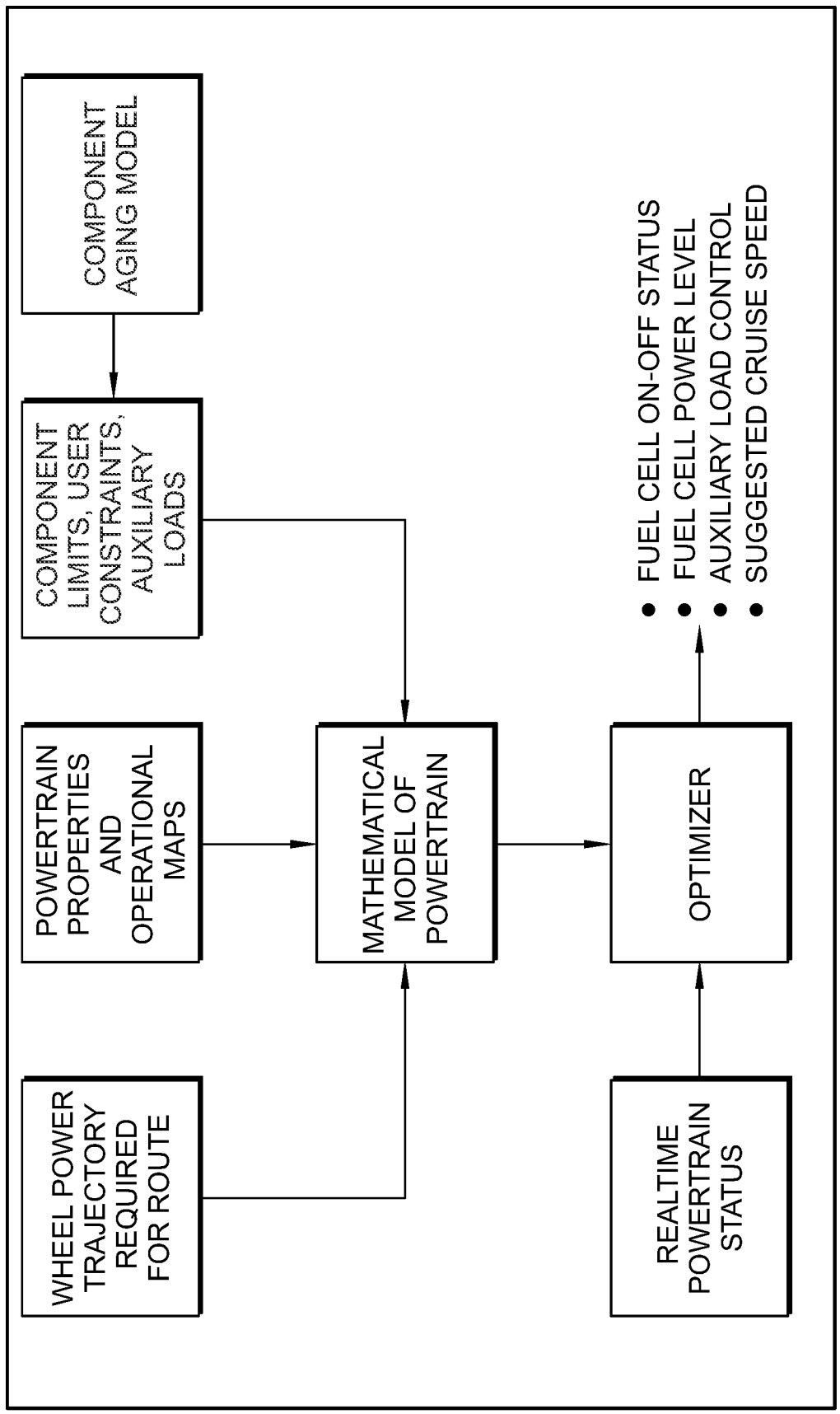
FIG. 4B is a simple flow chart of an embodiment of the present look ahead energy management and control system and method to predict energy trajectory and fuel cell performance and operation.

The look ahead energy management systems (LEMS) 10 and methods of the present disclosure enables optimum performance (e.g., acceleration) and operation of fuel cells 110 and fuel cell systems 100 and prevents fuel cell performance delay or lag by utilizing data from one or more look ahead technologies (FIGS. 4A and 4B). Look ahead technologies of the present disclosure include any tools, information, resource, facts, hypotheses, predictions, algorithms, and/or data that may be used or incorporated to predict or forecast future fuel cell energy demands, performance, defaults, or trajectories. In particular, look ahead technologies of the present disclosure include but are not limited to tools, information, facts, and/or data related to roadways, airways, waterways, or other paths or routes a vehicle comprising a fuel cell system may encounter.

Look ahead technology data also includes, but is not limited to information 12 and/or facts identified, ascertained, determined, and/or extracted from or in any resource, whether electronic, virtual, manual, or tangible. Exemplary look ahead data technologies of the present disclosure includes, but is not limited to maps, global positioning systems (GPS), vehicle to vehicle infrastructure (V2X), dedicated short range communication (DSRC), internal data devices (e.g., clock), cloud, fuel cell 110, sensors 228, vehicle controller area network (CAN), artificial intelligence (AI), Internet of Things (IoT), whether used individually or in combination (see FIG. 4C). In addition, look ahead technologies may comprise predictive mapping or routing information that further includes information related to performance (e.g., acceleration and/or efficiency), operation, and/or maintenance of the vehicle 200, powertrain 20, fuel cell system 110 or battery 220.

For example, look ahead information 12 input or comprised by the present look ahead energy management system 10 and method may relate to control, maintenance, and/or optimization of components of a vehicle or electrified vehicle 200, including, but not limited to wheels 244, gears 246, powertrain 20, battery 220, fuel cell 110, motor 138, transmission 134, etc. (see FIG. 4A). Look ahead technology or data may further comprise information 12 related to the velocity, distance, mass, drag, rolling resistance, wheel power, grade, shifting schedules, gear ratios, transmission ratios, motor speed, torque, battery power, powertrain energy, time reconstruction, electricity generating unit (EGU) power, trip distance, battery state of charge (SOC) limits, battery size, EGU status, current SOC, current distance, control action, etc. (see FIG. 4A).

For example, any information 12, including predictive mapping or routing data acquired from electronic, online, or offline routing sources is comprised by the look ahead technology of the present disclosure. Look ahead data or technologies of the present disclosure comprise information 12 related to fuel/gas (e.g., hydrogen) fill up stations, charging stations and fast charging stations, rest areas, steep inclines or deep declines in the roadways, traffic conditions, frequency or existence of stop-and-start locations (e.g., stop signs, stop lights, stopped traffic, etc.), obstacles, throttle demand or frequency, scheduled stops and starts, weather, etc. In some embodiments, the look ahead technology, data, or information 12 is comprised in a Look Ahead Table (LAT) or a Look Up Table (LUT).

Look ahead technology data, comprised in a LAT/LUT or not, may be in hard copy form (e.g., paper), electronic, offline, or online to enable regular, real-time or immediate updates. Look ahead technology data updates may occur via any wired or wireless capabilities (e.g., Bluetooth) and may occur routinely, randomly, or on demand, such as when programmed or requested by a user. Updated look ahead data is directly or indirectly communicated to the vehicle or fuel cell system for optimal fuel cell efficiency (see FIG. 4B).

This look ahead data or information 12 may be coupled with mathematical modeling data, analyses, and/or information for the vehicle or various vehicle or fuel cell components or performance parameters. For example, mathematical analyses and modeling information may be related to one or more powertrain 20, battery 220, controller 14, wheel 244, loads, optimizer, aging, trajectory, mapping, energy, etc. (see FIGS. 4A and 4B). Such look ahead data or information 12 may also be collected from any related detection devices, such as sensors 228, and transmitted to a device, such as a controlling device or a controller 14 (see FIG. 4C).

Alternatively, look ahead data or information 12 may be manually entered, such as by a user or operator into a controlling device or a controller 14, such as a look ahead controller, a proactive controller, a precharge estimator, and other controlling devices or components (collectively referred to as 'look ahead controllers" 14). The look ahead data may be communicated to the fuel cell system 100 via a look ahead controller 14 to analyze or assess the look ahead technology information 12 received from various data sources, including but not limited to an operator/user, the cloud, fuel cell 110, GPS, internal clock, maps, DSRC, V2X, ranging sensors, artificial intelligence (AI), Internet of Things (IoT), or vehicle CAN (see FIG. 4C). Look ahead data may be analyzed or manipulated by the controller 14 prior to transmitting it to the fuel cell system 100 and/or a HEV, such as a FCEV or a BEV 200.

In addition to a fuel cell system 100, the present look ahead energy management system and method 10 may comprise one or more sensors 228. Sensors 228 may be located in or at any particular or specific location or position in the fuel cell or look ahead energy management systems 100, 10, respectively, and are used to detect and/or collect performance parameter data and information from a fuel cell system 100, subsystem, and/or a vehicle 200. Sensors 228 provide the added capability of the present look ahead energy management system 10 to utilize real-time, instantaneous, or immediate readings, values, and parameters from the vehicle, powertrain, or fuel cell 110 as look ahead technology data to help predict, manage, or optimize future fuel cell system 100 performance and durability.

Importantly, with the use of one or more sensors 228 in the present look ahead energy management system 10 and method, internal performance (e.g., acceleration and/or efficiency) and maintenance readings, values, or parameters may be identified, as well as system proximity to a final destination, to a charging station, a hydrogen refill location, or any other route locations that may have implications for fuel cell performance. Having such look ahead knowledge coupled with the fuel cell system 100 can alter the power split between battery 220 and fuel cell 110 to maximize energy efficiency, duration, and fuel cell life.

Use of sensors 228 the present look ahead energy management 10 or fuel cell systems 100 along with connected vehicle technologies or components provides additional benefits to the present look ahead energy management systems and method, including but not limited to: 1) determining the optimal time within a drive cycle to turn-on/turn-off the fuel cell to minimize switch-on damage, 2) determining the optimum power split between a fuel cell or fuel cell stack and a battery, 3) maintaining battery depth of discharge within desirable levels, and/or 4) reducing range anxiety and uncertainty on end of cycle battery charge, thus reducing the battery size.

Detecting, fusing, compiling, and/or analyzing information gathered from the one or more sensors of the present look ahead energy management system 10 in the absence or present of a mathematical model of the vehicle 200, an estimate or calculation, prediction, or forecast of the vehicle's energy demand up to and through the end of a duty cycle (i.e., a specific task or duty the fuel cell system has been assigned to complete) can be determined; this is termed as an energy demand trajectory. There is also derived benefit from utilizing the present look ahead energy management system 10 and method that reduces transients by predicting upcoming or future transients and takes proactive or preemptive corrective action or measures that may alter the behavior of the fuel cell system 100 in response to the look ahead technology data in order to prevent the transient from actually occurring or taking place. In this respect, the present look ahead energy management system 10 is able to predict, avoid, reduce, or prevent transients resulting in unnecessary powercycling of fuel cells 110 and enabling an extension of fuel cell life and durability.

In order to preserve and/or extend the life of a fuel cell 110 or fuel cell system 100, it is preferable to 'turn on' the fuel cell 110 the least number of times as possible and operate the fuel cell system 100 or stack 120 at a relativity steady level through a duty cycle in order to reduce or prevent power cycling. The present look ahead energy management system 10 and method comprises determining the operating power level of the fuel cell system 100 with consideration of minimizing 'turn on events' and reaching a destination at a desired battery 220 state of charge (SOC; see FIGS. 4B and 4C). For example, use of the present look ahead energy management system 10 enables a user or operator to control fuel cell start/on time, start/on location, power level, precharge capability, off command time or location (see FIG. 4C).

Figure 4C:
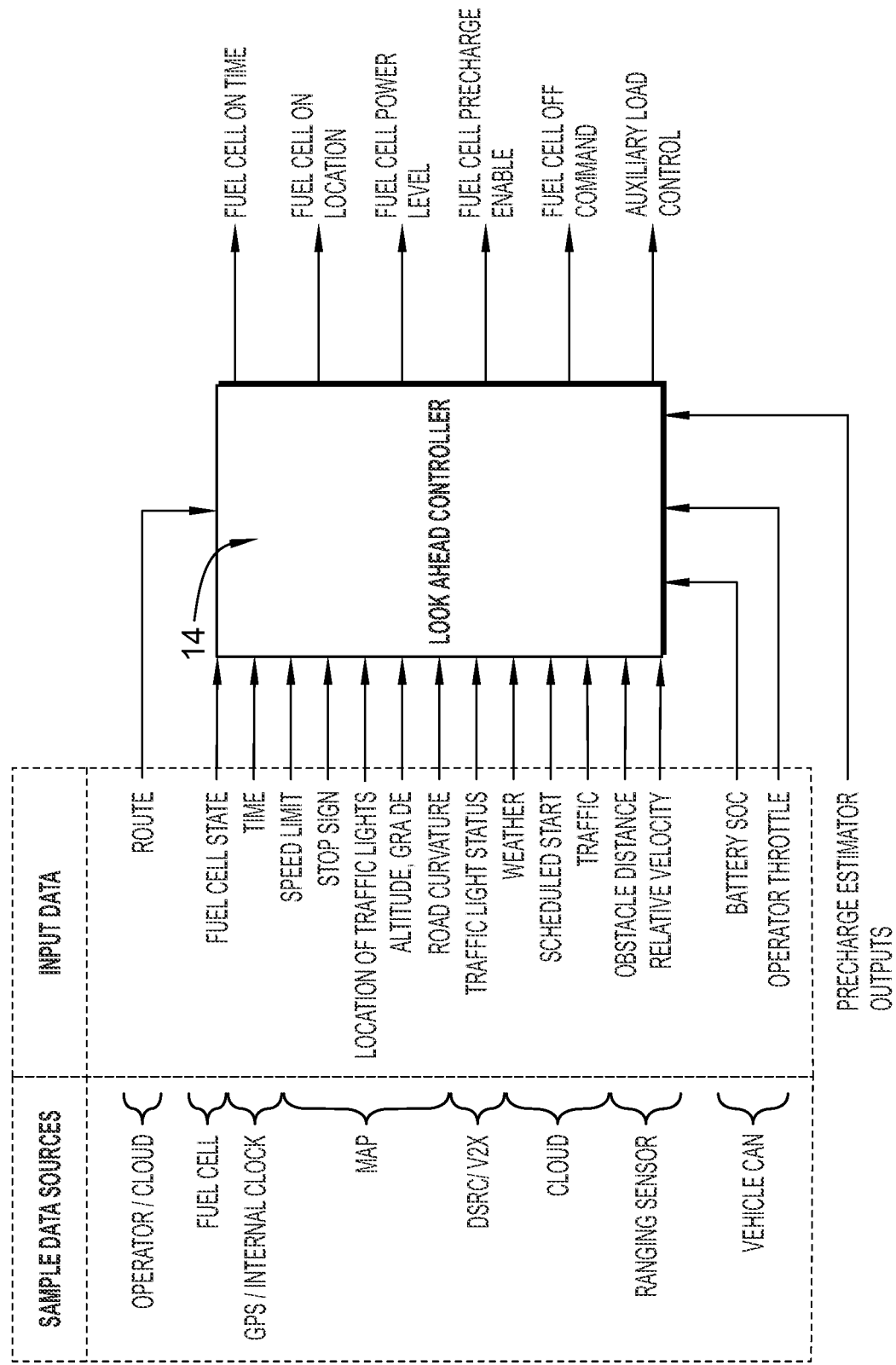
FIG. 4C is a schematic of the information flow of an embodiment of a look ahead controller of the present look ahead energy management and control system and method.

The present look ahead energy management system 10 also enables auxiliary load control and management of parasitic loads (see FIGS. 4B and 4C). For example, auxiliary load may be modulated by the powertrain control to manage the net load on the fuel cell systems. This is done in order to minimize the number of power cycle events. A system level energy management controller, such as the look ahead controller 14, can use auxiliary loads as a control lever. For example, the present look ahead energy management system 10 can increase or decrease the auxiliary power draw in a vehicle 200, fuel cell system 100, or powertrain 20 by modulating the cabin cooling system (since cabin temperatures are still bound by some operator determined limits). Such modulation of the power drawn by auxiliary loads can enable the fuel cell system 100 to remain turned on without the need to unnecessarily power cycle the fuel cell stack 120, which is irreparably damaging to fuel cell systems 100 (see FIGS. 4B and 4C).

Further, the look ahead energy management system 10 of the present disclosure also solves several problems presented by current fuel cell systems 100 in vehicular applications. For example, the present look ahead energy management system 10 is able to achieve cost effective battery and fuel cell sizing by predicting transients and managing power. In addition, the instant look ahead energy management system 10 improves fuel cell system 100 component life by reducing transient loads and number of times the fuel cell 110 goes through startup. The present look ahead energy management system 10 also reduces hydrogen wastage by smartly precharging the circuit. Further, the present look ahead energy management system 10 provides a methodology for optimal management of the air handling subsystem 126 and/or circuit of a fuel cell system 100 in order to reduce and/or prevent parasitic loads.

In addition, the look ahead energy management system 10 and method of the present disclosure also provides three additional components or subsystems to aid in the improved performance and increased duration of life of a fuel cell 110, a fuel cell stack 120 and/or a fuel cell system 100. More specifically, the present look ahead energy management system 10 and method further comprises: 1) precharging of the air handling subsystem of the fuel cell system, 2) peak shaving for electric or hybrid vehicles, 3) a cold starting solution for fuel cell systems, and 4) a purge control mechanism or subsystem. Each of these features of the present look ahead energy management system 10 aid in improved fuel cell system 100 performance during transient operation, improved fuel cell life or duration, overnight freeze protection of fuel cell, and/or overall customer convenience and satisfaction (see FIGS. 5A, 5B, and 6).

Figure 5A:
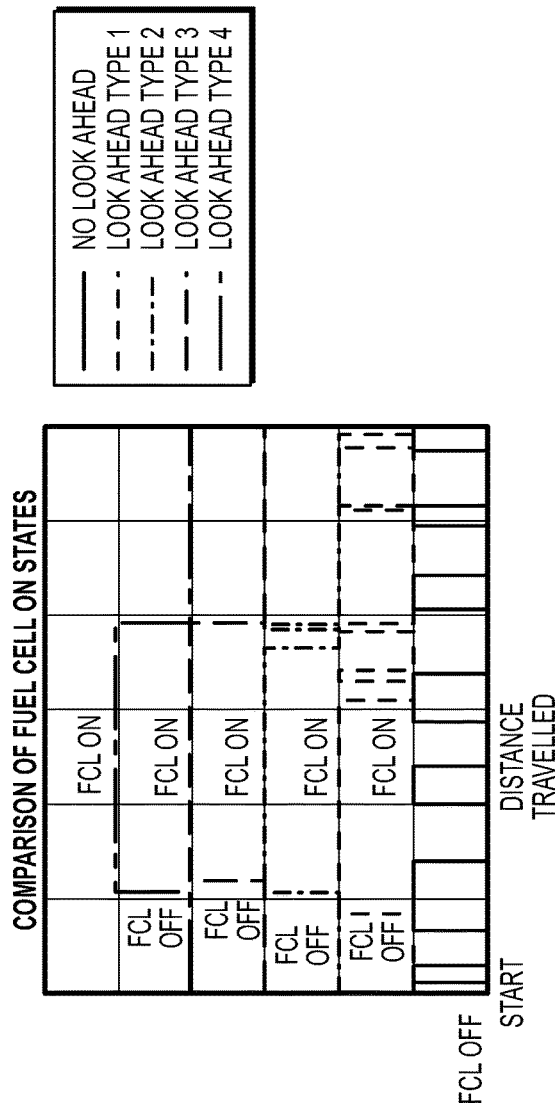
FIG. 5A is a graph demonstrating the effect of look ahead technology data on the number of times the fuel cell needs to be turned on to complete a duty cycle.
Figure 5B:
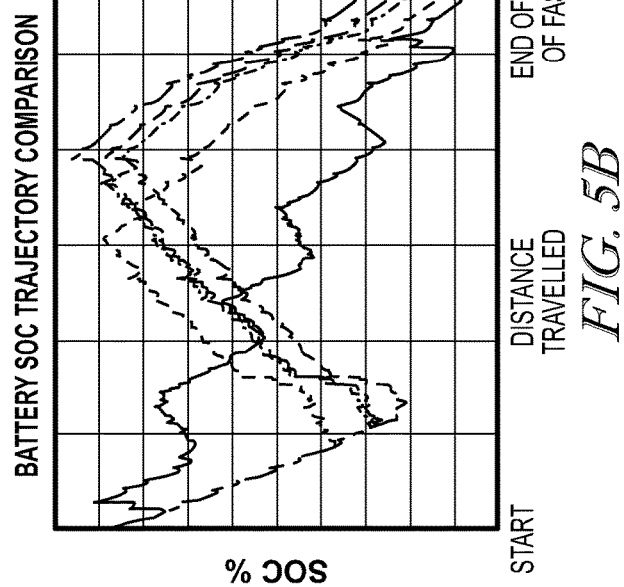
FIG. 5B is a graph demonstrating the effect of the type of look ahead technology sensor data on the number of times the fuel cell needs to be turned on to complete a duty cycle.
Figure 6:
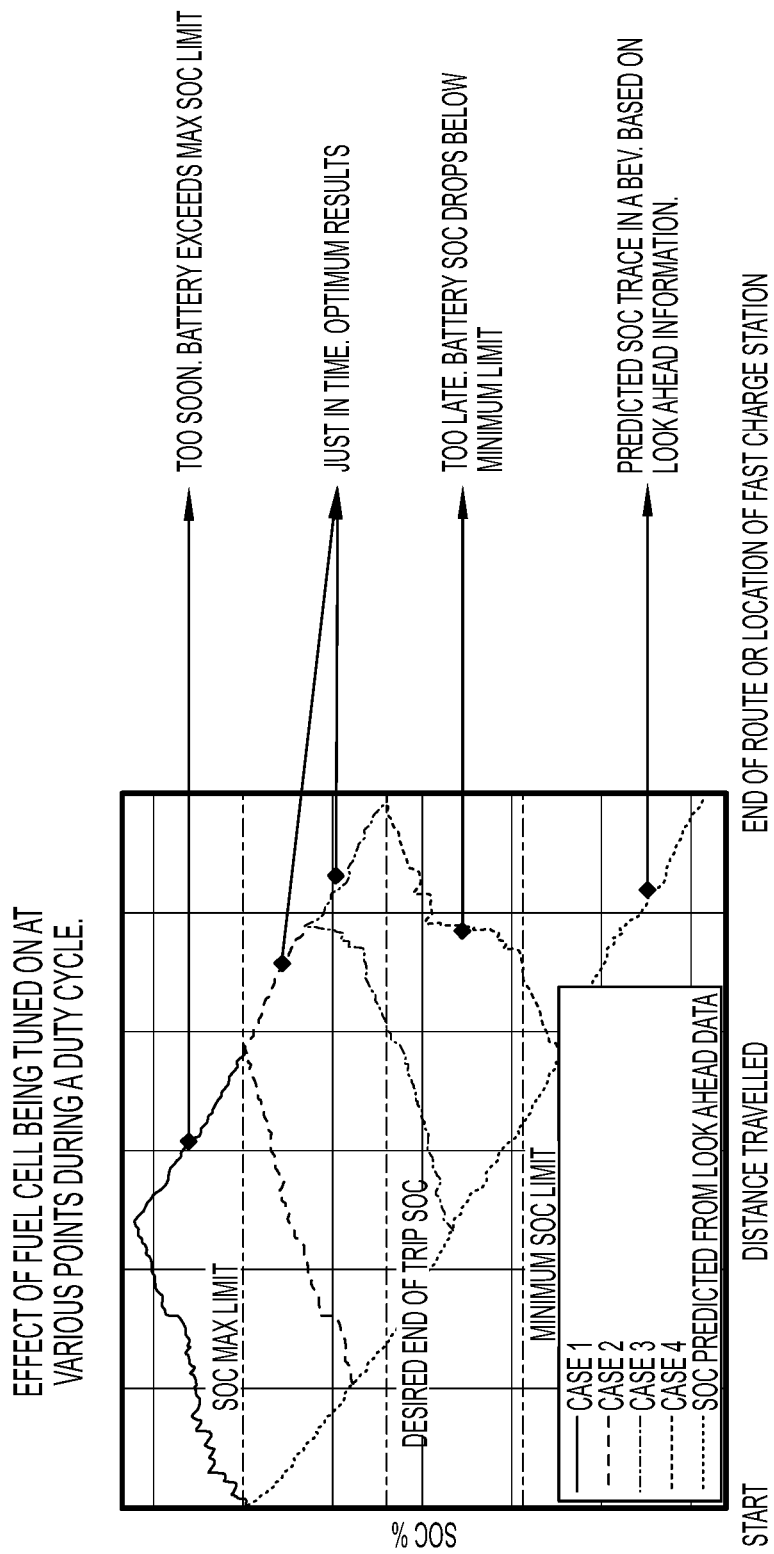
FIG. 6 is a graph demonstrating the effect of look ahead weather or traffic technology data on the number of times the fuel cell needs to be turned on to complete a duty cycle.

For example, the present disclosure demonstrates the effect of the present look ahead energy management system and method 10 and the different types of look ahead data or information 12 (e.g., Types 1, 2, 3, and 4) on the number of times the fuel cell 110 must be turned on to complete a duty cycle (see FIG. 5A). In addition, the different types of look ahead data correspond to information 12 collected and/or obtained from one or more different and progressively more advanced sensors 228 or sensor suites (e.g., multiple sensors comprised in a sensor package) being present on the vehicle 200, powertrain 20, or fuel cell system 100. More specifically, a Type 1 sensor suite may correspond to look ahead data or information 12 that is collected and/or obtained from one or more of the least advanced or specialized sensors 228 (e.g., a GPS sensor and/or an offline map) while a Type 4 sensor may correspond to look ahead data or information 12 that is collected and/or obtained from one or more of the most advanced or specialized sensors 228 (e.g., a RADAR, a camera, a vehicle to vehicle communication (e.g., V2X), online maps that may or may not provide real-time traffic information, etc.; see FIG. 5B).

One or more different sensors 228 or sensor types may be comprised in a sensor suite used on a single vehicle 200 or fuel cell system 100. For example, a vehicle having a Type 4 sensor suite, may comprise one or more Type 4 sensors 228, as well as one or more Type 1, 2, or 3 sensors 228. Moreover, FIG. 6 demonstrates when look ahead data comprises information 12 on route and/or traffic conditions (e.g., grade, speed limit etc.), a reasonable estimate or prediction can be made on the state of charge (SOC) trajectory of a vehicle 200 (while assuming the vehicle to be a FCEV or a BEV), such as the variation of the fuel cell 110 and/or the battery 220 state of charge (SOC) with time. This look ahead prediction or estimate about the fuel cell 110 can further predict and/or estimate optimal instances to turn on the fuel cell 110 during a route or duty cycle (see FIGS. 4-6).

A "tip-in" event is an event that occurs when the throttle of a vehicle 200 is pressed to request or require more power from the driveline (see FIGS. 7A and 7B). Typically, a "tip-in" event occurs in response to a steep or sudden demand for power or increase in power demand, such as a power demand from the powertrain 20 in a vehicular application. Such a "tip-in" event may be in response to a need to accelerate a vehicle 20 or counter effects of road inclination encountered by a user or vehicle operator (see FIGS. 7A and 7B).

For example, an increased power demand leading to a "tip-in" event may be generated either by a vehicle operator or by the vehicle's control system, such that a power demand may or may not be in response to a user or operator (e.g., pressing down on the throttle pedal; see FIGS. 7A and 7B). Alternatively, an operator may request peak performance when pulling away from a stop or overtaking maneuvers. Similarly, the powertrain control may request for a steep increase in power demand owing to auxiliary loads or to maintain vehicle speed during cruise operation whilst climbing a grade or incline.

The present look ahead energy management system and method 10 is an anticipatory system and method meaning it is designed to control a pre-"tip-in" event (see FIGS. 7A and 7B). For example, the present look ahead energy management system and method 10 utilizes sensors to predict future power demands or future-"tip-in" events. The look ahead energy management system and method 10 of the present disclosure also enables optimal operation of a fuel cell system 100 or stack 120 in response to or after a "tip-in" event. Therefore, the present look ahead energy management system and method 10 is also a reactionary system and method, since it also responds to post-"tip-in" events (see FIGS. 7A and 7B).

A Precharge Subsystem, Component, or Module for the Look Ahead Energy Management and Control System and Method An intelligent look ahead energy management system 10 of the present disclosure may further comprise a precharge subsystem or module 400. A precharge module ("precharge") or a process of precharging the air handling subsystem 126 of a fuel cell system 100 refers to an anticipatory increase of air flow to the fuel cell 110 to prevent any transient response (see FIGS. 7A-8A). More specifically, pure oxygen or air 124 is preemptively provided to the fuel cell 110 at high levels prior to operation of the fuel cell 110 in order to avoid the measureable time delay of delivery of oxygen (via air) 124 to the fuel cell 110, stack 120, or system 100 by the air handling subsystems 126, which leads to transients. An air 124 starved fuel cell 110 produces less power, thus exposing the accompanying battery 220 to higher demands and C rates to compensate for the increased transient demand. Therefore, precharging is also an anticipatory method that may be used in the present look ahead energy management system 10 or method to prevent or reduce transients, and therefore extend life and duration of a fuel cell stack 120 or system 100.

Figure 8A:
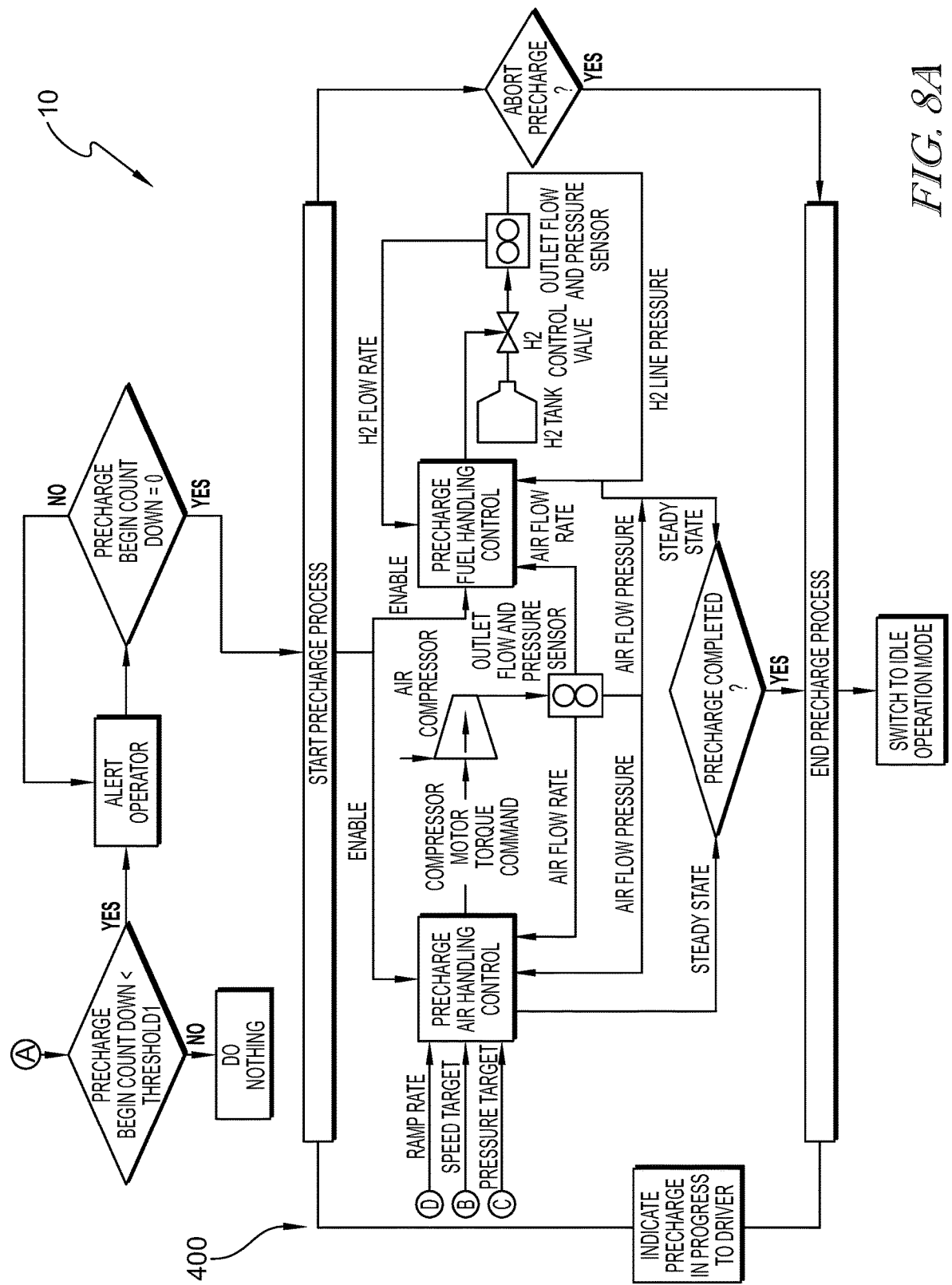
FIG. 8A is a detailed flow chart of an embodiment of the present precharging subsystem and method.
Figure 8B:
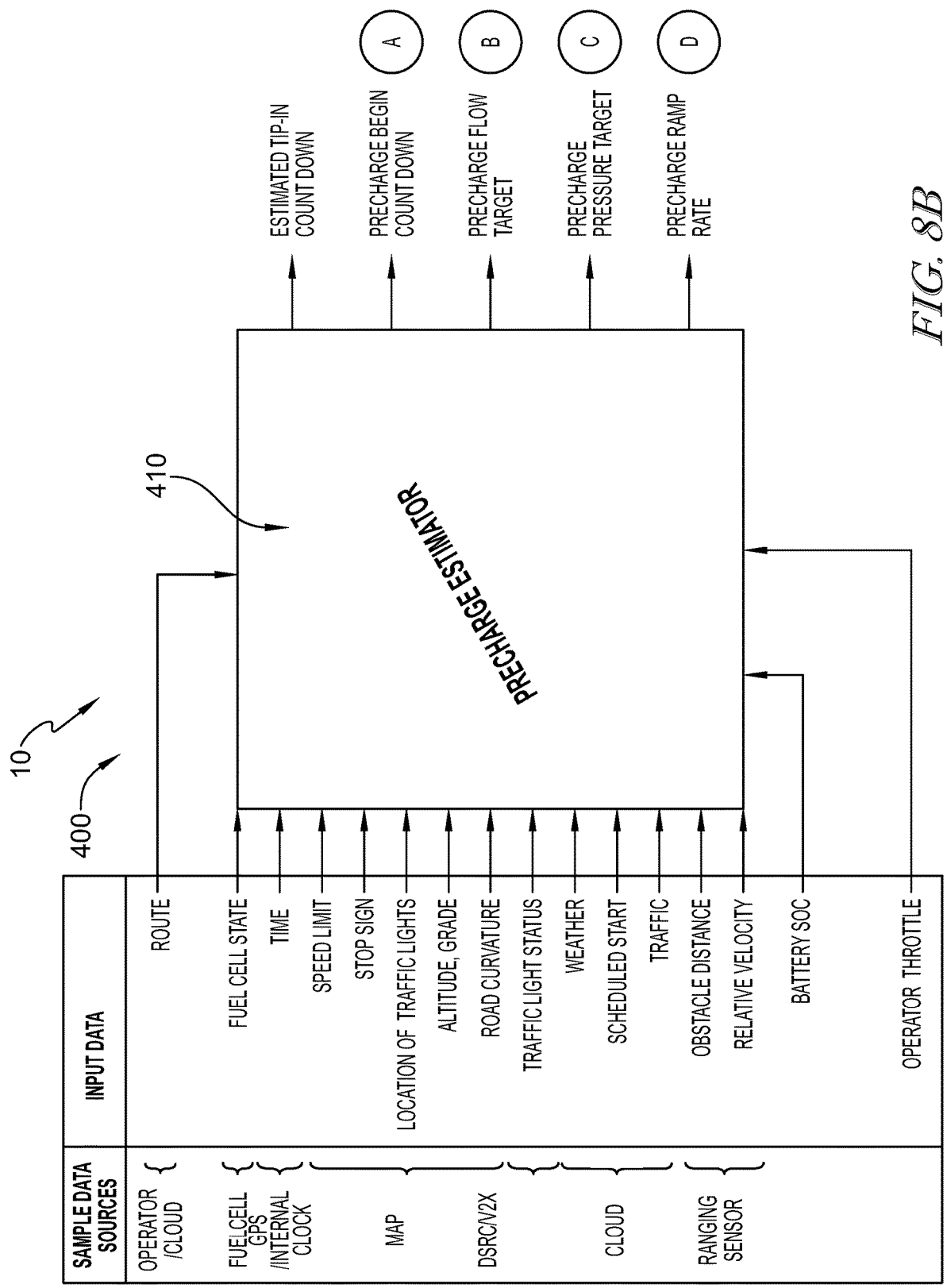
FIG. 8B is a schematic of the information flow of an embodiment of a precharge estimator of the precharge subsystem of the present look ahead energy management and control system and method.

More specifically, precharging refers to a method or process 400 of preemptively increasing the mass flow rate and/or pressure of air flowing though the fuel cell system 100 in anticipation of an upcoming transient event (see FIGS. 8A and 8B). The purpose of precharging the air handling subsystem 126 is in order to preemptively control the air flow into the fuel cell system 100 in order to increase the concentration of excess oxygen ($O_2$) 124 inside the fuel cell stack 120. Increased excess oxygen 124 concentration in the fuel cell stack 120 is directly related to the rate at which the power output from the fuel cell 110 can be ramped up and generated. Thus, the more available $O_2$ 124 for the electrochemical reaction, the better improved is the fuel cell's capability to overcome transients, particularly those directed related to delay in air or oxygen 124 delivery to the fuel cell 110.

By incorporating available look ahead data and information 12, precharging of the fuel cell 110 or fuel cell system 100 is achieved by spooling up the compressor 240 of a fuel cell system 100 to a desired pressure and flow point, often using stored energy from a secondary power source (e.g., a battery 220; see FIGS. 8A and 8B). This precharging of the fuel cell 110 by the battery 220 provides faster and guaranteed power availability from the fuel cell 110 when demanded. This step of precharging the fuel cell system 100 as incorporated in the present look ahead energy management system 10 and method also reduces hydrogen wastage, enables smaller battery size in hybrid applications, better durability of both the fuel cell 110 and the battery 220, and improved life of the fuel cell system 100 by reducing transient loads and the number of times the fuel 122 cell goes through startup (i.e., reduced powercycling, etc., see FIGS. 8A and 8B).

Similar to the use and incorporation of sensors 228 into the present look ahead energy management systems 10, sensors 228 are particularly useful to precharging the fuel cell system 100. More specifically, the prediction of the power demand by a fuel cell system 100, and particularly the oxygen 124 demand for that fuel cell system 100, may be facilitated and/or enabled by sensors (e.g., look ahead sensors) 228. Look ahead sensors 228 may be used independently, in elated to, or configured to be coupled with an data source, including but not limited to maps, GPS, cameras, radar, vehicle to vehicle infrastructure (V2X), dedicated short range communications (DSRC), artificial intelligence (AI), Internet of Things (IoT), and other systems comprising look ahead data and technologies (see FIG. 8B). In one embodiment, internally or externally mounted cameras (e.g., sensors) 228 on the fuel cell stack 120 or system 100 or vehicle 200 can detect visual cues and/or predict "tip in" events (see FIGS. 7-8).

Figure 9:
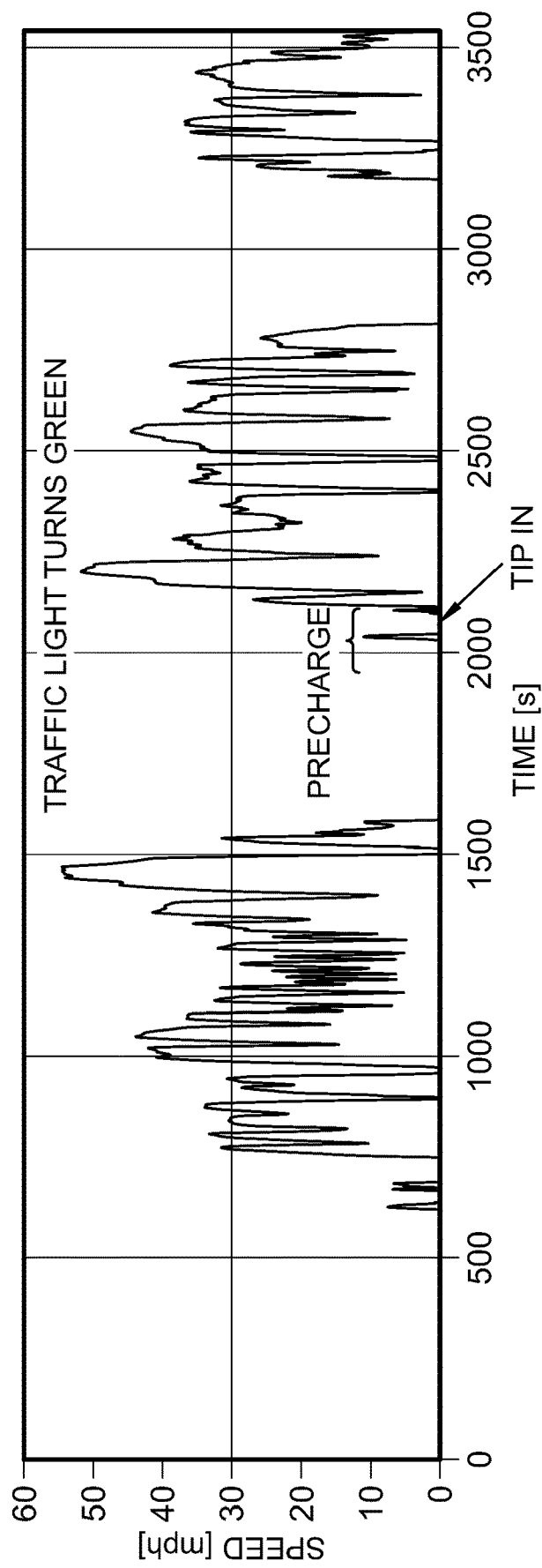
FIG. 9 is a graph demonstrating the effect of look ahead weather or traffic technology data on the precharging ability of the fuel cell system to complete a duty cycle.

In another embodiment, sensors 228 coupled with DSRC and/or V2X systems may feed information into the look ahead energy management system 10 via a precharge estimator 410 in order to provide and/or predict "tip in" events by communicating directly or indirectly with traffic lights and the fuel cell system 100 or controller 14 of a vehicle 200 (see FIGS. 8B and 9). Armed with any relevant look ahead data or technology information 12, a process of precharging the fuel cell system 100 based on the look ahead data may be performed in anticipation of imminent increases in power levels (see FIGS. 7-9). For example, a FCEV 200 operating at a cruise speed that is sustaining charge may incorporate look ahead data indicating that a steep positive grade is upcoming, which can prompt, initiative, or enable a precharge of the fuel cell 110 to timely ramp up power output in order to meet the near future increased power demand without experiencing any transients or delay of power output from the fuel cell system 100 (see FIG. 9). This anticipatory air flow ramp up that occurs during the precharge stage may increase power output of the fuel cell system 100 by increasing oxygen 124 supply and/or reducing hydrogen supply.

Implementation of an exemplary look ahead energy management system 10 comprises preemptively charging or precharging ("precharge" or "PreCharge") the air handling circuit or subsystem of a fuel cell system 100. This precharged look ahead energy management system 10 and method may lead to a small increase in the overall energy consumption required by the fuel cell system 100. However, the following benefits of the present look ahead energy management system 10 outweighs any cost or energy detriment. In particular, precharging the fuel cell system 100 helps reduce the net transients on the fuel cell system 100 and the battery system 128 due to reduced C rate required for the battery 220 and reduced or prevented delay in air delivery to the fuel cell system 100. Precharging also results in less powercycling encountered by the fuel cell system 100 resulting in prolonged and extended life and durability for the fuel cell system 100.

Importantly, the intelligent look ahead energy management system 10 of the present disclosure comprises a precharge system 400 with a look ahead logic or algorithm that allows precise prediction of the required duration to precharge a fuel cell system 100 (see FIGS. 8-9). This precharge prediction capability of the present look ahead energy management system 10 provides several advantages over simple precharge logic comprising spooling up of a compressor 240 without utilization or incorporation of look ahead data or information 12, which does not guarantee on demand power availability and requires significant hydrogen, which is expensive. Additionally, a simple spool up logic that does not consider the future power demands provided by look ahead data and information 12 may expose the fuel cell system 100 to more transients related to startup or changing operation points and adversely affect the life of the fuel cell system 100 componentry. The present look ahead energy management system 10 comprising the precharging process or subsystem avoids these downfalls of current systems.

Figure 10A:
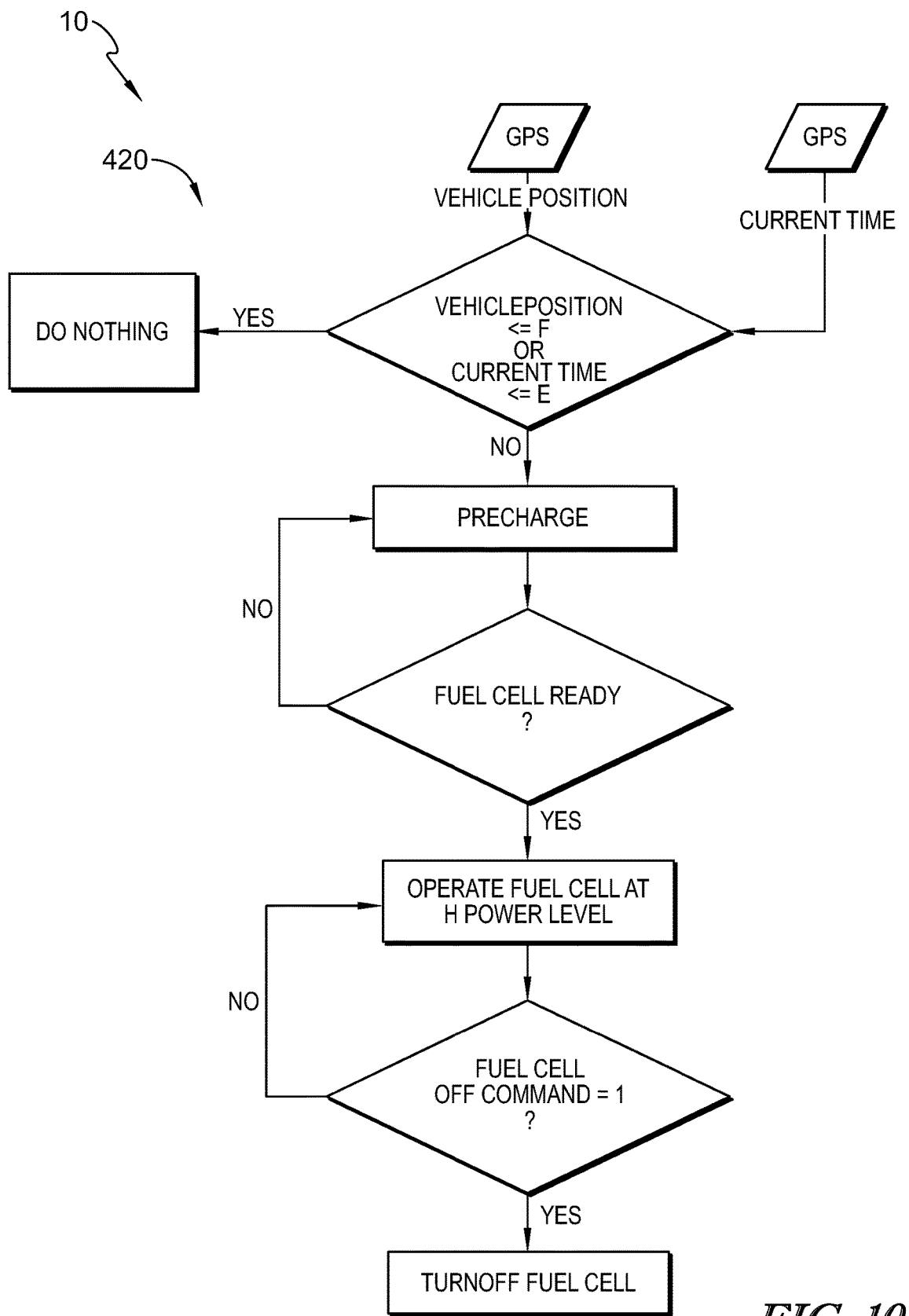
FIG. 10A is a detailed flow chart of an embodiment of the present peak shaving subsystem and method.
Figure 10B:
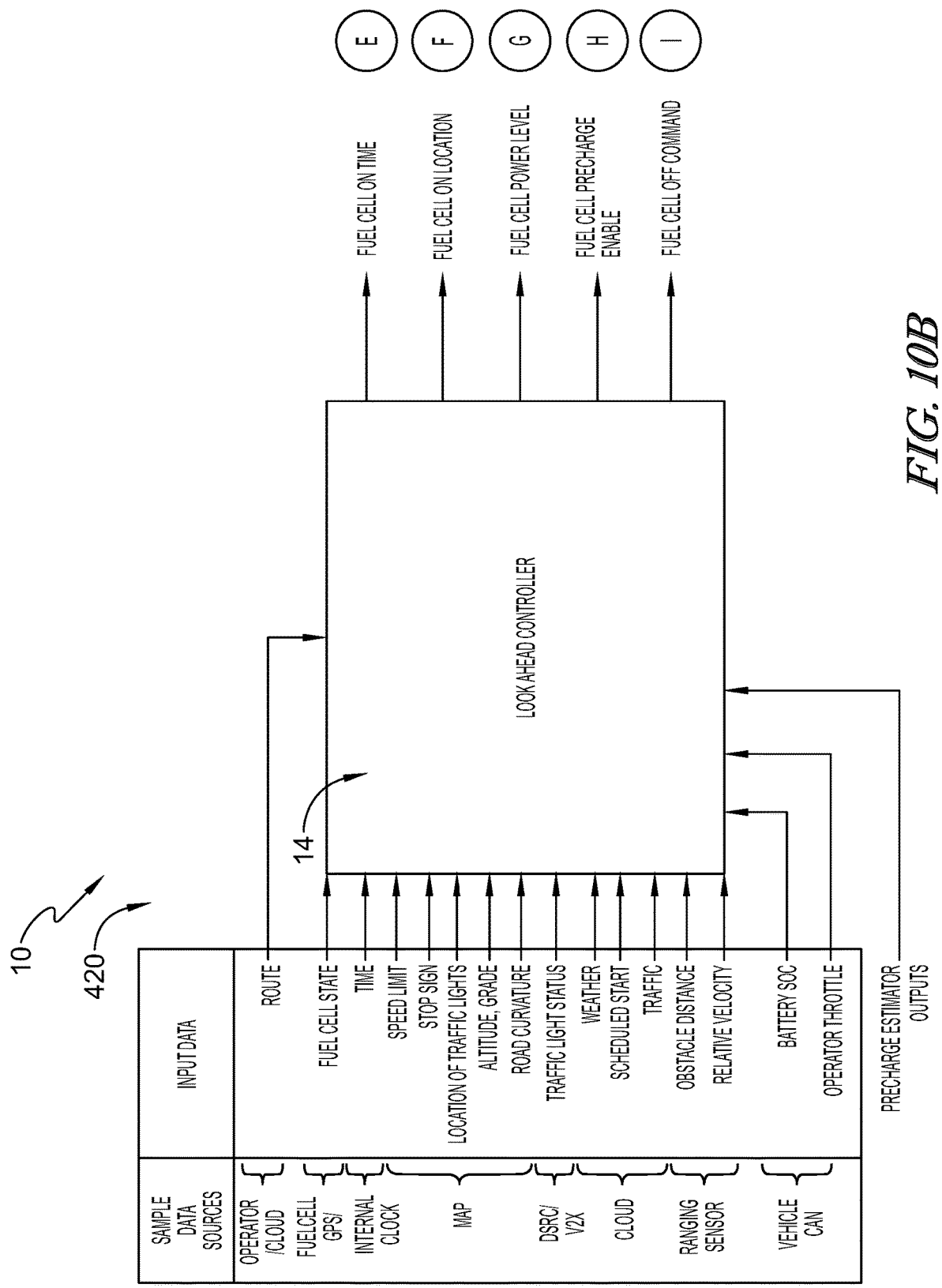
FIG. 10B is a schematic of the information flow of an embodiment of a look ahead controller of the peak shaving subsystem of the present look ahead energy management and control system and method.

A Peak Shaving Subsystem, Component, or Module for the Look Ahead Energy Management and Control System and Method The intelligent look ahead energy management system 10 and method of the present disclosure further comprises a process, method, or module for peak shaving 420. Peak shaving is an anticipatory as well as a reactionary control system that predicts upcoming power demands using real-time or historic look ahead data and engages the fuel cell system 100 to respond to predicted peak loads by altering the behavior of the fuel cell system 100 in response to the look ahead technology data, such as by taking corrective or mitigating action (see FIGS. 10A and 10B). Similar to precharging, which may be incorporated in embodiments of a peak shaving process 420 of the present disclosure, peak shaving particularly relies on sensor data providing real-time or current information.

Notably, peak shaving requires incorporation of specific look ahead data and technology. For peak shaving, specific sensor and/or look ahead data related to traffic conditions, including, but not limited to vehicle locations, obstructions, stop lights or signs, inclines, declines, etc. are particularly relevant (see FIGS. 10A and 10B). More specifically, traffic related look ahead data and technology 12 comprised in peak shaving, typically provided by online or cloud capability to a look ahead controller 14, enables the fuel cell system 100 to locate and orient itself with respect to current, upcoming, or future traffic conditions in order to maximize efficiency and performance of the fuel cell system 100. Moreover, use of sensors 228 in the peak shaving method or module enables the fuel cell system 100 to: 1) determine optimal time, duration and power level to operate the fuel cell 110 to maximize component life, 2) determine optimum strategy for power split between the fuel cell 110 and battery 220 in a hybrid system 200, and 3) maintain battery depth of discharge within desirable levels (see FIGS. 10A and 10B).

Figure 11:
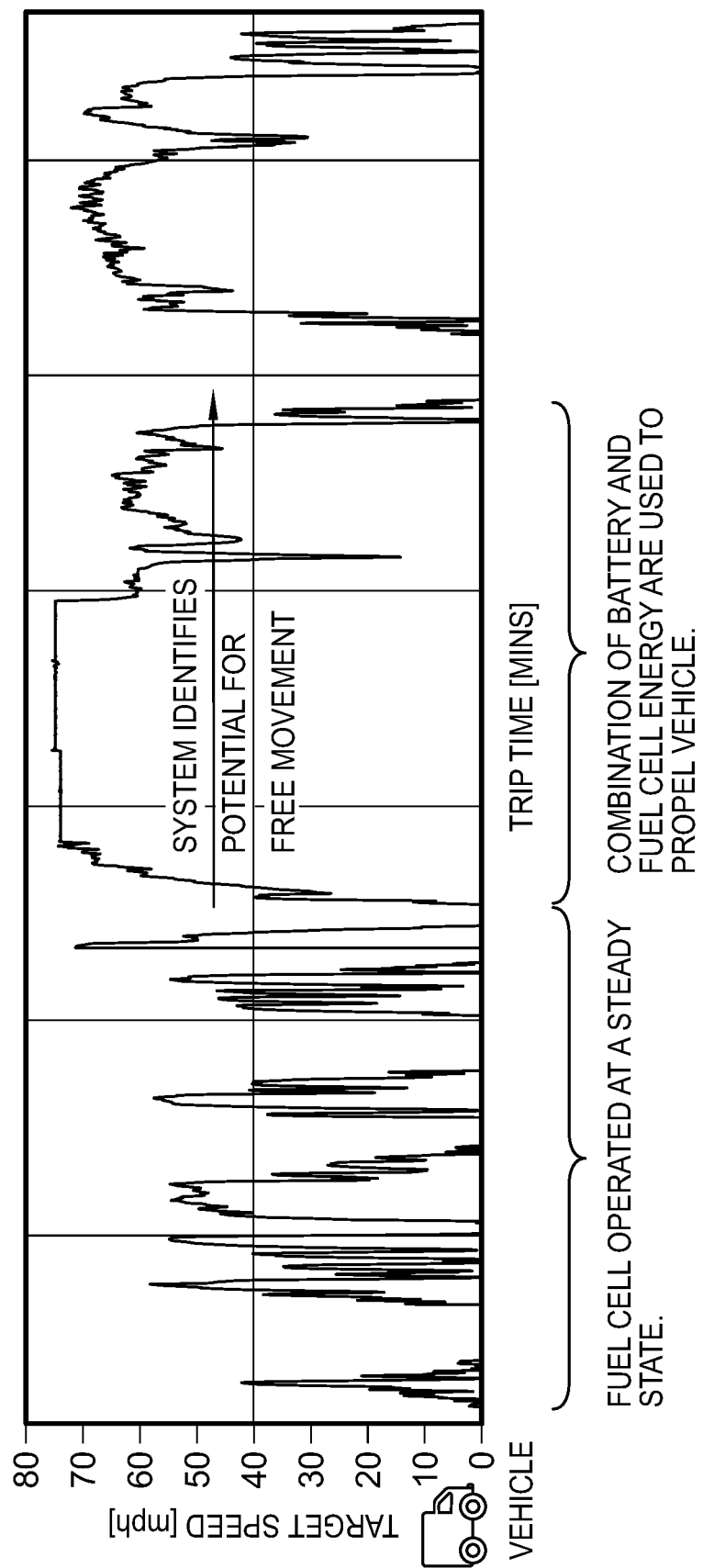
FIG. 11 is a graph demonstrating the effect of look ahead weather or traffic technology data on the peak shaving ability of the fuel cell system and battery to complete a duty cycle.

In one embodiment, use of sensors 228, such as onboard look ahead sensors 228, independently or in combination with other/different look ahead data enables the fuel cell system to identify or recognize if its powertrain 20 or vehicle 200 is in or is predicted to be in a high traffic scenario (see FIG. 11). Remote or onboard look ahead sensors 228 or ranging sensors 228 may detect and/or provide an estimate of presence of surrounding vehicles 200 and their speeds. In one embodiment, GPS positioning along with cloud-based traffic data (e.g., via V2X or DSRC) 12 can be used or incorporated into the present look ahead energy management system 10 to determine if any fuel cell electric vehicle (FCEV) 200 is in or is predicted to be in a high traffic scenario. For example, conditions where the vehicle 200 will need to repeatedly accelerate and decelerate are also conditions where high peak and high transient conditions are expected to be encountered by a fuel cell system 100 (see FIG. 11).

Under such high peak or high transient driving or performance conditions, fuel cell systems 100 continue to operate at a set constant operation point, so that the peak load on the battery 220 is reduced. However, when the vehicle 200 is stationary, the power from the fuel cell 110 charges the battery 220 and runs accessories. When decelerating and regeneration, the fuel cell 110 is disconnected from the DC bus. Accordingly, the intelligent look ahead energy management system 10 of the present disclosure is able to predict when peak loads may be encountered (e.g., high traffic and/or 'stop-and-go' conditions are in progress or upcoming, increased slope in the road, such as when climbing a hill, or when auxiliary loads are turned on in the system) and can take mitigating and/or corrective and actionable steps to reduce the peak loads on the fuel cell 110 and battery 220 caused by repeated acceleration (i.e., ramp up of the fuel cell system) and braking (i.e., ramp down of the fuel cell system; see FIG. 11), such as by determining and/or implementing a speed or acceleration/deceleration rate of the vehicle 200 that will reduce the stress on the fuel cell system 100.

The presence or potential for high peak and/or high transient conditions are identified by the present look ahead energy management system or methods 10 and peak shaving techniques are applied, particularly techniques related to FCEVs 200. These peak shaving techniques result in reduction of power demand from the battery 220 at "tip-in" and also protects the battery 220, as well as the fuel cell 110 from transients. This reduction or prevention of transients encountered or experienced by the fuel cell 110 improved fuel cell performance, promotes fuel cell durability, and extended fuel cell life.

As such, the present look ahead energy management system 10 comprising peak shaving solves several problems of current technologies. In particular, the present system 10 derives benefit from reduction in transients by predicting upcoming transients (anticipatory) and altering the behavior of the fuel cell system 100 in response to the look ahead technology data 12 by taking corrective steps to reduce or prevent transients (reactionary). The shaving of peak load on the battery 220 by optimizing performance of the fuel cell system 100 also mitigates negative impacts on battery 220 life by reducing the net battery throughput (see FIG. 11). In addition, peak shaving helps achieve cost effective battery 220 and fuel cell 110 sizing for any hybrid vehicle system 200 by predicting transients and managing power split between the fuel cell 110 and battery 220 components. Finally, peak shaving of the present look ahead energy management system 10 reduces hydrogen wastage, reduces parasitic loads, and minimizes or prevents fuel cell 110 exposure to air 124 or pressure transients that negatively impacts performance and efficiency.

A Cold Start Subsystem, Component, or Module for the Look Ahead Energy Management and Control System and Method The intelligent look ahead energy management system and method 10 of the present disclosure may further comprise a process, method, or module for cold starting 430. Cold starting is an anticipatory control system or process that enables the start or initiation of a fuel cell system 100 when the fuel cell system 100 or vehicle 200 has not been operated, started, used, or has been parked over extended periods of time in a cold environment (see FIGS. 12A and 12B). Depending on the size and capacity of the fuel cell 110 and the weather, an extended period of time of nonoperation of a fuel cell system 100 or vehicle 200 prompting cold start may be any time period. Often, an extended period of time of nonoperation of a fuel cell system 100 or vehicle 200 may range from about 1 to about 24 hours, about 2 to about 20 hours, about 3 to about 10 hours, or any specific time period specified within these ranges, such as overnight or about 10 to about 12 hours. Similar to precharging, which may be incorporated in embodiments of a cold starting process of the present disclosure, cold starting particularly relies on data 12 received from cloud-based technologies to provide real-time or current information 12.

Cloud-based data or technologies of the present disclosure refers to information 12 transmitted or provided "over the air" and/or information 12 made available to the fuel cell system 100 or vehicle 200 about weather and/or traffic conditions. In some embodiments, look ahead data or technology 12 is also provided online, "over the air," or without wires or physical connections. As such, many embodiments of look ahead data 12 comprised in the energy management system 10 of the present disclosure, including any precharging, peak shaving, or cold starting modules or programs, are synonymous and/or interchangeable with cloud-based data, information, or technology 12.

The ability to cold start a fuel cell system 100, such as one comprised in a hybrid electric vehicle (e.g., FCEV) 200, is critical to maintain and/or extend life of a fuel cell 110. Since most fuel cells 110 operate at high temperatures (ranging from about 60° C. to about 1000° C., particularly PEMFCs 110, which typically operate from about 60° C. to about 100° C.), fuel cells 110 tend to freeze and become inoperable when stored or kept at cold temperatures, particularly temperatures that drop below freezing. When a fuel cell 110 turns on and is operated at a regular, expected, and/or desired operational level, it charges the battery 220.

However, even battery performance becomes suboptimal at low, cold, or freezing temperatures. At sufficiently low temperatures (e.g., beginning at about 0° C. to about −20° C. or about 5° C. to about −20° C., including any specific temperatures within these ranges), the power output and performance of batteries 220 becomes insufficient and falls below the required threshold to cold start the fuel cell 110. Importantly, at or below −20° C., the power output and performance of a battery 220 is completely diminished, such that the battery 220 is practically unusable at such low temperatures. Accordingly, what results at freezing temperatures is that the fuel cell 110 and battery 220 energy or power sources onboard any hybrid application (e.g., a vehicle) 200 are unable to bootstrap and/or jumpstart each other.

Figure 12A:
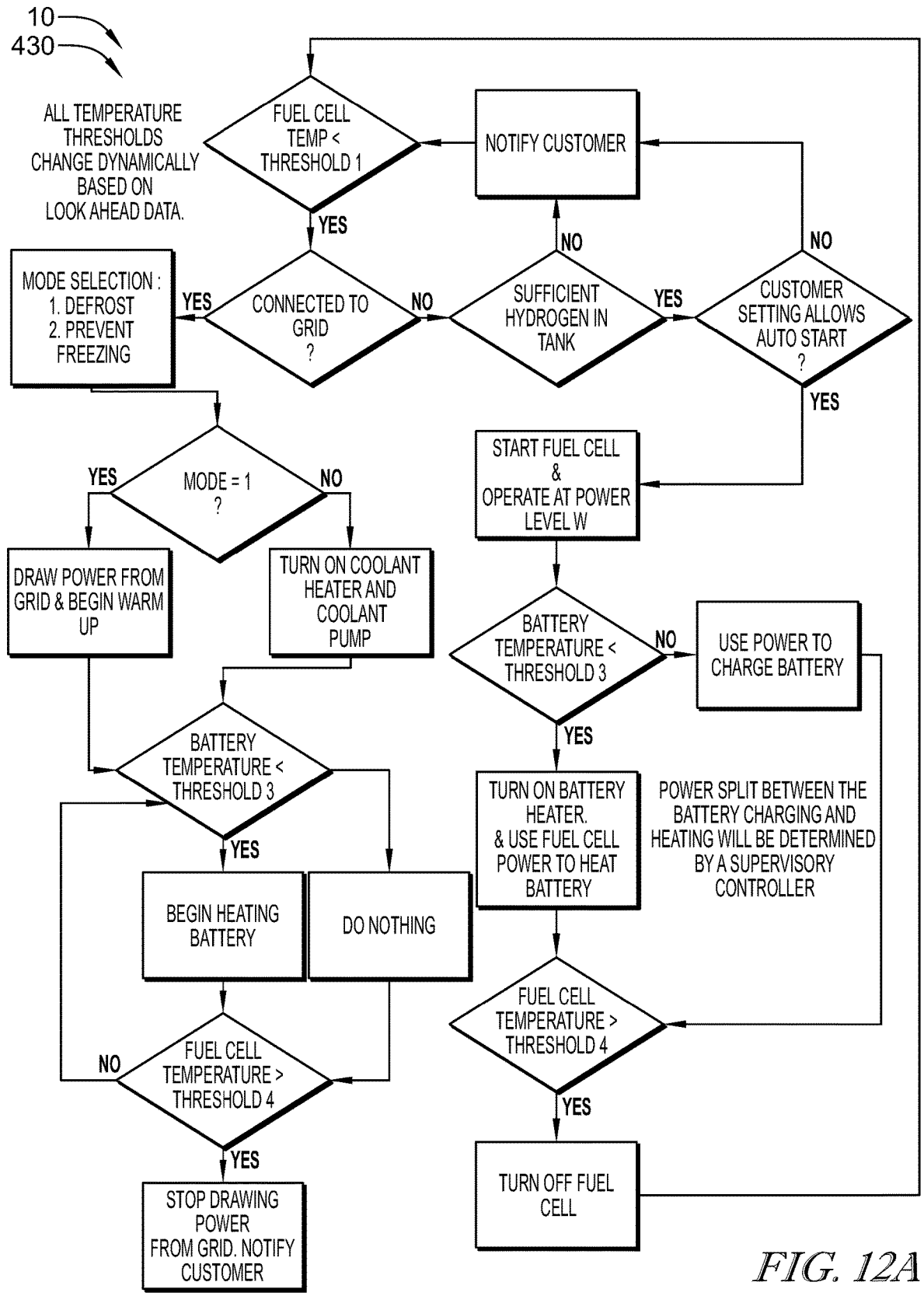
FIG. 12A is a detailed flow chart of an embodiment of the present cold start subsystem and method.
Figure 12B:
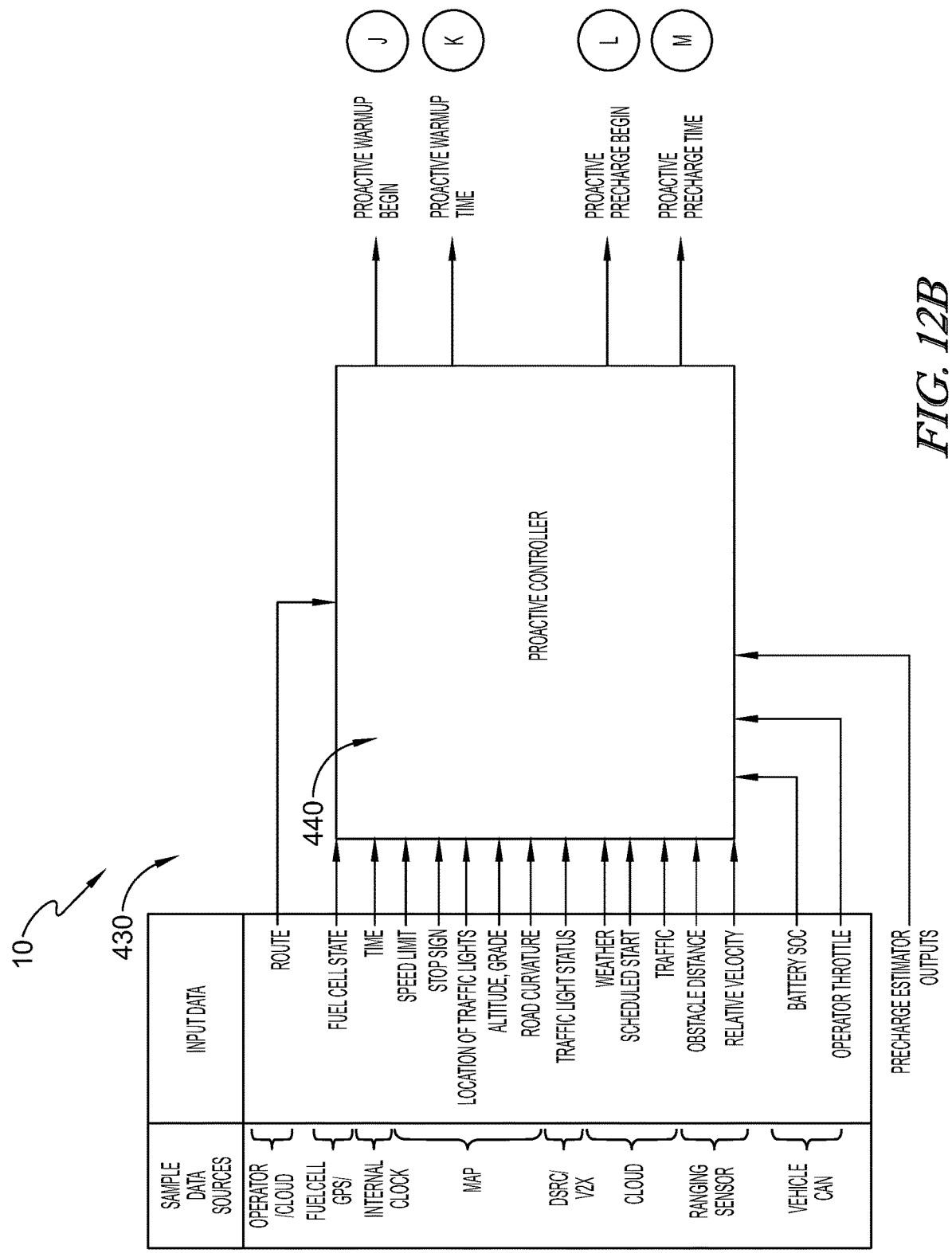
FIG. 12B is a schematic of the information flow of an embodiment of a proactive controller of the cold starting subsystem of the present look ahead energy management and control system and method.

The present look ahead energy management system 10 comprising a cold starting control function, module, or method 430 is used to prevent freezing of fuel cells 110 and/or to defrost or thaw a frozen fuel cell 110 or battery 220 effectively (see FIGS. 12A and 12B). This self-sufficient ability of the present look ahead energy management system 10 to preserve fuel cells 110 at temperatures necessary for proper operation results in improved fuel cell systems 100 and vehicles 200 where the powertrain 20 is seemingly "always on" and ready for immediately operation when required or demanded by a user, system, or operator. Two techniques are comprised by the present cold start subsystem or module of the look ahead energy management system 10 to prevent fuel cell systems 100 from freezing.

First, cold starting of the present fuel cell system 100 comprises preventing freezing of a fuel cell 110 by maintaining the core operational temperature of the battery 220 and the fuel cell 110 by periodically, manually, automatically, or electronically turning on the fuel cell system 100 when the fuel cell system 100 is at reduced operation or not in operation at all, such as when a vehicle 200 is parked. More specifically, the look ahead energy management system 10 of the present disclosure can control the fuel cell system 100 (with or without a controller 14) so as to be turned 'on' when the core temperature of the fuel cell 110 drops below a low temperature threshold value. This low temperature threshold value may be established by the system, entered or input in the look ahead energy management system or controller 14 by a user or an operator based on considerations for efficiency and maximum performance for the fuel cell 110 and/or battery 220, and may comprise any temperature below standard operational temperatures for the fuel cell system 100 or vehicle 200. In addition, a low temperature threshold may be modified by a user, electronically, or automatically (e.g., via a controller 14) based on ambient temperature, weather data, and/or other look ahead data 12 (e.g., information about an upcoming trip, such as the start, stops, or destination of an upcoming trip) to further modify the low temperature threshold. For example, if the internal fuel cell 110 temperature is at or about 10° C., and the preset low temperature threshold of the fuel cell system 100 is at our about 5° C., the present look ahead energy management system 10 or controller 14 may predict, based on look ahead technology data 12, that the fuel cell system 100 or vehicle 200 will begin a trip within a specific time period (e.g., about 15 to about 20 mins start time) that is drawing near, and can modify and/or adjust the low temperature threshold to a higher value at or approaching operational temperatures (e.g., about 60° C.), so that the vehicle 200 is ready for use when the user is ready to operate the fuel cell system 100 or vehicle 200.

Without limitation, the low temperature threshold temperature value to initiate or trigger a cold start process of the present look ahead energy management system 10 may range from about 60° C. to about 90° C. below the standard operational temperature for any particular fuel cell system 100. For an illustrative PEMFC 110, a typical low temperature threshold value to initiate control of the cold start process or system may range from about 60° C. to about 110° C. below a standard 60° C. to 90° C. operational temperature, such that the low temperature threshold ranges from about 0° C. to about −20° C., including any specific temperature comprised therein.

Subsequently, the fuel cell system 100 is turned off when the core temperature of the fuel cell system 100 meets or exceeds a high temperature threshold value. In some embodiments, the high temperature threshold value is the same, similar, at or about the fuel cell system 100 regular operating temperature. Without limitation, the high temperature threshold temperature value to stop or shutdown the cold start process of the present look ahead energy management system 10 may range from about 0° C. to about 50° C. above the standard operational temperature for any particular fuel cell system 100. For an illustrative PEMFC 110, a typical high temperature threshold value to stop or shutdown the cold start process or system may range from about 0° C. to about 50° C. above a standard 60° C. to 90° C. operational temperature, such that the high temperature threshold ranges from about 60° C. to about 140° C., such as from about 60° C. to about 100° C., including any specific temperature comprised therein.

For example, if a vehicle 200 comprising a fuel cell system 100 is parked overnight and the look ahead data 12 comprised within the present look ahead energy management system 10 indicates that the vehicle 200 is not expected to begin service for the next 6-8 hours, the present look ahead energy management system 10 may employ a lower temperature threshold (e.g., from about 5° C. to about 0° C.). However, in this example, if the present look ahead energy management system 10 identifies that the vehicle 200 is scheduled to begin a trip soon (e.g., next 20 mins), it will raise that low temperature threshold to a high temperature threshold within operational temperature range (e.g., about 50° C. to about 90° C., and at least about 50° C. to about 60° C.). Therefore, the low and high temperature thresholds depend on the look ahead information 12 and data available and/or comprised by the present look ahead energy management system 10.

The second technique comprised by the cold start subsystem or module of the present look ahead energy management system 10 to prevent fuel cell systems 100 from freezing is to provide external power to warm the fuel cell 110. This may occur via two modes of operation determined by the present look ahead energy management system 10 or a user, manufacturer, supplier, or operator of a fuel cell 110 or fuel cell system 100. More specifically, use of external power in the present look ahead energy management system 10 comprising cold start may occur by defrosting a frozen or nearly frozen fuel cell 110 or preventing a fuel cell 110 from freezing altogether.

For example, the present cold start module 430 may defrost a frozen fuel cell 110 by using external power sources (e.g., heater) before normal operations of the fuel cell system 100. The defrost operation may be automatically or manually initiated or programmed by a user into a look ahead or proactive controller 440 or a fuel cell control system based on weather look ahead data 12 and information (see FIG. 13). Importantly, timing of defrost fuel cell operations may be preemptively requested or programmed based on predictive weather look ahead data 12 in order to reduce, minimize, or eliminate a time period of freezing experienced or encountered by the fuel cell 110 or fuel cell system 100, which improves performance and/or extends life of a fuel cell 110.

Alternatively, the present cold start module may prevent fuel cell 110 freezing altogether by using external power sources. In this second mode of cold start operations, external power is used to maintain the core temperature of the fuel cell 110 by turning on the coolant based warmup system when the fuel cell's core temperature goes below a low temperature threshold value. Subsequently, the system 100 is turned off when the core temperature exceeds another set high temperature threshold value. Look ahead data 12 and information are used to guide decisions, predictions, and/or estimations of target temperatures, temperature threshold values, and heating power level outputs and inputs in order to most efficiently maintain the fuel cell 110 and battery 220 of any hybrid system 200.

Optionally, the fuel cell output power may be diverted directly to auxiliary loads, external or internal, including but not limited to heating elements (e.g., heaters), cooling elements (e.g., fans 236), and other devices or components to aid in warming the fuel cell 110 and/or battery 220 before, during or while charging them. Such heating and cooling devices (e.g., fans 236) may be located anywhere in the fuel cell system 100. For example, these heating and cooling mechanisms may or may not be comprised in a thermal management subsystem 136 of fuel cell system 100. Importantly, the heating and cooling (e.g., fans) devices of the system 100 and help facilitate heat transfer between the fuel cell 110, the battery 220, and/or other auxiliary components (e.g., heater) in order to increase or maintain the average core temperature of the fuel cell system 100 or vehicle 200 at operational levels.

In some embodiments, the cold start process of the present look ahead energy management system 10 comprising external power use relies on energy from an external power grid. Electric power grid energy may be used to heat and/or circulate coolant through the thermal management subsystem 136 of the present fuel cell system 100. While a self-sufficient embodiment of the thermal management system 136 may require higher hydrogen usage with less wastage, the total self-sufficiency of the system, using look ahead data 12 to control and maintain temperature of the fuel cell stack 120 via the cold start process, helps maximizes the efficiency of the overall fuel cell system 100 and improves usability, convenience, and reliability of the fuel cell system 100 or vehicle 200 by making sure these systems are ready for use precisely when needed by a user or an operator.

Figure 13:
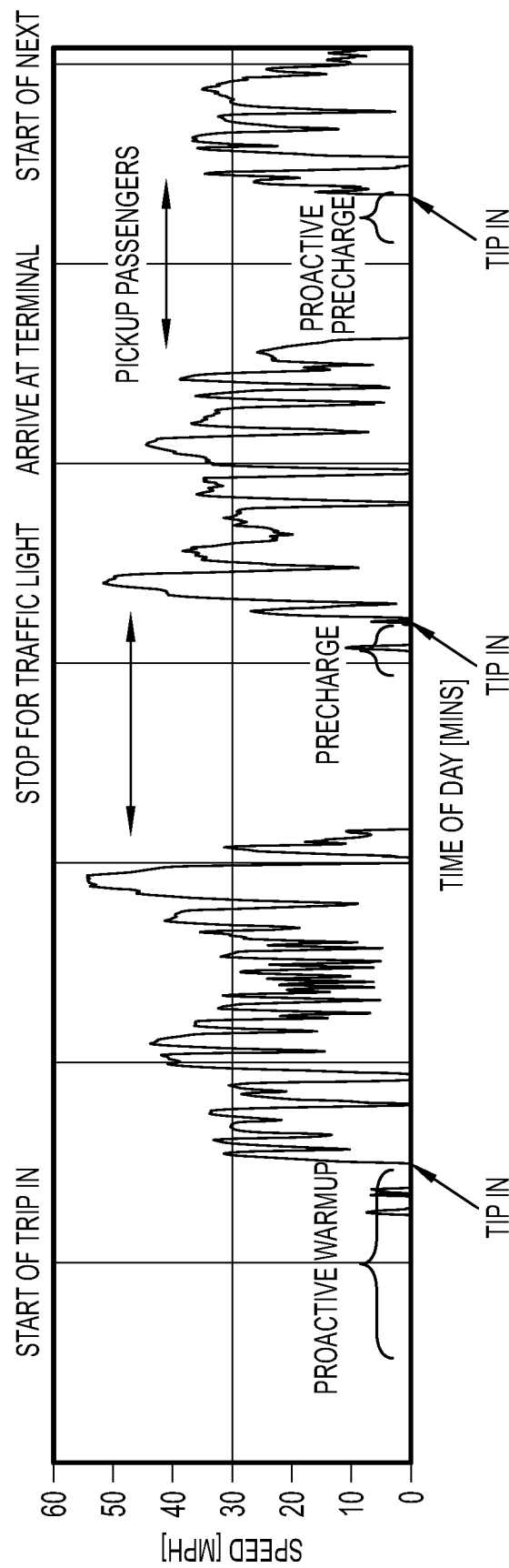
FIG. 13 is a graph demonstrating the effect of look ahead weather or traffic technology data on the cold starting ability, including proactive warmup and precharging, of the fuel cell system and battery to complete a duty cycle.

As shown in FIG. 13, the present cold start method is a preemptive or anticipatory method comprising a proactive warmup process of the fuel cell system 100. One embodiment of the present cold start method may comprise a precharging process, which is also a proactive or anticipatory process (see FIG. 7B). A further embodiment of the present cold start method comprises both a proactive warmup and a proactive precharge.

The proactive warmup process comprises a cloud connected system that uses weather look ahead data 12, expected trip schedule or route information, and internal system calibrations (e.g., sensors 228) to begin warmup of the fuel cell system 100. Proactive precharge refers to a system predictive of scheduled tip-in events that uses duty cycle schedules and connected vehicle 200 technology, independently or in combination, to comprise look ahead data 12 with an expected trip schedule or route information to proactively precharge the fuel cell system 100. Some embodiments of the present cold start module or method have multiple proactive warmups and/or proactive precharges over the course of a single route or duty cycle (see FIG. 13).

Referring to FIG. 13, where a vehicle 200, such as a transit bus, starts its trip at ambient temperature of about −20° C. Via incorporation of look ahead data 12 and information available and assessed by a cloud-connected fuel cell or fuel cell system 100, which is able to recognize the scheduled time for the 'start of trip' and proactively initiate warming up the battery 220 and fuel cell system 100 of the bus in preparation (e.g., proactive warmup). In embodiments where the bus is connected to an external charging or power source (e.g., such as at a charging station), the bus may be able to use the grid power to warmup the battery 220 and fuel cell system 100. Even if the system is not connected to a charging station, the system can still use standard 110 v/220 v AC power to being the warmup.

Therefore, no power from the fuel cell 110 or battery 220, which is somewhat limited by the closed bus system embodiment, is wasted for the proactive warmup. Instead, power from an external power source is utilized. In addition to the current capacity of any grid connection, using weather and bus schedule data, the look ahead energy management 10 and cold start system is able to predict the optimum lead-time to start warmup of the bus in preparation for on-time departure at maximum power load demand (see FIG. 13).

Additionally, as the bus waits to pick up passengers and depart on for its next destination as provided via look ahead data 12 and information, the bus is able to begin precharging the fuel cell in anticipation of ramp-up of the power supply prior to sudden or increased power demand from the driver (see FIG. 13). A similar system can also be used in any vehicular application 200, such as a delivery truck application, where knowledge of delivery locations and average delivery times is provided via look ahead data 12 and may be comprised in the present cold start process comprising proactive warming and/or precharging of the fuel cell system 100.

In one embodiment, a system based control of the vehicle 200 may be implemented before, during, and after operation of any fuel cell system 100 comprised therein. The fuel cell system 100 may target a dynamic coolant temperature based on operating and/or environmental conditions. Fuel cell systems 100 typically require larger cooling systems compared to diesel engines. In some embodiments, a fuel cell system 100 may require a cooling system that is about 1-2 or a fraction in between, times the size of a diesel engine cooling system.

In one embodiment, a system based control of the vehicle 200 may be implemented before, during, and after operation of any fuel cell system 100 may comprise operating a system controller 14. In some embodiment, the system controller 14 may control or monitor the thermal management system 136 to ensure the coolant temperature remains with a required tolerance limit. In some embodiments, the tolerance limit may be dependent on operating conditions, environmental conditions, or health of the different components of the vehicle 200.

In one embodiment, the system based control of the vehicle 200 before, during, and after operation of any fuel cell system 100 may comprise operating the system controller 14 to control of one or more radiators and/or control of the one or more pumps in the vehicle 200. In some embodiments, when the vehicle 200 comes to a stop such as at a traffic light or at a traffic jam, the system controller 14 may over cool one or more fuel cell systems 100 by a few degrees e.g., about 2° C. to about 8° C. in anticipation of a future acceleration event. Overcooling one or more fuel cell systems 100 may allow the vehicle 200 to ramp up to maximum power faster during the next acceleration event. Over cooling one or more fuel cell systems 100 by a few degrees e.g., about 2° C. to about 8° C. may increase the heat capacity of the one or more fuel cell systems 100.

Figure 15:
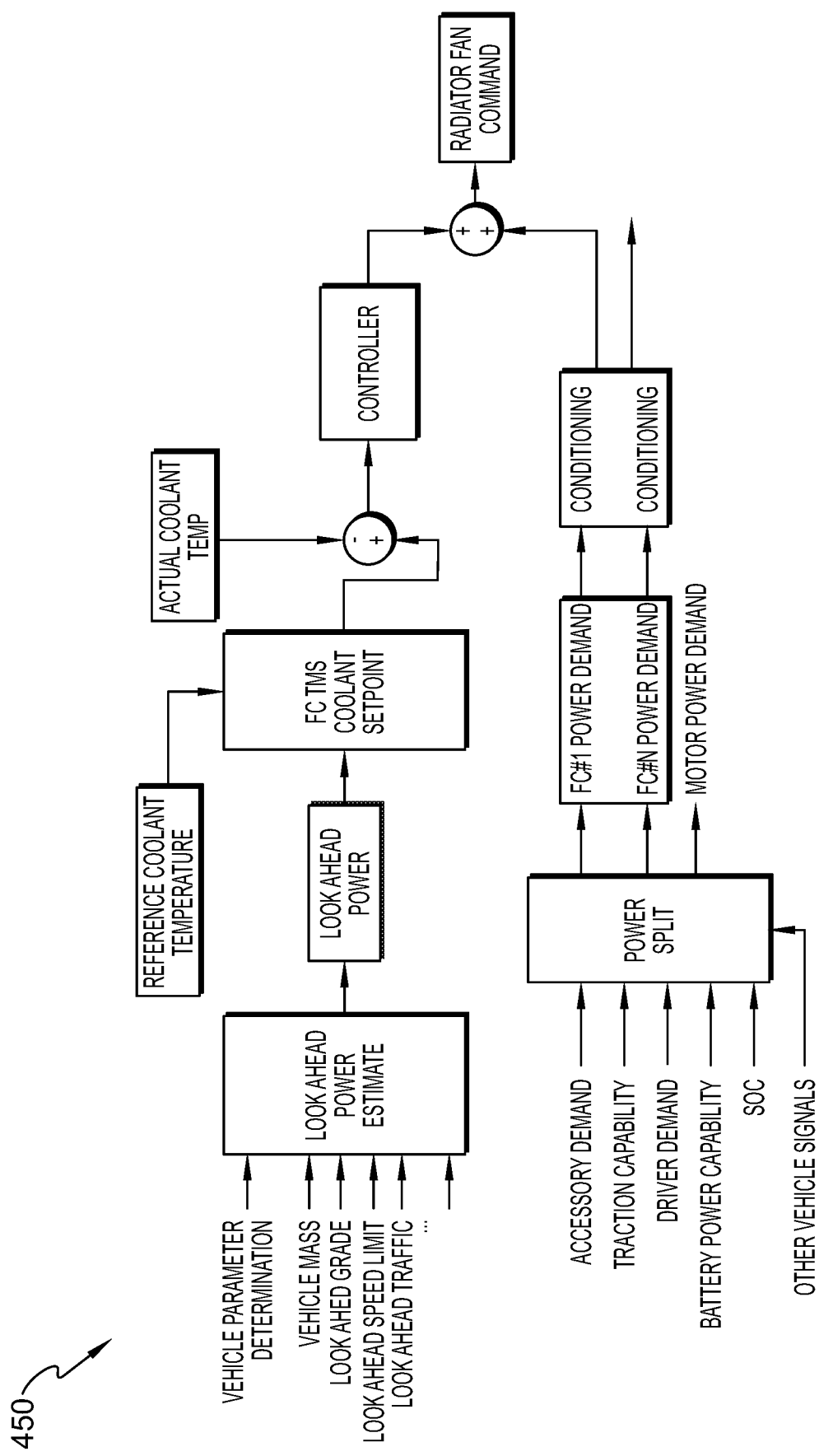
FIG. 15 is a detailed flow chart of an embodiment of a control algorithm or strategy controlling power split or power allocation between one or more fuel cell systems and a battery in a vehicle.

In one illustrative embodiment (see FIG. 15), the system control algorithm or strategy 450 of the vehicle 200 before, during, and after operation of any fuel cell system 100 may comprise controlling the power split or power allocation between one or more fuel cell systems 100 and a battery 220. In some embodiments, the power split or power allocation between one or more fuel cell systems 100 and the battery 220 may be done in real time.

Several factors may affect the power split or power allocation between the fuel cell systems 100 and the battery 220. In one embodiment, factors such as accessory demand, traction capability, driver demand, battery 220 power capability, battery 220 state-of-charge, and/or other signals from the vehicle 200 may affect the power split or power allocation between the fuel cell systems 100 and the battery 220. In other embodiments, the power split or power allocation may be affected by fewer factors or additional factors.

In one embodiment, the system controller 14 may implement the power split or power allocation to comprise power demanded from the fuel cell systems 100, and power demanded from the battery 220. The system controller 14 may identify when the fuel cell system 100 is required to step up output to a higher level and determine the power demand on the fuel cells systems, and/or the power demand on the battery 220. The fuel cell systems 100 may then need to be conditioned based on the power demands.

In one embodiment, when a fuel cell system 100 is required to increase its output to a higher level because of the power demands, the system controller 14 may operate one or more radiator fans 236 in the cooling loops of the thermal management system 136 of the vehicle 200. In some embodiments, the system controller 14 may operate one or more radiator fans 236 in the cooling loops of the thermal management system 136 of the vehicle 200 at a nominal level such as at about 50% to about 70% in order to maintain coolant temperature under steady operation based on a load. In some embodiments the load may be about 30% to about 60% of peak power.

In other embodiments, the system controller 14 may operate one or more radiator fans 236 in the cooling loops of the thermal management system 136 of the vehicle 200 at a level higher than the nominal level for a calibratable time before increasing the load on the fuel cell system 100. In some embodiments, the calibratable time may be about 2 s to about 10 s, including any time comprised therein. Operating the radiator fans 236 at a level higher than the nominal level may prevent overshoots of coolant temperature as fuel cell 110 increases its operating power point and allow for a more refined control of the coolant temperature.

In one embodiment, the system controller 14 may use look ahead data 12 to determine, implement, or adjust strategies and/or algorithms to be implemented by the thermal management system 136. In some embodiments, the system controller 14 may allow the thermal management system 136 of the vehicle 200 certain deviations based on look ahead information 12. For example, the coolant temperature may vary from a target temperature by about 2° C. to about 5° C. under certain conditions. Look ahead data 12 may comprise several factors such as vehicle 200 parameters, vehicle 200 mass, look ahead grade, look ahead speed limit, and/or look ahead traffic. In other embodiments, the look ahead data 12 may comprise fewer factors or additional factors.

In one embodiment, the system controller 14 may use a reference coolant temperature provided by the fuel cell systems 100 to determine coolant set point for the fuel cell 110 as required by the thermal management system 136. In some embodiments, the system controller 14 may use look ahead data 12 to determine the look ahead power needs of the vehicle 200. In other embodiments, the system controller 14 may condition the fuel cell systems 100 based on future power needs. Look ahead power needs of the vehicle 200 may indicate when the fuel cell systems 100 in the vehicle 200 may need to operate and how much power them may need to produce. Based on the power needs of the vehicle 200 the coolant associated with the fuel cell systems 100 may need to be at certain temperature. The system controller 14 may determine the actual temperature of the coolant and appropriately operate one or more radiator fans 236.

If the vehicle 200 encounters a steep uphill in the future, the system controller 14 may start operating one or more of the radiator fans 236 in the cooling loops of the thermal management system 136 of the vehicle 200 at a level higher than the nominal level to cool the coolant by a few degrees, e.g., about 2° C. to about 8° C. If the temperature of the coolant is less by a few degrees, the temperature of the coolant can be better managed and the fuel cell systems 100 can ramp to peak power quicker when the vehicle 200 starts climbing the hill.

If the vehicle 200 encounters a downhill, the system controller 14 may start operating one or more of the radiator fans 236 in the cooling loops of the thermal management system 136 of the vehicle 200 at a level lower than the nominal level to heat the coolant by a few degrees, e.g., by about 2° C. to about 8° C. If the temperature of the coolant is warmer by a few degrees, the fuel cell systems 100 may reduce the power output and the coolant temperature may steadily drop on its own when vehicle 200 starts going downhill.

Figure 14:
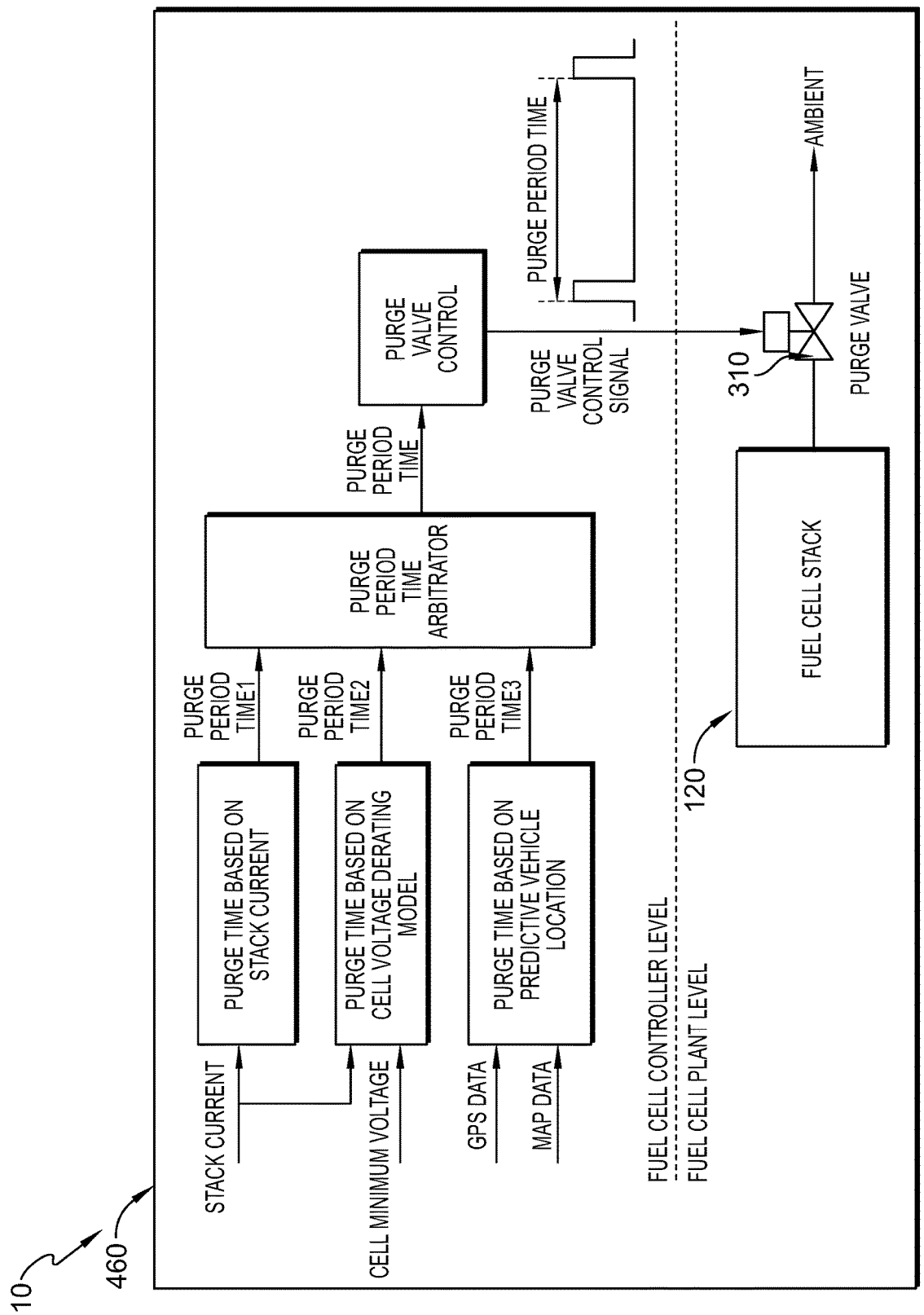
FIG. 14 is a detailed flow chart of an embodiment of the present purge control subsystem.

A Purge Control Subsystem, Component, or Module for the Look Ahead Energy Management and Control System and Method The intelligent look ahead energy management system 10 of the present disclosure may further comprise a purge control subsystem 460 (see FIG. 14). The purge control subsystem 460 is provided to control chemical concentrations in a fuel cell system 100 (e.g., hydrogen, oxygen, nitrogen, etc.). For example, hydrogen is the fuel in many fuel cells (e.g., PEMFCs) and often needs to be purged into the ambient for a short time during normal operation of the fuel cell system 100. The purpose of any such discrete event to purge the fuel cell allows liquid water, hydrogen, inert gases (e.g., nitrogen), etc. accumulated in the anode chamber of the fuel cell stack 120 after a certain time of operation to be released via a valve 300. After the purge allowing release of excess or unnecessary compounds, the fuel cell stack performance, chemical reaction, and power production is enhanced.

More specifically, the purge control system 460 of the present disclosure incorporates look ahead data 12 and technology transmitted to the fuel cell or look ahead controller 14 to determine new purge time periods (see FIG. 14). For example, in one embodiment of the present purge control subsystem the valve 300 is a purge valve 310 (e.g., solenoid valve) installed at the fuel cell stack anode outlet pipeline that is controlled by the fuel cell system 100 controls or look ahead controller 14. Within the fuel cell controller 14 level of FIG. 14, there are four main data points or parameters that are considered for the purge control subsystem, including but not limited to the purge valve control, the purge period time arbitrator, the purge time (e.g., based on stack current, based on cell voltage derating model, and based on predictive vehicle 200 location). One of the key parameters of the purge control subsystem 460 of the present look ahead energy management system 10 is determining or predicting the time period and duration until or for the next purge, which in one embodiment is generated via consideration, integration or incorporate of one or more of three algorithms described as follows.

Purge Control Algorithm 1 to predict or estimate a first time period to purge a fuel cell system 100, called The Purge Period Time 1. The Purge Period Time 1 is determined by an algorithm that incorporates a value or reading from the fuel cell stack 120 current (e.g., via a sensor 228), such as a hydrogen concentration reading or value. The Purge Control Algorithm 1 typically implements or integrated look ahead data 12 or information that may be comprised in a Look Up Table (LUT). This look ahead data 12 may be also include and may be calibrated according to actual test or sensor 228 data.

Purge Control Algorithm 2 to predict or estimate a second time period to purge a fuel cell system 100, called The Purge Period Time 2. The Purge Period Time 2 is determined by a cell voltage derating model, which reads the minimum cell voltage and fuel cell stack 120 current (e.g., via a sensor 228) of the fuel cell system 100. If the estimated minimum cell voltage falls to or below a calibration threshold value (e.g., at or about 0.45V) after the predicted time, the purge period time 2 shall be determined by the algorithm to avoid the fuel cell voltage dropping beyond the threshold setting value.

Purge Control Algorithm 3 to predict or estimate a second time period to purge a fuel cell system 100, called The Purge Period Time 3. The Purge Period Time 3 is determined by a vehicle 200 location prediction model, which may read or incorporate GPS, V2X, DSRC, and other types of map data. If the vehicle 200 location is determined as to be in a non-open space (like a tunnel, a parking structure or building, etc.), a hydrogen restricted zone (e.g., hydrogen refueling station), or in a long-distance up hill road incline conditions, then the purge control subsystem shall be executed. In particular, the purge control subsystem will be engaged ahead of the predicted location scenario in order to avoid or lessen the purging of hydrogen into the ambient in order to make the fuel cell stack performance in better status before it will be used within the high current density of full operation.

A Purge Period Time Arbitrator is a subsystem, component, or device that is used within the purge control subsystem 460 to select the final time value for the purge period ("Purge Period Time"). The final purge period or Purge Period Time is based on and calculated from the Purge Period Time 1, Purge Period Time 2 and Purge Period Time 3 as described above. The typical algorithm to determine the Purge Period Time is as follows:

Purge Period Time=min{Purge Period Time 1,Purge Period Time 2,Purge Period Time 3}

The final calculated, arbitrated, or determined time value denoted as the Purge Period Time is entered, input, or fed into a Purge Valve Control of the purge control system 460 (see FIG. 14) in order to automatically purge the fuel cell system 100 in a time pattern that most efficiently preserves performance and duration of the fuel cell stack 120 and system 100.

One or more of the systems, subsystems, devices, components described herein may be connected, configured, and/or coupled together in, to, or with the fuel cell system 100 in a capacity that comprises wires or is wireless. In an exemplary embodiment, components of the fuel cell system 100, subsystems, and any balance of plant (BOP) components or systems may be connected, configured, communicated, and/or coupled together in series comprising wires so as to form a sealed and/or air-tight system for effectively moving, flowing, and/or handling of fluid in order to allow any excess or waste fluid, such as air 124, to exhaust or exit the system. Fluid may be air, gas, or liquid and may be flowed from one component at the beginning of the series (e.g., intake and/or air filter components) to and through intermediate components (e.g., compressor 240, heat exchanger 270, and bypass valve 300 components) of a fuel cell system 100 or subsystem. Fluid may continue from the beginning components to and/or through intermediate components and to and/or through final components at the end of the system series (e.g., wastegate valve 300, turbine 280, and exhaust components) to exhaust or exit the system.

In addition, one or more of the communication and/or control systems, subsystems, devices, or components described herein may be connected, configured, and/or coupled together in, to, or with the fuel cell system 100 in a capacity that comprises wires or is wireless. In an exemplary embodiment, components of the fuel cell system 100, subsystems, and any balance of plant (BOP) components or systems may be connected, configured, communicated, controlled, and/or coupled together electronically via codes, programs, software, algorithms, signals, readings, sensors 228, etc. that may be further and similarly connected to a control device (e.g., a controller 14). Communication and/or control of one or more components of the fuel cell system 100 and its subsystems, BOP, or external components may also proceed directly or indirectly via a controller 14, such as the look ahead controller 14 described herein.

Ultimately, the present look ahead energy management and control system 10 and methods comprises the ability to solve several problems in a way that advantageously benefits and extends the performance (e.g., acceleration), durability, and life of a fuel cell stack 120 and system 100 as well as a coupled battery 220 system. In addition to the components, devices, and subsystems of a fuel cell stack 120 and a fuel cell system 100, the look ahead energy management and control system 10 and methods 10 of the present disclosure comprise additional features to control a fuel cell system 100 in a way that extends the life and duration of the fuel cell 110, including but not limited to: 1) precharging the fuel cell system 100, 2) peak shaving the battery 220 system, 3) cold starting the fuel cell system 100, and/or 4) purge controlling the fuel cell system 100. The present method further solves problems of present fuel cell control systems 100 including: 1) guarantee of on demand availability of power from the fuel cell and fuel cell system 100, 2) reduction of hydrogen wastage by precharging and purge controlling the fuel cell system 100, 3) enabling faster warm up or operational temperature maintenance of the fuel cell 110 under extreme weather conditions (e.g., low temperatures), particularly when other onboard energy storage sources (e.g., a battery 220) are not effective.

In particular, the look ahead data 12 and technology of the present system and method utilizes sensors 228 to predict future power demands and enables optimal operation of the fuel cell 110, stack 120, and system 100 that extends life of the fuel cell system 100. The precharge subsystem provides faster power delivery at tip in events and enables lower battery 220 size, and better durability of the fuel cell 110 and the battery 220. Illustrative peak shaving of the present system and method may be enabled by traffic and/or cloud data to identify the presence or potential for stop-and-go traffic or driving conditions in order to optimize fuel cell control and reduce or avoid power peaks at launch and to protect the fuel cell 110 and/or battery 220 from transients. Finally, the cloud start system of the present system and method enables AI and/or IoT connected system or vehicle 200 technology comprising weather data along with expected trip data to proactively begin warmup of the fuel cell system 100, which may effectively use electrical grid power to power the proactive warmup of the fuel cell system 100.

In addition, the present look ahead energy management and control system 10 and methods improve overall life and durability of the fuel cell system 100 by using onboard sensors 228 and connected vehicle 200 technologies to: 1) decide optimal time within a drive or duty cycle to turn-on/turn-off the fuel cell 110 to minimize switch-on damage or powercycling, 2) determine optimum strategy for power split between the fuel cell 110 and the battery 220, 3) maintain battery 220 depth of discharge within desirable levels, 4) derive benefits from the reduced transients by predicting upcoming transients and altering the behavior of the fuel cell system 100 in response to the look ahead technology data 12 by taking corrective steps, 5) reduce peak loads on battery 220, hence reducing the required throughput and battery 220 size, 6) avoid unnecessary ramp up and ramp down of fuel cells 110 leading to better fuel cell life, 7) use available knowledge and look ahead data 12 (e.g., vehicle 200 schedules and connected systems) to enable, plan, or program proactive measures (e.g., warmups and precharging), and 8) efficiently use electrical grid power charging to warmup, quickstart, or maintain the fuel cell system 100 in a "ready" mode of operation.

The following numbered embodiments are contemplated and are non-limiting.

1. A look ahead energy management and control system to reduce or prevent transients in a fuel cell system, comprising:

one or more sensors comprising look ahead technology data,
an air handling subsystem,
the fuel cell system, and
a look ahead controller.
2. The look ahead energy management and control system of clause 1, any other suitable clause, or any combination of suitable clauses, wherein the look ahead technology data is detected by the one or more sensors and communicated to the look ahead controller which predicts transients based on the look ahead technology data.
3. The look ahead energy management and control system of clause 1, any other suitable clause, or any combination of suitable clauses, wherein the look ahead controller proactively prompts the air handling subsystem to release excess oxygen to the fuel cell system.
4. The look ahead energy management and control system of clause 1, any other suitable clause, or any combination of suitable clauses, wherein the fuel cell system reduces or prevents predicted transients of the fuel cell stack thereby extending the life of the fuel cell system.
5. The look ahead energy management and control system of clause 1, any other suitable clause, or any combination of suitable clauses, wherein the look ahead technology data comprises information extracted from a source selected from a group consisting of an operator or user, maps, global positioning systems (GPS), vehicle to vehicle infrastructure V2X, dedicated short range communication (DSRC), cloud, fuel cell, vehicle controller area network (CAN), internal fuel cell devices, artificial intelligence (AI), Internet of Things (IoT), and combinations thereof.
6. The look ahead energy management and control system of clause 1, any other suitable clause, or any combination of suitable clauses, wherein the look ahead technology data comprises mathematical modeling data.
7. The look ahead energy management and control system of clause 1, any other suitable clause, or any combination of suitable clauses, wherein the sensors are mounted internal or external the fuel cell system.
8. The look ahead energy management and control system of clause 1, any other suitable clause, or any combination of suitable clauses, wherein the fuel cell system comprises one or more proton exchange membrane (PEM) fuel cells.
9. The look ahead energy management and control system of clause 1, any other suitable clause, or any combination of suitable clauses, wherein the fuel cell system comprises one or more phosphoric acid fuel cells.
10. The look ahead energy management and control system of clause 1, any other suitable clause, or any combination of suitable clauses, wherein the fuel cell system comprises one or more molten carbonate fuel cells.
11. The look ahead energy management and control system of clause 1, any other suitable clause, or any combination of suitable clauses, wherein the fuel cell system comprises one or more solid oxide fuel cells.
12. The look ahead energy management and control system of clause 1, any other suitable clause, or any combination of suitable clauses, wherein the fuel cell system is comprised in a vehicle.
13. The look ahead energy management and control system of clause 1, any other suitable clause, or any combination of suitable clauses, wherein the fuel cell system is comprised in a powertrain.
14. The look ahead energy management and control system of clause 1, any other suitable clause, or any combination of suitable clauses, wherein the fuel cell system is comprised in a vehicular application on highways.
15. The look ahead energy management and control system of clause 1, any other suitable clause, or any combination of suitable clauses, wherein the fuel cell system is comprised in a vehicular application on off roads.
16. The look ahead energy management and control system of clause 1, any other suitable clause, or any combination of suitable clauses, wherein the fuel cell system is comprised in a vehicular application underwater.
17. The look ahead energy management and control system of clause 1, any other suitable clause, or any combination of suitable clauses, wherein the fuel cell system is comprised in a vehicular application at high altitudes.
18. The look ahead energy management and control system of clause 1, any other suitable clause, or any combination of suitable clauses, wherein the fuel cell system is comprised in a vehicular application in sub-Saharan regions.
19. The look ahead energy management and control system of clause 1, any other suitable clause, or any combination of suitable clauses, wherein the fuel cell system is comprised in a mobile application.
20. The look ahead energy management and control system of clause 1, any other suitable clause, or any combination of suitable clauses, wherein the fuel cell system is comprised in a stationary application.
21. The look ahead energy management and control system of clause 1, any other suitable clause, or any combination of suitable clauses, wherein the fuel cell system is comprised in an industrial application.
22. The look ahead energy management and control system of clause 12, any other suitable clause, or any combination of suitable clauses, wherein the vehicle is an electric vehicle.
23. The look ahead energy management and control system of clause 12, any other suitable clause, or any combination of suitable clauses, wherein the vehicle is a car.
24. The look ahead energy management and control system of clause 12, any other suitable clause, or any combination of suitable clauses, wherein the vehicle is a truck.
25. The look ahead energy management and control system of clause 12, any other suitable clause, or any combination of suitable clauses, wherein the vehicle is a boat.
26. The look ahead energy management and control system of clause 12, any other suitable clause, or any combination of suitable clauses, wherein the vehicle is a train.
27. The look ahead energy management and control system of clause 12, any other suitable clause, or any combination of suitable clauses, wherein the vehicle is a plane.
28. The look ahead energy management and control system of clause 12, any other suitable clause, or any combination of suitable clauses, wherein the vehicle is a helicopter.

29. The look ahead energy management and control system of clause 12, any other suitable clause, or any combination of suitable clauses, wherein the vehicle is an electrified vehicle.
30. The look ahead energy management and control system of clause 12, any other suitable clause, or any combination of suitable clauses, wherein the vehicle is a hybrid electrified vehicle (HEV).
31. The look ahead energy management and control system of clause 12, any other suitable clause, or any combination of suitable clauses, wherein the vehicle comprises a battery.
32. The look ahead energy management and control system of clause 1, any other suitable clause, or any combination of suitable clauses, wherein the look ahead technology data comprises information that is used or incorporated to predict fuel cell energy demands.
33. The look ahead energy management and control system of clause 1, any other suitable clause, or any combination of suitable clauses, wherein the look ahead technology data comprises information that is used or incorporated to predict fuel cell performance.
34. The look ahead energy management and control system of clause 1, any other suitable clause, or any combination of suitable clauses, wherein the look ahead technology data comprises information that is used or incorporated to predict fuel cell defaults.
35. The look ahead energy management and control system of clause 1, any other suitable clause, or any combination of suitable clauses, wherein the look ahead technology data comprises information that is used or incorporated to predict fuel cell trajectories
36. The look ahead energy management and control system of clause 1, any other suitable clause, or any combination of suitable clauses, wherein the look ahead technology data comprises information related to roadways.
37. The look ahead energy management and control system of clause 1, any other suitable clause, or any combination of suitable clauses, wherein the look ahead technology data comprises information related to airways.
38. The look ahead energy management and control system of clause 1, any other suitable clause, or any combination of suitable clauses, wherein the look ahead technology data comprises information related to waterways.
39. The look ahead energy management and control system of clause 1, any other suitable clause, or any combination of suitable clauses, wherein the look ahead technology data comprises information related paths or routes the fuel cell system encounters.
40. The look ahead energy management and control system of clause 1, any other suitable clause, or any combination of suitable clauses, wherein the look ahead technology data comprises predictive mapping.
41. The look ahead energy management and control system of clause 1, any other suitable clause, or any combination of suitable clauses, wherein the look ahead technology data comprises routing information.
42. The look ahead energy management and control system of clause 1, any other suitable clause, or any combination of suitable clauses, wherein the look ahead technology data comprises information related to performance of the fuel cell system.
43. The look ahead energy management and control system of clause 1, any other suitable clause, or any combination of suitable clauses, wherein the look ahead technology data comprises information related to operation of the fuel cell system.
44. The look ahead energy management and control system of clause 1, any other suitable clause, or any combination of suitable clauses, wherein the look ahead technology data comprises information related to maintenance of the fuel cell system.
45. The look ahead energy management and control system of clause 12, any other suitable clause, or any combination of suitable clauses, wherein the look ahead technology data comprises information related to performance of the vehicle.
46. The look ahead energy management and control system of clause 12, any other suitable clause, or any combination of suitable clauses, wherein the look ahead technology data comprises information related to operation of the vehicle.
47. The look ahead energy management and control system of clause 12, any other suitable clause, or any combination of suitable clauses, wherein the look ahead technology data comprises information related to maintenance of the vehicle.
48. The look ahead energy management and control system of clause 31, any other suitable clause, or any combination of suitable clauses, wherein the look ahead technology data comprises information related to performance of the battery.
49. The look ahead energy management and control system of clause 31, any other suitable clause, or any combination of suitable clauses, wherein the look ahead technology data comprises information related to operation of the battery.
50. The look ahead energy management and control system of clause 31 any other suitable clause, or any combination of suitable clauses, wherein the look ahead technology data comprises information related to maintenance of the battery.
51. The look ahead energy management and control system of clause 13, any other suitable clause, or any combination of suitable clauses, wherein the powertrain comprises a battery.
52. The look ahead energy management and control system of clause 12, any other suitable clause, or any combination of suitable clauses, wherein the look ahead technology data comprises information related to control of components of the vehicle.
53. The look ahead energy management and control system of clause 12, any other suitable clause, or any combination of suitable clauses, wherein the look ahead technology data comprises information related to maintenance of components of the vehicle.
54. The look ahead energy management and control system of clause 12, any other suitable clause, or any combination of suitable clauses, wherein the look ahead technology data comprises information related to optimization of components of the vehicle.
55. The look ahead energy management and control system of clause 12, any other suitable clause, or any combination of suitable clauses, wherein the look ahead technology data comprises information selected from a group consisting of velocity, distance, mass, drag, rolling resistance, wheel power, grade, shifting schedules, gear ratios, transmission ratios, motor speed, torque, battery power, powertrain energy, time reconstruction, electricity generating unit (EGU) power, trip distance, battery state of charge (SOC) limits, battery size, EGU status, current SOC, current distance, control action of the vehicle, and any combination thereof.

56. The look ahead energy management and control system of clause 31, any other suitable clause, or any combination of suitable clauses, wherein the look ahead technology data comprises information selected from a group consisting of battery power, battery state of charge (SOC) limits, battery size, or current SOC of the battery, and any combination thereof.

57. The look ahead energy management and control system of clause 1, any other suitable clause, or any combination of suitable clauses, wherein the look ahead technology data is obtained from electronic sources.

58. The look ahead energy management and control system of clause 1, any other suitable clause, or any combination of suitable clauses, wherein the look ahead technology data is obtained online.

59. The look ahead energy management and control system of clause 1, any other suitable clause, or any combination of suitable clauses, wherein the look ahead technology data is obtained offline.

60. The look ahead energy management and control system of clause 12, any other suitable clause, or any combination of suitable clauses, wherein the look ahead technology data is related to fuel/gas (e.g., hydrogen) fill up stations, charging stations and fast charging stations, rest areas, steep inclines or deep declines in the roadways, traffic conditions, frequency or existence of stop-and-start locations (e.g., stop signs, stop lights, stopped traffic, etc.), obstacles, throttle demand or frequency, scheduled stops and starts, or weather.

61. The look ahead energy management and control system of clause 1, any other suitable clause, or any combination of suitable clauses, wherein the look ahead technology data is comprised in a Look Ahead Table (LAT).

62. The look ahead energy management and control system of clause 1, any other suitable clause, or any combination of suitable clauses, wherein the look ahead technology data is comprised in a Look Up Table (LUT).

63. The look ahead energy management and control system of clause 1, any other suitable clause, or any combination of suitable clauses, wherein the look ahead technology data is manually entered by a user or operator into a controlling device.

64. The look ahead energy management and control system of clause 63, any other suitable clause, or any combination of suitable clauses, wherein the controlling device is selected from a group comprising a look ahead controller, a proactive controller, a precharge estimator, other controlling devices or components, and any combination thereof.

65. The look ahead energy management and control system of clause 1, any other suitable clause, or any combination of suitable clauses, wherein the look ahead technology data is communicated to the fuel cell system via a look ahead controller to analyze or assess the look ahead technology data received from a data source selected from a group comprising an operator/user, the cloud, fuel cell, GPS, internal clock, maps, DSRC, V2X, ranging sensors, artificial intelligence (AI), Internet of Things (IoT), vehicle CAN, and any combination thereof.

66. The look ahead energy management and control system of clause 1, any other suitable clause, or any combination of suitable clauses, wherein the look ahead technology data is analyzed or manipulated by the controller prior to transmitting it to the fuel cell system.

67. The look ahead energy management and control system of clause 1, any other suitable clause, or any combination of suitable clauses, wherein the one or more sensors detect or collect performance parameter data from the fuel cell system.

68. The look ahead energy management and control system of clause 12, any other suitable clause, or any combination of suitable clauses, wherein the one or more sensors utilize real-time readings, values, and parameters from the vehicle.

69. The look ahead energy management and control system of clause 1, any other suitable clause, or any combination of suitable clauses, wherein the one or more sensors utilize real-time readings, values, and parameters from the fuel cell system.

70. The look ahead energy management and control system of clause 1, any other suitable clause, or any combination of suitable clauses, wherein the one or more sensors utilize instantaneous readings, values, and parameters from the fuel cell system.

71. The look ahead energy management and control system of clause 31, any other suitable clause, or any combination of suitable clauses, wherein the one or more sensors utilize real-time readings, values, and parameters from the battery.

72. The look ahead energy management and control system of clause 1, any other suitable clause, or any combination of suitable clauses, wherein the one or more sensors predict future fuel cell system performance or durability.

73. The look ahead energy management and control system of clause 1, any other suitable clause, or any combination of suitable clauses, wherein the one or more sensors manage future fuel cell system performance or durability.

74. The look ahead energy management and control system of clause 1, any other suitable clause, or any combination of suitable clauses, wherein the one or more sensors optimize future fuel cell system performance or durability.

75. The look ahead energy management and control system of clause 12, any other suitable clause, or any combination of suitable clauses, wherein the one or more sensors identifies information selected from a group comprising internal performance, maintenance readings, values, or parameters of the vehicle, and any combination thereof.

76. The look ahead energy management and control system of clause 1, any other suitable clause, or any combination of suitable clauses, wherein the one or more sensors identifies proximity to a location selected from a group comprising final destination, a charging station, a hydrogen refill location, a route location, and any combination thereof.

77. The look ahead energy management and control system of clause 1, any other suitable clause, or any combination of suitable clauses, wherein look ahead energy management and control system determines an optimal time within a drive cycle to turn-on/turn-off the fuel cell system to minimize switch-on damage.
78. The look ahead energy management and control system of clause 31, any other suitable clause, or any combination of suitable clauses, wherein look ahead energy management and control system determines an optimum power split between the fuel cell system and the battery.
79. The look ahead energy management and control system of clause 31, any other suitable clause, or any combination of suitable clauses, wherein look ahead energy management and control system determines battery depth of discharge within desirable levels.
80. The look ahead energy management and control system of clause 31, any other suitable clause, or any combination of suitable clauses, wherein look ahead energy management and control system reduces range anxiety or uncertainty on end of cycle battery charge.
81. The look ahead energy management and control system of clause 31, any other suitable clause, or any combination of suitable clauses, wherein look ahead energy management and control system achieves cost effective battery and fuel cell system sizing by predicting transients and managing power.
82. The look ahead energy management and control system of clause 1, any other suitable clause, or any combination of suitable clauses, wherein look ahead energy management and control system improves fuel cell system component life by reducing transient loads and number of times the fuel cell system goes through startup.
83. The look ahead energy management and control system of clause 1, any other suitable clause, or any combination of suitable clauses, wherein the look ahead energy management and control system reduces hydrogen wastage by smartly precharging the circuit.
84. The look ahead energy management and control system of clause 1, any other suitable clause, or any combination of suitable clauses, wherein the look ahead energy management and control system manages the air handling subsystem or circuit of a fuel cell system to reduce or prevent parasitic loads.
85. The look ahead energy management and control system of clause 1, any other suitable clause, or any combination of suitable clauses, wherein the one or more sensors comprise progressively more advanced sensors or sensor suites.
86. The look ahead energy management and control system of clause 1, any other suitable clause, or any combination of suitable clauses, wherein the one or more sensors comprise multiple sensors comprised in a sensor package.
87. The look ahead energy management and control system of clause 1, any other suitable clause, or any combination of suitable clauses, wherein the one or more sensors is selected from a group comprising a GPS sensor, a RADAR, a camera, a V2X sensor, and any combination thereof.
88. The look ahead energy management and control system of clause 1, any other suitable clause, or any combination of suitable clauses, wherein the one or more sensors comprises a online map.
89. The look ahead energy management and control system of clause 1, any other suitable clause, or any combination of suitable clauses, wherein the one or more sensors comprises an offline map.
90. The look ahead energy management and control system of clause 1, any other suitable clause, or any combination of suitable clauses, wherein the one or more sensors predicts future power demands.
91. The look ahead energy management and control system of clause 1, any other suitable clause, or any combination of suitable clauses, wherein the one or more sensors predicts future-"tip-in" events.
92. The look ahead energy management and control system of clause 1, any other suitable clause, or any combination of suitable clauses, wherein the look ahead energy management and control system responds to post-"tip-in" events
93. The look ahead energy management and control system of clause 1, any other suitable clause, or any combination of suitable clauses, wherein the look ahead energy management and control system comprises a precharge module.
94. The look ahead energy management and control system of clause 1, any other suitable clause, or any combination of suitable clauses, wherein the look ahead energy management and control system comprises a process of precharging the air handling subsystem.
95. The look ahead energy management and control system of clause 1, any other suitable clause, or any combination of suitable clauses, wherein the one or more sensors use a precharge estimator.
96. The look ahead energy management and control system of clause 1, any other suitable clause, or any combination of suitable clauses, wherein the one or more sensors communicate directly with traffic lights and the look ahead controller.
97. The look ahead energy management and control system of clause 12, any other suitable clause, or any combination of suitable clauses, wherein the look ahead technology data comprises information to predict the power needs of the vehicle.
98. The look ahead energy management and control system of clause 1, any other suitable clause, or any combination of suitable clauses, wherein the look ahead technology data is used to determine coolant temperature of the fuel cell system.
99. The look ahead energy management and control system of clause 12, any other suitable clause, or any combination of suitable clauses, wherein the look ahead technology data is used to determine operation level of radiators in the vehicle.
100. The look ahead energy management and control system of clause 12, any other suitable clause, or any combination of suitable clauses, wherein the look ahead technology data is used to determine operation level of pumps in the vehicle.
101. A look ahead energy management and control system to extend the life of a fuel cell system, comprising:
one or more sensors comprising look ahead technology data,
an air handling subsystem,
the fuel cell system comprising a fuel cell stack, and a look ahead controller.
102. The look ahead energy management and control system of clause 101, any other Suitable clause, or any combination of suitable clauses, wherein the look ahead technology data is detected by the one or more sensors and communicated to the look ahead controller which predicts transients based on the look ahead technology data.

103. The look ahead energy management and control system of clause 101, any other suitable clause, or any combination of suitable clauses, wherein the look ahead controller proactively prompts the air handling subsystem to release excess oxygen to the fuel cell system.
104. The look ahead energy management and control system of clause 101, any other suitable clause, or any combination of suitable clauses, wherein the fuel cell system reduces or prevents predicted transients of the fuel cell stack thereby extending the life of the fuel cell system.
105. The look ahead energy management and control system of clause 101, any other suitable clause, or any combination of suitable clauses, wherein the look ahead technology data comprises information extracted from a source selected from a group consisting of an operator or user, maps, global positioning systems (GPS), vehicle to vehicle infrastructure V2X, dedicated short range communication (DSRC), cloud, fuel cell, vehicle controller area network (CAN), internal fuel cell devices, artificial intelligence (AI), Internet of Things (IoT), and combinations thereof.
106. The look ahead energy management and control system of clause 101, any other suitable clause, or any combination of suitable clauses, wherein the look ahead technology data comprises mathematical modeling data.
107. The look ahead energy management and control system of clause 101, any other suitable clause, or any combination of suitable clauses, wherein the sensors are mounted internal or external the fuel cell system.
108. The look ahead energy management and control system of clause 101, any other suitable clause, or any combination of suitable clauses, wherein the fuel cell system comprises one or more proton exchange membrane (PEM) fuel cells.
109. The look ahead energy management and control system of clause 101, any other suitable clause, or any combination of suitable clauses, wherein the fuel cell system comprises one or more phosphoric acid fuel cells.
110. The look ahead energy management and control system of clause 101, any other suitable clause, or any combination of suitable clauses, wherein the fuel cell system comprises one or more molten carbonate fuel cells.
111. The look ahead energy management and control system of clause 101, any other suitable clause, or any combination of suitable clauses, wherein the fuel cell system comprises one or more solid oxide fuel cells.
112. The look ahead energy management and control system of clause 101, any other suitable clause, or any combination of suitable clauses, wherein the fuel cell system is comprised in a vehicle.
113. The look ahead energy management and control system of clause 101, any other suitable clause, or any combination of suitable clauses, wherein the fuel cell system is comprised in a powertrain.
114. The look ahead energy management and control system of clause 101, any other suitable clause, or any combination of suitable clauses, wherein the fuel cell system is comprised in a vehicular application on highways.
115. The look ahead energy management and control system of clause 101, any other suitable clause, or any combination of suitable clauses, wherein the fuel cell system is comprised in a vehicular application on off roads.
116. The look ahead energy management and control system of clause 101, any other suitable clause, or any combination of suitable clauses, wherein the fuel cell system is comprised in a vehicular application underwater.
117. The look ahead energy management and control system of clause 101, any other suitable clause, or any combination of suitable clauses, wherein the fuel cell system is comprised in a vehicular application at high altitudes.
118. The look ahead energy management and control system of clause 101, any other suitable clause, or any combination of suitable clauses, wherein the fuel cell system is comprised in a vehicular application in sub-Saharan regions.
119. The look ahead energy management and control system of clause 101, any other suitable clause, or any combination of suitable clauses, wherein the fuel cell system is comprised in a mobile application.
120. The look ahead energy management and control system of clause 101, any other suitable clause, or any combination of suitable clauses, wherein the fuel cell system is comprised in a stationary application.
121. The look ahead energy management and control system of clause 101, any other suitable clause, or any combination of suitable clauses, wherein the fuel cell system is comprised in an industrial application.
122. The look ahead energy management and control system of clause 112, any other suitable clause, or any combination of suitable clauses, wherein the vehicle is an electric vehicle.
123. The look ahead energy management and control system of clause 112, any other suitable clause, or any combination of suitable clauses, wherein the vehicle is a car.
124. The look ahead energy management and control system of clause 112, any other suitable clause, or any combination of suitable clauses, wherein the vehicle is a truck.
125. The look ahead energy management and control system of clause 112, any other suitable clause, or any combination of suitable clauses, wherein the vehicle is a boat.
126. The look ahead energy management and control system of clause 112, any other suitable clause, or any combination of suitable clauses, wherein the vehicle is a train.
127. The look ahead energy management and control system of clause 112, any other suitable clause, or any combination of suitable clauses, wherein the vehicle is a plane.
128. The look ahead energy management and control system of clause 112, any other suitable clause, or any combination of suitable clauses, wherein the vehicle is a helicopter.
129. The look ahead energy management and control system of clause 112, any other suitable clause, or any combination of suitable clauses, wherein the vehicle is an electrified vehicle.
130. The look ahead energy management and control system of clause 112, any other suitable clause, or any combination of suitable clauses, wherein the vehicle is a hybrid electrified vehicle (HEV).

131. The look ahead energy management and control system of clause 112, any other suitable clause, or any combination of suitable clauses, wherein the vehicle comprises a battery.

132. The look ahead energy management and control system of clause 101, any other suitable clause, or any combination of suitable clauses, wherein the look ahead technology data comprises information that is used or incorporated to predict fuel cell energy demands.

133. The look ahead energy management and control system of clause 101, any other suitable clause, or any combination of suitable clauses, wherein the look ahead technology data comprises information that is used or incorporated to predict fuel cell performance.

134. The look ahead energy management and control system of clause 101, any other suitable clause, or any combination of suitable clauses, wherein the look ahead technology data comprises information that is used or incorporated to predict fuel cell defaults.

135. The look ahead energy management and control system of clause 101, any other suitable clause, or any combination of suitable clauses, wherein the look ahead technology data comprises information that is used or incorporated to predict fuel cell trajectories 136. The look ahead energy management and control system of clause 101, any other suitable clause, or any combination of suitable clauses, wherein the look ahead technology data comprises information related to roadways.

137. The look ahead energy management and control system of clause 101, any other suitable clause, or any combination of suitable clauses, wherein the look ahead technology data comprises information related to airways.

138. The look ahead energy management and control system of clause 101, any other suitable clause, or any combination of suitable clauses, wherein the look ahead technology data comprises information related to waterways.

139. The look ahead energy management and control system of clause 101, any other suitable clause, or any combination of suitable clauses, wherein the look ahead technology data comprises information related paths or routes the fuel cell system encounters.

140. The look ahead energy management and control system of clause 101, any other suitable clause, or any combination of suitable clauses, wherein the look ahead technology data comprises predictive mapping.

141. The look ahead energy management and control system of clause 101, any other suitable clause, or any combination of suitable clauses, wherein the look ahead technology data comprises routing information.

142. The look ahead energy management and control system of clause 101, any other suitable clause, or any combination of suitable clauses, wherein the look ahead technology data comprises information related to performance of the fuel cell system.

143. The look ahead energy management and control system of clause 101, any other suitable clause, or any combination of suitable clauses, wherein the look ahead technology data comprises information related to operation of the fuel cell system.

144. The look ahead energy management and control system of clause 101, any other suitable clause, or any combination of suitable clauses, wherein the look ahead technology data comprises information related to maintenance of the fuel cell system.

145. The look ahead energy management and control system of clause 112, any other suitable clause, or any combination of suitable clauses, wherein the look ahead technology data comprises information related to performance of the vehicle.

146. The look ahead energy management and control system of clause 112, any other suitable clause, or any combination of suitable clauses, wherein the look ahead technology data comprises information related to operation of the vehicle.

147. The look ahead energy management and control system of clause 112, any other suitable clause, or any combination of suitable clauses, wherein the look ahead technology data comprises information related to maintenance of the vehicle.

148. The look ahead energy management and control system of clause 131, any other suitable clause, or any combination of suitable clauses, wherein the look ahead technology data comprises information related to performance of the battery.

149. The look ahead energy management and control system of clause 131, any other suitable clause, or any combination of suitable clauses, wherein the look ahead technology data comprises information related to operation of the battery.

150. The look ahead energy management and control system of clause 131 any other suitable clause, or any combination of suitable clauses, wherein the look ahead technology data comprises information related to maintenance of the battery.

151. The look ahead energy management and control system of clause 113, any other suitable clause, or any combination of suitable clauses, wherein the powertrain comprises a battery.

152. The look ahead energy management and control system of clause 112, any other suitable clause, or any combination of suitable clauses, wherein the look ahead technology data comprises information related to control of components of the vehicle.

153. The look ahead energy management and control system of clause 112, any other suitable clause, or any combination of suitable clauses, wherein the look ahead technology data comprises information related to maintenance of components of the vehicle.

154. The look ahead energy management and control system of clause 112, any other suitable clause, or any combination of suitable clauses, wherein the look ahead technology data comprises information related to optimization of components of the vehicle.

155. The look ahead energy management and control system of clause 112, any other suitable clause, or any combination of suitable clauses, wherein the look ahead technology data comprises information selected from a group consisting of velocity, distance, mass, drag, rolling resistance, wheel power, grade, shifting schedules, gear ratios, transmission ratios, motor speed, torque, battery power, powertrain energy, time reconstruction, electricity generating unit (EGU) power, trip distance, battery state of charge (SOC) limits, battery size, EGU status, current SOC, current distance, control action of the vehicle, and any combination thereof.

156. The look ahead energy management and control system of clause 131, any other suitable clause, or any combination of suitable clauses, wherein the look ahead technology data comprises information selected from a group consisting of battery power, battery state of charge (SOC) limits, battery size, or current SOC of the battery, and any combination thereof.

157. The look ahead energy management and control system of clause 101, any other suitable clause, or any combination of suitable clauses, wherein the look ahead technology data is obtained from electronic sources.

158. The look ahead energy management and control system of clause 101, any other suitable clause, or any combination of suitable clauses, wherein the look ahead technology data is obtained online.

159. The look ahead energy management and control system of clause 101, any other suitable clause, or any combination of suitable clauses, wherein the look ahead technology data is obtained offline.

160. The look ahead energy management and control system of clause 112, any other suitable clause, or any combination of suitable clauses, wherein the look ahead technology data is related to fuel/gas (e.g., hydrogen) fill up stations, charging stations and fast charging stations, rest areas, steep inclines or deep declines in the roadways, traffic conditions, frequency or existence of stop-and-start locations (e.g., stop signs, stop lights, stopped traffic, etc.), obstacles, throttle demand or frequency, scheduled stops and starts, or weather.

161. The look ahead energy management and control system of clause 101, any other suitable clause, or any combination of suitable clauses, wherein the look ahead technology data is comprised in a Look Ahead Table (LAT).

162. The look ahead energy management and control system of clause 101, any other suitable clause, or any combination of suitable clauses, wherein the look ahead technology data is comprised in a Look Up Table (LUT).

163. The look ahead energy management and control system of clause 101, any other suitable clause, or any combination of suitable clauses, wherein the look ahead technology data is manually entered by a user or operator into a controlling device.

164. The look ahead energy management and control system of clause 63, any other suitable clause, or any combination of suitable clauses, wherein the controlling device is selected from a group comprising a look ahead controller, a proactive controller, a precharge estimator, other controlling devices or components, and any combination thereof.

165. The look ahead energy management and control system of clause 101, any other suitable clause, or any combination of suitable clauses, wherein the look ahead technology data is communicated to the fuel cell system via a look ahead controller to analyze or assess the look ahead technology data received from a data source selected from a group comprising an operator/user, the cloud, fuel cell, GPS, internal clock, maps, DSRC, V2X, ranging sensors, artificial intelligence (AI), Internet of Things (IoT), vehicle CAN, and any combination thereof.

166. The look ahead energy management and control system of clause 101, any other suitable clause, or any combination of suitable clauses, wherein the look ahead technology data is analyzed or manipulated by the controller prior to transmitting it to the fuel cell system.

167. The look ahead energy management and control system of clause 101, any other suitable clause, or any combination of suitable clauses, wherein the one or more sensors detect or collect performance parameter data from the fuel cell system.

168. The look ahead energy management and control system of clause 112, any other suitable clause, or any combination of suitable clauses, wherein the one or more sensors utilize real-time readings, values, and parameters from the vehicle.

169. The look ahead energy management and control system of clause 101, any other suitable clause, or any combination of suitable clauses, wherein the one or more sensors utilize real-time readings, values, and parameters from the fuel cell system.

170. The look ahead energy management and control system of clause 101, any other suitable clause, or any combination of suitable clauses, wherein the one or more sensors utilize instantaneous readings, values, and parameters from the fuel cell system.

171. The look ahead energy management and control system of clause 131, any other suitable clause, or any combination of suitable clauses, wherein the one or more sensors utilize real-time readings, values, and parameters from the battery.

172. The look ahead energy management and control system of clause 101, any other suitable clause, or any combination of suitable clauses, wherein the one or more sensors predict future fuel cell system performance or durability.

173. The look ahead energy management and control system of clause 101, any other suitable clause, or any combination of suitable clauses, wherein the one or more sensors manage future fuel cell system performance or durability.

174. The look ahead energy management and control system of clause 101, any other suitable clause, or any combination of suitable clauses, wherein the one or more sensors optimize future fuel cell system performance or durability.

175. The look ahead energy management and control system of clause 112, any other suitable clause, or any combination of suitable clauses, wherein the one or more sensors identifies information selected from a group comprising internal performance, maintenance readings, values, or parameters of the vehicle, and any combination thereof.

176. The look ahead energy management and control system of clause 101, any other suitable clause, or any combination of suitable clauses, wherein the one or more sensors identifies proximity to a location selected from a group comprising final destination, a charging station, a hydrogen refill location, a route location, and any combination thereof.

177. The look ahead energy management and control system of clause 101, any other suitable clause, or any combination of suitable clauses, wherein look ahead energy management and control system determines an optimal time within a drive cycle to turn-on/turn-off the fuel cell system to minimize switch-on damage.

178. The look ahead energy management and control system of clause 131, any other suitable clause, or any combination of suitable clauses, wherein look ahead energy management and control system determines an optimum power split between the fuel cell system and the battery.

179. The look ahead energy management and control system of clause 131, any other suitable clause, or any combination of suitable clauses, wherein look ahead energy management and control system determines battery depth of discharge within desirable levels.

180. The look ahead energy management and control system of clause 131, any other suitable clause, or any combination of suitable clauses, wherein look ahead energy management and control system reduces range anxiety or uncertainty on end of cycle battery charge.

181. The look ahead energy management and control system of clause 131, any other suitable clause, or any combination of suitable clauses, wherein look ahead energy management and control system achieves cost effective battery and fuel cell system sizing by predicting transients and managing power.

182. The look ahead energy management and control system of clause 101, any other suitable clause, or any combination of suitable clauses, wherein look ahead energy management and control system improves fuel cell system component life by reducing transient loads and number of times the fuel cell system goes through startup.

183. The look ahead energy management and control system of clause 101, any other suitable clause, or any combination of suitable clauses, wherein the look ahead energy management and control system reduces hydrogen wastage by smartly precharging the circuit.

184. The look ahead energy management and control system of clause 101, any other suitable clause, or any combination of suitable clauses, wherein the look ahead energy management and control system manages the air handling subsystem or circuit of a fuel cell system to reduce or prevent parasitic loads.

185. The look ahead energy management and control system of clause 101, any other suitable clause, or any combination of suitable clauses, wherein the one or more sensors comprise progressively more advanced sensors or sensor suites.

186. The look ahead energy management and control system of clause 101, any other suitable clause, or any combination of suitable clauses, wherein the one or more sensors comprise multiple sensors comprised in a sensor package.

187. The look ahead energy management and control system of clause 101, any other suitable clause, or any combination of suitable clauses, wherein the one or more sensors is selected from a group comprising a GPS sensor, a RADAR, a camera, a V2X sensor, and any combination thereof.

188. The look ahead energy management and control system of clause 101, any other suitable clause, or any combination of suitable clauses, wherein the one or more sensors comprises a online map.

189. The look ahead energy management and control system of clause 101, any other suitable clause, or any combination of suitable clauses, wherein the one or more sensors comprises an offline map.

190. The look ahead energy management and control system of clause 101, any other suitable clause, or any combination of suitable clauses, wherein the one or more sensors predicts future power demands.

191. The look ahead energy management and control system of clause 101, any other suitable clause, or any combination of suitable clauses, wherein the one or more sensors predicts future-"tip-in" events.

192. The look ahead energy management and control system of clause 101, any other suitable clause, or any combination of suitable clauses, wherein the look ahead energy management and control system responds to post-"tip-in" events 193. The look ahead energy management and control system of clause 101, any other suitable clause, or any combination of suitable clauses, wherein the look ahead energy management and control system comprises a precharge module.

194. The look ahead energy management and control system of clause 101, any other suitable clause, or any combination of suitable clauses, wherein the look ahead energy management and control system comprises a process of precharging the air handling subsystem.

195. The look ahead energy management and control system of clause 101, any other suitable clause, or any combination of suitable clauses, wherein the one or more sensors use a precharge estimator.

196. The look ahead energy management and control system of clause 101, any other suitable clause, or any combination of suitable clauses, wherein the one or more sensors communicate directly with traffic lights and the look ahead controller.

197. The look ahead energy management and control system of clause 112, any other suitable clause, or any combination of suitable clauses, wherein the look ahead technology data comprises information to predict the power needs of the vehicle.

198. The look ahead energy management and control system of clause 101, any other suitable clause, or any combination of suitable clauses, wherein the look ahead technology data is used to determine coolant temperature of the fuel cell system.

199. The look ahead energy management and control system of clause 112, any other suitable clause, or any combination of suitable clauses, wherein the look ahead technology data is used to determine operation level of radiators in the vehicle.

200. The look ahead energy management and control system of clause 112, any other suitable clause, or any combination of suitable clauses, wherein the look ahead technology data is used to determine operation level of pumps in the vehicle.

201. A look ahead energy management and control method to improve performance and extend the life of a fuel cell system, comprising:
   detecting look ahead technology data from one or more sensors connected to one or more data sources,
   communicating the look ahead technology data from the one or more sensors to a look ahead controller,
   predicting transients based on the look ahead technology data,
   altering the behavior of the fuel cell system in response to the look ahead technology data,
   reducing or preventing predicted transients, powercycling, or parasitic load of the fuel cell stack, and improving the performance and extending the life of the fuel cell system.

202. The look head energy management and control method of clause 202, any other suitable clause, or any combination of suitable clauses, wherein the look ahead technology data comprises information extracted from a source selected from a group consisting of an operator or user, maps, global positioning systems (GPS), vehicle to vehicle infrastructure V2X, dedicated short range communication (DSRC), cloud, fuel cell, vehicle controller area network (CAN), internal fuel cell devices, artificial intelligence (AI), Internet of Things (IoT), and combinations thereof.
203. The look ahead energy management and control method of clause 202, any other suitable clause, or any combination of suitable clauses, wherein the look ahead technology data comprises mathematical modeling data.
204. The look ahead energy management and control method of clause 202, any other suitable clause, or any combination of suitable clauses, wherein the sensors are mounted internal or external the fuel cell system.
205. The look ahead energy management and control method of clause 202, any other Suitable clause, or any combination of suitable clauses, wherein the fuel cell system comprises one or more proton exchange membrane (PEM) fuel cells.
206. The look ahead energy management and control method of clause 202, any other suitable clause, or any combination of suitable clauses, wherein the fuel cell system comprises one or more phosphoric acid fuel cells.
207. The look ahead energy management and control method of clause 202, any other suitable clause, or any combination of suitable clauses, wherein the fuel cell system comprises one or more molten carbonate fuel cells.
208. The look ahead energy management and control method of clause 202, any other suitable clause, or any combination of suitable clauses, wherein the fuel cell system comprises one or more solid oxide fuel cells.
209. The look ahead energy management and control method of clause 202, any other suitable clause, or any combination of suitable clauses, wherein the fuel cell system is comprised in a vehicle.
210. The look ahead energy management and control method of clause 202, any other suitable clause, or any combination of suitable clauses, wherein the fuel cell system is comprised in a powertrain.
211. The look ahead energy management and control method of clause 202, any other suitable clause, or any combination of suitable clauses, wherein the fuel cell system is comprised in a vehicular application on highways.
212. The look ahead energy management and control method of clause 202, any other suitable clause, or any combination of suitable clauses, wherein the fuel cell system is comprised in a vehicular application on off roads.
213. The look ahead energy management and control method of clause 202, any other suitable clause, or any combination of suitable clauses, wherein the fuel cell system is comprised in a vehicular application underwater.
214. The look ahead energy management and control method of clause 202, any other suitable clause, or any combination of suitable clauses, wherein the fuel cell system is comprised in a vehicular application at high altitudes.
215. The look ahead energy management and control method of clause 202, any other suitable clause, or any combination of suitable clauses, wherein the fuel cell system is comprised in a vehicular application in sub-Saharan regions.
216. The look ahead energy management and control method of clause 202, any other suitable clause, or any combination of suitable clauses, wherein the fuel cell system is comprised in a mobile application.
217. The look ahead energy management and control method of clause 202, any other suitable clause, or any combination of suitable clauses, wherein the fuel cell system is comprised in a stationary application.
218. The look ahead energy management and control method of clause 202, any other suitable clause, or any combination of suitable clauses, wherein the fuel cell system is comprised in an industrial application.
219. The look ahead energy management and control method of clause 209, any other suitable clause, or any combination of suitable clauses, wherein the vehicle is an electric vehicle.
220. The look ahead energy management and control method of clause 209, any other suitable clause, or any combination of suitable clauses, wherein the vehicle is a car.
221. The look ahead energy management and control method of clause 209, any other suitable clause, or any combination of suitable clauses, wherein the vehicle is a truck.
222. The look ahead energy management and control method of clause 209, any other suitable clause, or any combination of suitable clauses, wherein the vehicle is a boat.
223. The look ahead energy management and control method of clause 209, any other suitable clause, or any combination of suitable clauses, wherein the vehicle is a train.
224. The look ahead energy management and control method of clause 209, any other suitable clause, or any combination of suitable clauses, wherein the vehicle is a plane.
225. The look ahead energy management and control method of clause 209, any other suitable clause, or any combination of suitable clauses, wherein the vehicle is a helicopter.
226. The look ahead energy management and control method of clause 209, any other suitable clause, or any combination of suitable clauses, wherein the vehicle is an electrified vehicle.
227. The look ahead energy management and control method of clause 209, any other suitable clause, or any combination of suitable clauses, wherein the vehicle is a hybrid electrified vehicle (HEV).
228. The look ahead energy management and control method of clause 209, any other suitable clause, or any combination of suitable clauses, wherein the vehicle comprises a battery.
229. The look ahead energy management and control method of clause 201, any other suitable clause, or any combination of suitable clauses, wherein the look ahead technology data comprises information that is used or incorporated to predict fuel cell energy demands.
230. The look ahead energy management and control method of clause 201, any other suitable clause, or any combination of suitable clauses, wherein the look ahead technology data comprises information that is used or incorporated to predict fuel cell performance.
231. The look ahead energy management and control method of clause 201, any other suitable clause, or any combination of suitable clauses, wherein the look ahead technology data comprises information that is used or incorporated to predict fuel cell defaults.

232. The look ahead energy management and control method of clause 201, any other suitable clause, or any combination of suitable clauses, wherein the look ahead technology data comprises information that is used or incorporated to predict fuel cell trajectories 233. The look ahead energy management and control method of clause 201, any other suitable clause, or any combination of suitable clauses, wherein the look ahead technology data comprises information related to roadways.

234. The look ahead energy management and control method of clause 201, any other suitable clause, or any combination of suitable clauses, wherein the look ahead technology data comprises information related to airways.

235. The look ahead energy management and control method of clause 201, any other suitable clause, or any combination of suitable clauses, wherein the look ahead technology data comprises information related to waterways.

236. The look ahead energy management and control method of clause 201, any other suitable clause, or any combination of suitable clauses, wherein the look ahead technology data comprises information related paths or routes the fuel cell system encounters.

237. The look ahead energy management and control method of clause 201, any other suitable clause, or any combination of suitable clauses, wherein the look ahead technology data comprises predictive mapping.

238. The look ahead energy management and control method of clause 201, any other suitable clause, or any combination of suitable clauses, wherein the look ahead technology data comprises routing information.

239. The look ahead energy management and control method of clause 201, any other suitable clause, or any combination of suitable clauses, wherein the look ahead technology data comprises information related to performance of the fuel cell system.

240. The look ahead energy management and control method of clause 201, any other suitable clause, or any combination of suitable clauses, wherein the look ahead technology data comprises information related to operation of the fuel cell system.

241. The look ahead energy management and control method of clause 201, any other suitable clause, or any combination of suitable clauses, wherein the look ahead technology data comprises information related to maintenance of the fuel cell system.

242. The look ahead energy management and control method of clause 209, any other suitable clause, or any combination of suitable clauses, wherein the look ahead technology data comprises information related to performance of the vehicle.

243. The look ahead energy management and control method of clause 209, any other suitable clause, or any combination of suitable clauses, wherein the look ahead technology data comprises information related to operation of the vehicle.

244. The look ahead energy management and control method of clause 209, any other suitable clause, or any combination of suitable clauses, wherein the look ahead technology data comprises information related to maintenance of the vehicle.

245. The look ahead energy management and control system of clause 228, any other suitable clause, or any combination of suitable clauses, wherein the look ahead technology data comprises information related to performance of the battery.

246. The look ahead energy management and control system of clause 228, any other suitable clause, or any combination of suitable clauses, wherein the look ahead technology data comprises information related to operation of the battery.

247. The look ahead energy management and control system of clause 228 any other suitable clause, or any combination of suitable clauses, wherein the look ahead technology data comprises information related to maintenance of the battery.

248. The look ahead energy management and control system of clause 210, any other suitable clause, or any combination of suitable clauses, wherein the powertrain comprises a battery.

249. The look ahead energy management and control method of clause 209, any other suitable clause, or any combination of suitable clauses, wherein the look ahead technology data comprises information related to control of components of the vehicle.

250. The look ahead energy management and control method of clause 209, any other suitable clause, or any combination of suitable clauses, wherein the look ahead technology data comprises information related to maintenance of components of the vehicle.

251. The look ahead energy management and control method of clause 209, any other suitable clause, or any combination of suitable clauses, wherein the look ahead technology data comprises information related to optimization of components of the vehicle.

252. The look ahead energy management and control method of clause 209, any other suitable clause, or any combination of suitable clauses, wherein the look ahead technology data comprises information selected from a group consisting of velocity, distance, mass, drag, rolling resistance, wheel power, grade, shifting schedules, gear ratios, transmission ratios, motor speed, torque, battery power, powertrain energy, time reconstruction, electricity generating unit (EGU) power, trip distance, battery state of charge (SOC) limits, battery size, EGU status, current SOC, current distance, control action of the vehicle, and any combination thereof.

253. The look ahead energy management and control method of clause 228, any other suitable clause, or any combination of suitable clauses, wherein the look ahead technology data comprises information selected from a group consisting of battery power, battery state of charge (SOC) limits, battery size, or current SOC of the battery, and any combination thereof.

254. The look ahead energy management and control method of clause 201, any other suitable clause, or any combination of suitable clauses, wherein the look ahead technology data is obtained from electronic sources.

255. The look ahead energy management and control method of clause 201, any other suitable clause, or any combination of suitable clauses, wherein the look ahead technology data is obtained online.

256. The look ahead energy management and control method of clause 201, any other suitable clause, or any combination of suitable clauses, wherein the look ahead technology data is obtained offline.

257. The look ahead energy management and control method of clause 209, any other suitable clause, or any combination of suitable clauses, wherein the look ahead technology data is related to fuel/gas (e.g., hydrogen) fill up stations, charging stations and fast charging stations, rest areas, steep inclines or deep declines in the roadways, traffic conditions, frequency or existence of stop-and-start locations (e.g., stop signs, stop lights, stopped traffic, etc.), obstacles, throttle demand or frequency, scheduled stops and starts, or weather.

258. The look ahead energy management and control method of clause 201, any other suitable clause, or any combination of suitable clauses, wherein the look ahead technology data is comprised in a Look Ahead Table (LAT).

259. The look ahead energy management and control method of clause 201, any other suitable clause, or any combination of suitable clauses, wherein the look ahead technology data is comprised in a Look Up Table (LUT).

260. The look ahead energy management and control method of clause 201, any other suitable clause, or any combination of suitable clauses, wherein communicating the look ahead technology data comprises manually entering the data by a user or operator into a controlling device.

261. The look ahead energy management and control method of clause 201, any other suitable clause, or any combination of suitable clauses, wherein communicating the look ahead technology data comprises communicating the look ahead technology data to the fuel cell system via a look ahead controller to analyze or assess the look ahead technology data received from a data source selected from a group comprising an operator/user, the cloud, fuel cell, GPS, internal clock, maps, DSRC, V2X, ranging sensors, artificial intelligence (AI), Internet of Things (IoT), vehicle CAN, and any combination thereof.

262. The look ahead energy management and control method of clause 201, any other suitable clause, or any combination of suitable clauses, wherein the look ahead technology data is analyzed or manipulated by a controller prior to transmitting it to the fuel cell system.

263. The look ahead energy management and control method of clause 201, any other suitable clause, or any combination of suitable clauses, wherein the one or more sensors detect or collect performance parameter data from the fuel cell system.

264. The look ahead energy management and control method of clause 201, any other suitable clause, or any combination of suitable clauses, wherein the one or more sensors utilize real-time values, and parameters from the fuel cell system.

265. The look ahead energy management and control method of clause 201, any other suitable clause, or any combination of suitable clauses, wherein the one or more sensors utilize instantaneous readings, values, and parameters from the fuel cell system.

266. The look ahead energy management and control method of clause 201, any other suitable clause, or any combination of suitable clauses, wherein the one or more sensors utilize immediate readings, values, and parameters from the fuel cell system.

267. The look ahead energy management and control method of clause 201, any other suitable clause, or any combination of suitable clauses, wherein the one or more sensors predict future fuel cell system performance or durability.

268. The look ahead energy management and control method of clause 201, any other suitable clause, or any combination of suitable clauses, wherein the one or more sensors manage future fuel cell system performance or durability.

269. The look ahead energy management and control method of clause 201, any other suitable clause, or any combination of suitable clauses, wherein the one or more sensors optimize future fuel cell system performance or durability.

270. The look ahead energy management and control method of clause 209, any other suitable clause, or any combination of suitable clauses, wherein the one or more sensors identifies information selected from a group comprising internal performance, maintenance readings, values, or parameters of the vehicle, and any combination thereof.

271. The look ahead energy management and control method of clause 201, any other suitable clause, or any combination of suitable clauses, wherein the one or more sensors identifies proximity to a location selected from a group comprising final destination, a charging station, a hydrogen refill location, a route location, and any combination thereof.

272. The look ahead energy management and control method of clause 201, any other suitable clause, or any combination of suitable clauses, wherein the look ahead energy management and control method further comprises determining an optimal time within a drive cycle to turn-on/turn-off the fuel cell system to minimize switch-on damage.

273. The look ahead energy management and control method of clause 228, any other suitable clause, or any combination of suitable clauses, wherein the look ahead energy management and control method further comprises determining an optimum power split between the fuel cell system and the battery.

274. The look ahead energy management and control method of clause 228, any other suitable clause, or any combination of suitable clauses, wherein the look ahead energy management and control method further comprises determining battery depth of discharge within desirable levels.

275. The look ahead energy management and control method of clause 228, any other suitable clause, or any combination of suitable clauses, wherein the look ahead energy management and control method further comprises reducing range anxiety or uncertainty on end of cycle battery charge.

276. The look ahead energy management and control method of clause 228, any other suitable clause, or any combination of suitable clauses, wherein the look ahead energy management and control method further comprises achieving cost effective battery and fuel cell system sizing by predicting transients and managing power.

277. The look ahead energy management and control method of clause 201, any other suitable clause, or any combination of suitable clauses, wherein improving the performance and extending the life of the fuel cell system comprises using information about the number of times the fuel cell system goes through startup.

278. The look ahead energy management and control method of clause 201, any other suitable clause, or any combination of suitable clauses, wherein the look ahead energy management and control method further comprises reducing hydrogen wastage by smartly pre-charging the circuit.

279. The look ahead energy management and control method of clause 201, any other suitable clause, or any combination of suitable clauses, wherein the look ahead energy management and control method further comprises managing an air handling subsystem or circuit of a fuel cell system to reduce or prevent parasitic loads.

280. The look ahead energy management and control method of clause 201, any other suitable clause, or any combination of suitable clauses, wherein the one or more sensors comprise progressively more advanced sensors or sensor suites.

281. The look ahead energy management and control method of clause 201, any other suitable clause, or any combination of suitable clauses, wherein the one or more sensors comprise multiple sensors comprised in a sensor package.

282. The look ahead energy management and control method of clause 201, any other suitable clause, or any combination of suitable clauses, wherein the one or more sensors is selected from a group comprising a GPS sensor, a RADAR, a camera, a V2X sensor, and any combination thereof.

283. The look ahead energy management and control method of clause 201, any other suitable clause, or any combination of suitable clauses, wherein the one or more sensors comprises a online map.

284. The look ahead energy management and control method of clause 201, any other suitable clause, or any combination of suitable clauses, wherein the one or more sensors comprises an offline map.

285. The look ahead energy management and control method of clause 201, any other suitable clause, or any combination of suitable clauses, wherein the one or more sensors predicts future power demands.

286. The look ahead energy management and control method of clause 201, any other suitable clause, or any combination of suitable clauses, wherein the one or more sensors predicts future-"tip-in" events.

287. The look ahead energy management and control method of clause 201, any other suitable clause, or any combination of suitable clauses, wherein the look ahead energy management and control system responds to post-"tip-in" events 288. The look ahead energy management and control method of clause 201, any other suitable clause, or any combination of suitable clauses, wherein the look ahead energy management and control method further comprises using a precharge module.

289. The look ahead energy management and control method of clause 201, any other suitable clause, or any combination of suitable clauses, wherein the look ahead energy management and control method further comprises precharging an air handling subsystem.

290. The look ahead energy management and control method of clause 201, any other suitable clause, or any combination of suitable clauses, wherein the one or more sensors use a precharge estimator.

291. The look ahead energy management and control method of clause 201, any other suitable clause, or any combination of suitable clauses, communicating the look ahead technology data comprises communicating directly with traffic lights and a look ahead controller.

292. The look ahead energy management and control method of clause 209, any other suitable clause, or any combination of suitable clauses, wherein the look ahead technology data comprises information to predict the power needs of the vehicle.

293. The look ahead energy management and control method of clause 201, any other suitable clause, or any combination of suitable clauses, wherein the look ahead technology data is used to determine coolant temperature of the fuel cell system.

294. The look ahead energy management and control method of clause 209, any other suitable clause, or any combination of suitable clauses, wherein the look ahead technology data is used to determine operation level of radiators in the vehicle.

295. The look ahead energy management and control method of clause 209, any other suitable clause, or any combination of suitable clauses, wherein the look ahead technology data is used to determine operation level of pumps in the vehicle.

296. A look ahead energy management and control method of clause 201, any other suitable clause, or any combination of suitable clauses, wherein altering the behavior of the fuel cell system in response to the look ahead data comprises one or more anticipatory methods, one or more reactionary methods, or combinations thereof.

297. A look ahead energy management and control method of clause 296, any other suitable clause, or any combination of suitable clauses, wherein the one or more anticipatory or reactionary methods of altering the behavior of the fuel cell system are selected from the group consisting of precharging, peak shaving, cold starting, purge controlling, or combinations thereof.

298. A look ahead energy management and control method of clause 297, any other suitable clause, or any combination of suitable clauses, wherein precharging the fuel cell system comprises proactively prompting an air handling subsystem to release excess oxygen to the fuel cell stack of the fuel cell system.

299. A look ahead energy management and control method of clause 297, any other suitable clause, or any combination of suitable clauses, wherein peak shaving the fuel cell system comprises reducing the peak load of the fuel cell or a battery system.

300. A look ahead energy management and control method of clause 297, any other suitable clause, or any combination of suitable clauses, wherein cold starting the fuel cell system is initiated when the fuel cell system comprises a core operational temperature at or below 0° C.

301. A look ahead energy management and control method of clause 297, any other suitable clause, or any combination of suitable clauses, wherein cold starting the fuel cell system comprises maintaining the fuel cell system at core operational temperatures during extreme weather conditions, reduced operation, or no operations.

302. A look ahead energy management and control method of clause 297, any other suitable clause, or any combination of suitable clauses, wherein cold starting the fuel cell system comprises defrosting a frozen or nearly frozen fuel cell system.

303. A look ahead energy management and control method of clause 297, any other suitable clause, or any combination of suitable clauses, wherein cold starting the fuel cell system comprises proactively warming the fuel cell system.

304. A look ahead energy management and control method of clause 303, any other suitable clause, or any combination of suitable clauses, wherein proactively warming the fuel cell system comprises an external power source.
305. A look ahead energy management and control method of clause 304, any other suitable clause, or any combination of suitable clauses, wherein the external power source is an electrical power grid accessed through a plug connection to the fuel cell system.
306. A look ahead energy management and control method of clause 297, any other suitable clause, or any combination of suitable clauses, wherein purge controlling the fuel cell system comprises proactively releasing hydrogen or other chemical compounds from the fuel cell system.
307. A look ahead energy management and control method of clause 201, any other suitable clause, or any combination of suitable clauses, wherein the improving performance of the fuel cell system comprises improving acceleration of the fuel cell system.
308. A look ahead energy management and control method of clause 297, any other suitable clause, or any combination of suitable clauses, wherein cold starting the fuel cell system is initiated based on look ahead technology data that further comprises information about an upcoming trip.
309. A look ahead energy management and control method to improve performance and extend the life of a fuel cell system, comprising:
  detecting look ahead technology data from one or more sensors connected to one or more data sources,
  communicating the look ahead technology data from the one or more sensors to a look ahead controller,
  predicting transients based on the look ahead technology data,
  altering the behavior of the fuel cell system in response to the look ahead technology data,
  reducing or preventing predicted transients, powercycling, or parasitic load of the fuel cell stack, and
  improving the performance and extending the life of the fuel cell system.
310. The look ahead energy management and control method of clause 309, any other suitable clause, or any combination of suitable clauses, wherein the look ahead technology data comprises information extracted from a source selected from a group consisting of an operator or user, maps, global positioning systems (GPS), global positioning systems (GPS), vehicle to vehicle infrastructure V2X, dedicated short range communication (DSRC), cloud, fuel cell, vehicle controller area network (CAN), internal fuel cell devices, artificial intelligence (AI), Internet of Things (IoT), and combinations thereof.
311. The look ahead energy management and control method of clause 309, any other suitable clause, or any combination of suitable clauses, wherein the look ahead technology data further comprises mathematical modeling data.
312. The look ahead energy management and control method of clause 309, any other suitable clause, or any combination of suitable clauses, wherein the sensors are mounted internal or external to the fuel cell system.
313. The look ahead energy management and control method of clause 309, any other suitable clause, or any combination of suitable clauses, wherein the fuel cell stack comprises one or more proton exchange membrane (PEM) fuel cells.
314. The look ahead energy management and control method of clause 309, any other suitable clause, or any combination of suitable clauses, wherein the fuel cell system is comprised in a vehicle or a powertrain.
315. The look ahead energy management and control method of clause 314, any other suitable clause, or any combination of suitable clauses, wherein the vehicle is an electric vehicle.
315. The look ahead energy management and control method of clause 315, any other suitable clause, or any combination of suitable clauses, wherein the electric vehicle further comprises a battery.
316. The look ahead energy management and control method of clause 309, any other suitable clause, or any combination of suitable clauses, wherein altering the behavior of the fuel cell system in response to the look ahead data comprises one or more anticipatory methods, one or more reactionary methods, or combinations thereof.
317. The look ahead energy management and control method of clause 316, any other suitable clause, or any combination of suitable clauses, wherein the one or more anticipatory or reactionary methods of altering the behavior of the fuel cell system are selected from the group consisting of precharging, peak shaving, cold starting, purge controlling, or combinations thereof.
318. The look ahead energy management and control method of clause 317, any other suitable clause, or any combination of suitable clauses, wherein precharging the fuel cell system comprises proactively prompting an air handling subsystem to release excess oxygen to the fuel cell stack of the fuel cell system.
319. The look ahead energy management and control method of clause 317, any other suitable clause, or any combination of suitable clauses, wherein peak shaving the fuel cell system comprises reducing the peak load of the fuel cell or a battery system.
320. The look ahead energy management and control method of clause 317, any other suitable clause, or any combination of suitable clauses, wherein cold starting the fuel cell system is initiated when the fuel cell system comprises a core operational temperature at or below 0° C.
321. The look ahead energy management and control method of clause 317, any other suitable clause, or any combination of suitable clauses, wherein cold starting the fuel cell system comprises maintaining the fuel cell system at core operational temperatures during extreme weather conditions, reduced operation, or no operations.
322. The look ahead energy management and control method of clause 317, any other suitable clause, or any combination of suitable clauses, wherein cold starting the fuel cell system comprises defrosting a frozen or nearly frozen fuel cell system.
323. The look ahead energy management and control method of clause 317, any other suitable clause, or any combination of suitable clauses, wherein cold starting the fuel cell system comprises proactively warming the fuel cell system.
324. The look ahead energy management and control method of clause 323, any other suitable clause, or any combination of suitable clauses, wherein proactively warming the fuel cell system comprises an external power source.
325. The look ahead energy management and control method of clause 324, any other suitable clause, or any combination of suitable clauses, wherein the external power source is an electrical power grid accessed through a plug connection to the fuel cell system.

326. The look ahead energy management and control method of clause 316, any other suitable clause, or any combination of suitable clauses, wherein purge controlling the fuel cell system comprises proactively releasing hydrogen or other chemical compounds from the fuel cell system.

327. The look ahead energy management and control method of clause 309, any other suitable clause, or any combination of suitable clauses, wherein the improving performance of the fuel cell system comprises improving acceleration of the fuel cell system.

328. The look ahead energy management and control method of clause 320, any other suitable clause, or any combination of suitable clauses, wherein cold starting the fuel cell system is initiated based on look ahead technology data that further comprises information about an upcoming trip.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The term "comprising," as used herein in the present disclosure, may be interchanged, substituted, or replaced at any instance with the phrases "consisting essentially of" or "consisting of" and embody the relevant meanings and limitations associated with those terms or phrases as described herein.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A look ahead energy management and control system to reduce or prevent transients in a fuel cell system, comprising:
   one or more sensors operably connected to one or more data sources and configured to detect look ahead technology data related to at least one factor external to the fuel cell system,
   an air handling subsystem,
   the fuel cell system comprising a fuel cell stack, and
   a look ahead controller,
   wherein the look ahead technology data is detected by the one or more sensors and communicated to the look ahead controller which predicts transients based on the look ahead technology data,
   wherein the look ahead controller proactively prompts the air handling subsystem to release excess oxygen to the fuel cell system, and the look ahead controller does not increase an amount of fuel being provided to the fuel cell system while the air handling subsystem releases the excess oxygen, and
   wherein the fuel cell system reduces or prevents predicted transients of the fuel cell stack thereby extending the life of the fuel cell system.

2. The look ahead energy management and control system of claim 1, wherein the look ahead technology data comprises information extracted from the one or more data sources selected from a group consisting of an operator or user, maps, global positioning systems (GPS), vehicle to vehicle infrastructure (V2X), dedicated short range communication (DSRC), cloud, fuel cell, vehicle controller area network (CAN), and combinations thereof.

3. The look ahead energy management and control system of claim 1, wherein the look ahead technology data further comprises mathematical modeling data.

4. The look ahead energy management and control system of claim 1, wherein the one or more sensors are mounted internal or external the fuel cell system.

5. The look ahead energy management and control system of claim 1, wherein the amount of fuel being provided to the fuel cell system while the air handling subsystem releases the excess oxygen is reduced.

6. The look ahead energy management and control system of claim 1, wherein the look ahead technology data related to the at least one factor external to the fuel cell system comprises weather.

7. The look ahead energy management and control system of claim 1, wherein the fuel cell system is comprised in a vehicle or a powertrain, and wherein the vehicle is an electric vehicle comprising a battery.

8. The look ahead energy management and control system of claim 1, wherein the look ahead technology data related to the at least one factor external to the fuel cell system comprises route conditions or traffic conditions.

9. A look ahead energy management and control system to extend the life of a fuel cell system, comprising:
one or more sensors configured to detect look ahead technology data,
an air handling subsystem including a compressor,
a battery,
the fuel cell system comprising a fuel cell stack, and
a look ahead controller,
wherein the look ahead technology data is detected by the one or more sensors and communicated to the look ahead controller which predicts transients based on the look ahead technology data,
wherein the look ahead controller is programmed to determine an optimal power split between the fuel cell system and the battery based on the look ahead technology data so that a first power demand is provided by the fuel cell system and a second power demand is provided by the battery,
wherein the look ahead controller proactively prompts the air handling subsystem to release excess oxygen to the fuel cell stack of the fuel cell system,
wherein the compressor is spooled up to a desired pressure and flow point to increase a mass flow rate of air flowing through the fuel cell system as a precharge for the fuel cell system,
wherein the look ahead controller is programmed to reduce the second power demand provided by the battery in response to predicted transients based on the look ahead technology data, and
wherein the fuel cell system reduces or prevents predicted transients, powercycling, or parasitic load of the fuel cell stack thereby extending the life of the fuel cell system.

10. The look ahead energy management and control system of claim 9, wherein the look ahead technology data comprises information extracted from a source selected from a group consisting of maps, global positioning systems (GPS), vehicle to vehicle infrastructure (V2X), dedicated short range communication (DSRC), cloud, vehicle controller area network (CAN), and combinations thereof.

11. The look ahead energy management and control system of claim 9, wherein the look ahead technology data further comprises mathematical modeling data.

12. The look ahead energy management and control system of claim 9, wherein the one or more sensors are mounted internal or onboard the fuel cell system.

13. The look ahead energy management and control system of claim 9, wherein the precharge for the fuel cell system occurs in anticipation of an event during operation of the fuel cell system that requires an increase in power demand of the fuel cell system.

14. The look ahead energy management and control system of claim 9, wherein the fuel cell system is comprised in a vehicle or a powertrain.

15. The look ahead energy management and control system of claim 14, wherein the vehicle is an electric vehicle.

16. The look ahead energy management and control system of claim 9, wherein stored energy is used to spool up the compressor, the stored energy is obtained from a secondary source.

17. A look ahead energy management and control system to reduce or prevent transients in a fuel cell system, comprising:
one or more sensors operably connected to one or more data sources and configured to detect look ahead technology data related to one or more inputs comprising locations of fill up stations, locations of charging stations, weather, and combinations thereof,
an air handling subsystem,
the fuel cell system comprising a fuel cell stack, and
a look ahead controller,
wherein the look ahead technology data is detected by the one or more sensors and communicated to the look ahead controller which predicts transients based on the look ahead technology data,
wherein the look ahead controller proactively prompts the air handling subsystem to release excess oxygen to the fuel cell system, and the look ahead controller does not increase an amount of fuel being provided to the fuel cell system while the air handling subsystem releases the excess oxygen, and
wherein the fuel cell system reduces or prevents predicted transients of the fuel cell stack thereby extending the life of the fuel cell system.

18. The look ahead energy management and control system of claim 17, wherein the look ahead technology data comprises information extracted from the one or more data sources selected from a group consisting of maps, global positioning systems (GPS), vehicle to vehicle infrastructure (V2X), dedicated short range communication (DSRC), cloud, vehicle controller area network (CAN), and combinations thereof.

19. The look ahead energy management and control system of claim 17, wherein the one or more sensors comprises a GPS sensor.

20. The look ahead energy management and control system of claim 17, wherein the one or more sensors comprises a camera.

* * * * *